US008677174B2

(12) United States Patent
Bobak et al.

(10) Patent No.: US 8,677,174 B2
(45) Date of Patent: Mar. 18, 2014

(54) MANAGEMENT OF RUNTIME EVENTS IN A COMPUTER ENVIRONMENT USING A CONTAINMENT REGION

(75) Inventors: Mythili K. Bobak, Lagrangeville, NY (US); Tim A. McConnell, Lexington, KY (US); Michael D. Swanson, Springfield, OR (US)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 11/965,902

(22) Filed: Dec. 28, 2007

(65) Prior Publication Data

US 2009/0172687 A1    Jul. 2, 2009

(51) Int. Cl.
*G06F 11/00* (2006.01)

(52) U.S. Cl.
USPC .............................................. 714/2; 705/7.11

(58) Field of Classification Search
USPC ............. 714/15, 20, 21, 38.1, 47.1, 48, 49, 2; 705/7.11, 7.27; 703/22
See application file for complete search history.

(56) References Cited

U.S. PATENT DOCUMENTS

| 4,979,105 A | 12/1990 | Daly et al. |
| 5,023,873 A | 6/1991 | Stevenson et al. ............ 371/8.2 |
| 5,386,561 A | 1/1995 | Huynh et al. |
| 5,452,452 A | 9/1995 | Gaetner et al. |
| 5,481,694 A | 1/1996 | Chao et al. ................... 395/439 |
| 5,530,802 A | 6/1996 | Fuchs et al. |
| 5,537,542 A | 7/1996 | Eilert et al. |
| 5,604,863 A | 2/1997 | Allen et al. |
| 5,631,831 A | 5/1997 | Bird et al. |
| 5,652,908 A | 7/1997 | Douglas et al. |
| 5,734,837 A | 3/1998 | Flores et al. |
| 5,790,780 A | 8/1998 | Brichta et al. |
| 5,797,005 A | 8/1998 | Bahls et al. |
| 5,797,129 A | 8/1998 | Rohan |
| 5,826,080 A | 10/1998 | Dworzecki |
| 5,887,168 A | 3/1999 | Bahls et al. |
| 6,012,044 A | 1/2000 | Maggioncalda et al. |
| 6,012,152 A | 1/2000 | Douik et al. |
| 6,041,306 A | 3/2000 | Du et al. |
| 6,125,442 A | 9/2000 | Maves et al. |
| 6,336,138 B1 | 1/2002 | Caswell et al. |
| 6,385,613 B1 | 5/2002 | Grewell et al. .................... 707/8 |

(Continued)

FOREIGN PATENT DOCUMENTS

WO    WO 99/10814    3/1999

OTHER PUBLICATIONS

Final Office Action for U.S. Appl. No. 11/965,930 dated Sep. 29, 2010.

(Continued)

*Primary Examiner* — Scott Baderman
*Assistant Examiner* — Joseph Kudirka
(74) *Attorney, Agent, or Firm* — Dennis Jung, Esq.; Blanche E. Schiller, Esq.; Heslin Rothenberg Farley & Mesiti P.C.

(57) ABSTRACT

The scope and impact of an event, such as a failure, are identified. A Containment Region is used to identify the resources affected by the event. It is also used to aggregate resource state for those resources. This information is then used to manage one or more aspects of a customer's environment. This management may include recovery from a failure.

20 Claims, 42 Drawing Sheets

(56) References Cited

U.S. PATENT DOCUMENTS

| | | |
|---|---|---|
| 6,393,386 B1 | 5/2002 | Zager et al. |
| 6,393,485 B1 | 5/2002 | Chao et al. ............... 709/231 |
| 6,408,277 B1 | 6/2002 | Nelken |
| 6,449,688 B1 | 9/2002 | Peters et al. ............... 711/112 |
| 6,480,944 B2* | 11/2002 | Bradshaw et al. ........... 711/162 |
| 6,625,751 B1 | 9/2003 | Starovic et al. |
| 6,732,118 B2 | 5/2004 | Hermann et al. |
| 6,785,768 B2 | 8/2004 | Peters et al. ............... 711/112 |
| 6,862,696 B1 | 3/2005 | Voas et al. |
| 6,874,010 B1 | 3/2005 | Sargent |
| 6,934,247 B2 | 8/2005 | Bhattal et al. ............... 370/216 |
| 6,954,786 B1 | 10/2005 | Vered et al. |
| 6,983,321 B2 | 1/2006 | Trinon et al. |
| 6,983,362 B1 | 1/2006 | Kidder et al. |
| 7,032,186 B1 | 4/2006 | Gasser et al. |
| 7,047,337 B2 | 5/2006 | Armstrong et al. |
| 7,058,947 B1 | 6/2006 | Raja et al. |
| 7,111,297 B1 | 9/2006 | Sankaranarayan et al. |
| 7,197,749 B2 | 3/2007 | Thornton et al. |
| 7,243,267 B2 | 7/2007 | Klemm et al. |
| 7,281,018 B1 | 10/2007 | Begun et al. |
| 7,313,573 B2 | 12/2007 | Leung et al. |
| 7,325,161 B1 | 1/2008 | Rakic et al. |
| 7,395,537 B1 | 7/2008 | Brown et al. |
| 7,409,356 B1 | 8/2008 | Geddes et al. |
| 7,437,611 B2 | 10/2008 | Agarwal et al. |
| 7,463,648 B1 | 12/2008 | Eppstein et al. |
| 7,490,265 B2 | 2/2009 | Baskey et al. |
| 7,499,954 B2 | 3/2009 | Cherkauer et al. |
| 7,509,529 B2 | 3/2009 | Colucci et al. |
| 7,529,981 B2 | 5/2009 | Childress et al. |
| 7,536,585 B1 | 5/2009 | Keeton et al. |
| 7,568,019 B1 | 7/2009 | Bhargava et al. |
| 7,587,483 B1 | 9/2009 | Florissi et al. |
| 7,610,512 B2* | 10/2009 | Gerber ............... 714/26 |
| 7,620,953 B1 | 11/2009 | Tene et al. |
| 7,627,728 B1 | 12/2009 | Roeck et al. |
| 7,650,341 B1 | 1/2010 | Oratovsky et al. |
| 7,661,033 B2 | 2/2010 | Challener et al. |
| 7,707,173 B2 | 4/2010 | Nanavati et al. |
| 7,707,451 B2 | 4/2010 | Buskens et al. |
| 7,730,363 B2 | 6/2010 | Takezawa et al. |
| 7,743,001 B1* | 6/2010 | Vermeulen et al. ............ 705/400 |
| 7,747,730 B1 | 6/2010 | Harlow |
| 7,752,310 B2 | 7/2010 | Kageyama |
| 7,774,457 B1 | 8/2010 | Talwar et al. |
| 7,774,458 B2 | 8/2010 | Trinon et al. |
| 7,818,421 B2 | 10/2010 | Machida |
| 7,865,582 B2 | 1/2011 | Santos et al. |
| 7,917,814 B2 | 3/2011 | Hu et al. |
| 7,933,872 B2 | 4/2011 | Kulkarni et al. |
| 7,934,119 B2 | 4/2011 | Takamoto et al. |
| 7,937,706 B2 | 5/2011 | Casotto |
| 7,958,393 B2 | 6/2011 | Bobak et al. |
| 7,962,590 B1 | 6/2011 | Or et al. |
| 8,051,106 B2 | 11/2011 | Bird |
| 8,086,758 B1 | 12/2011 | Allan et al. |
| 8,260,893 B1 | 9/2012 | Bandhole et al. |
| 2001/0056398 A1 | 12/2001 | Scheirer |
| 2001/0056554 A1 | 12/2001 | Chrabaszcz |
| 2002/0022952 A1 | 2/2002 | Zager et al. |
| 2002/0049749 A1 | 4/2002 | Helgeson et al. |
| 2002/0059512 A1 | 5/2002 | Desjardins |
| 2002/0069102 A1 | 6/2002 | Vellante et al. |
| 2002/0078130 A1 | 6/2002 | Thornton et al. |
| 2002/0078381 A1 | 6/2002 | Farley et al. |
| 2002/0091991 A1 | 7/2002 | Castro |
| 2002/0194045 A1 | 12/2002 | Shay et al. |
| 2002/0198727 A1 | 12/2002 | Ann et al. |
| 2003/0051186 A1 | 3/2003 | Boudnik et al. |
| 2003/0056013 A1 | 3/2003 | Laschkewitsch et al. |
| 2003/0078823 A1 | 4/2003 | Yoshioka et al. |
| 2003/0084100 A1 | 5/2003 | Gahan et al. |
| 2003/0093672 A1 | 5/2003 | Cichowlas |
| 2003/0135384 A1 | 7/2003 | Nguyen |
| 2003/0135609 A1 | 7/2003 | Carlson et al. |
| 2003/0139956 A1 | 7/2003 | Guenther et al. |
| 2003/0200482 A1 | 10/2003 | Sullivan |
| 2003/0212580 A1 | 11/2003 | Shen |
| 2003/0212685 A1 | 11/2003 | Rakotoarivelo et al. |
| 2003/0225602 A1 | 12/2003 | Hagmann et al. |
| 2003/0236677 A1 | 12/2003 | Casati et al. |
| 2004/0034553 A1 | 2/2004 | Cole et al. |
| 2004/0054690 A1 | 3/2004 | Hillerbrand et al. |
| 2004/0078373 A1 | 4/2004 | Ghoneimy et al. |
| 2004/0111702 A1 | 6/2004 | Chan |
| 2004/0119752 A1 | 6/2004 | Beringer et al. |
| 2004/0143470 A1 | 7/2004 | Myrick et al. |
| 2004/0158777 A1 | 8/2004 | Bae et al. ............... 714/47 |
| 2004/0162741 A1 | 8/2004 | Flaxer et al. |
| 2004/0181476 A1 | 9/2004 | Smith et al. |
| 2004/0186905 A1 | 9/2004 | Young et al. |
| 2004/0193476 A1 | 9/2004 | Aerdts |
| 2004/0199768 A1 | 10/2004 | Nail |
| 2004/0210452 A1 | 10/2004 | Aboujaoude et al. |
| 2004/0243699 A1 | 12/2004 | Koclanes et al. |
| 2005/0015641 A1 | 1/2005 | Alur et al. |
| 2005/0027835 A1 | 2/2005 | Raikar et al. |
| 2005/0033600 A1 | 2/2005 | Geddes et al. |
| 2005/0043977 A1 | 2/2005 | Ahern et al. |
| 2005/0049906 A1 | 3/2005 | Leymann et al. |
| 2005/0060662 A1 | 3/2005 | Soares et al. |
| 2005/0071470 A1 | 3/2005 | O'Brien et al. |
| 2005/0086091 A1 | 4/2005 | Trumbly et al. |
| 2005/0091351 A1 | 4/2005 | Badovinatz et al. |
| 2005/0096949 A1 | 5/2005 | Aiber et al. |
| 2005/0119905 A1 | 6/2005 | Wong et al. |
| 2005/0125768 A1 | 6/2005 | Wong et al. |
| 2005/0172306 A1 | 8/2005 | Agarwal et al. |
| 2005/0177406 A1 | 8/2005 | Facciorusso et al. |
| 2005/0198244 A1 | 9/2005 | Eilam et al. |
| 2005/0228707 A1 | 10/2005 | Hendrickson |
| 2005/0228852 A1 | 10/2005 | Santos et al. |
| 2005/0235248 A1 | 10/2005 | Victoria et al. |
| 2005/0262242 A1 | 11/2005 | Byers et al. |
| 2006/0004265 A1 | 1/2006 | Pulkkinen et al. |
| 2006/0010234 A1 | 1/2006 | Reedy et al. |
| 2006/0020866 A1 | 1/2006 | Lo et al. |
| 2006/0037022 A1 | 2/2006 | Byrd et al. |
| 2006/0041505 A1 | 2/2006 | Enyart |
| 2006/0064335 A1 | 3/2006 | Goldszmidt et al. |
| 2006/0074731 A1 | 4/2006 | Green et al. |
| 2006/0074736 A1 | 4/2006 | Shukla et al. |
| 2006/0074993 A1 | 4/2006 | Pulamarasetti et al. |
| 2006/0106626 A1 | 5/2006 | Jeng et al. |
| 2006/0111921 A1 | 5/2006 | Chang et al. |
| 2006/0112383 A1 | 5/2006 | Chang et al. |
| 2006/0117221 A1 | 6/2006 | Fisher et al. |
| 2006/0123022 A1 | 6/2006 | Bird |
| 2006/0129562 A1 | 6/2006 | Pulamarasetti et al. |
| 2006/0149842 A1 | 7/2006 | Dawson et al. |
| 2006/0161444 A1 | 7/2006 | Lubrecht et al. |
| 2006/0161466 A1 | 7/2006 | Trinon et al. |
| 2006/0179136 A1 | 8/2006 | Loboz et al. |
| 2006/0190368 A1 | 8/2006 | Kesterman |
| 2006/0190583 A1 | 8/2006 | Whalen |
| 2006/0190775 A1 | 8/2006 | Aggarwal et al. |
| 2006/0218558 A1 | 9/2006 | Torii et al. |
| 2006/0224702 A1 | 10/2006 | Schmidt et al. |
| 2006/0236061 A1 | 10/2006 | Koclanes |
| 2006/0245354 A1 | 11/2006 | Gao et al. |
| 2006/0245369 A1 | 11/2006 | Schimmelpfeng et al. |
| 2006/0248546 A1 | 11/2006 | Andreev et al. |
| 2006/0259526 A1 | 11/2006 | Booz et al. |
| 2006/0287875 A1 | 12/2006 | Reddy et al. |
| 2006/0293942 A1 | 12/2006 | Chaddha et al. |
| 2007/0011331 A1 | 1/2007 | Morimoto et al. |
| 2007/0027734 A1 | 2/2007 | Hughes |
| 2007/0038490 A1 | 2/2007 | Joodi |
| 2007/0038492 A1 | 2/2007 | Ryan et al. |
| 2007/0061385 A1 | 3/2007 | Clark et al. |
| 2007/0067296 A1 | 3/2007 | Malloy et al. |
| 2007/0079097 A1 | 4/2007 | Karnowski et al. |
| 2007/0100712 A1 | 5/2007 | Kilpatrick et al. |

(56) References Cited

U.S. PATENT DOCUMENTS

| | | |
|---|---|---|
| 2007/0112847 A1 | 5/2007 | Dublish et al. |
| 2007/0143166 A1 | 6/2007 | Leymann et al. |
| 2007/0150571 A1 | 6/2007 | Haga et al. |
| 2007/0165525 A1 | 7/2007 | Kageyama |
| 2007/0179826 A1 | 8/2007 | Cutlip et al. |
| 2007/0198678 A1 | 8/2007 | Dieberger et al. |
| 2007/0198789 A1 | 8/2007 | Clark et al. |
| 2007/0234408 A1 | 10/2007 | Burch et al. |
| 2007/0266029 A1 | 11/2007 | Baskey et al. |
| 2007/0271219 A1 | 11/2007 | Agarwal et al. |
| 2007/0276885 A1 | 11/2007 | Valiyaparambil et al. |
| 2007/0286219 A1 | 12/2007 | Knop et al. |
| 2007/0294406 A1 | 12/2007 | Suer et al. |
| 2007/0300204 A1 | 12/2007 | Andreev et al. |
| 2008/0005739 A1 | 1/2008 | Sadiq et al. |
| 2008/0016335 A1 | 1/2008 | Takahashi et al. |
| 2008/0052719 A1 | 2/2008 | Briscoe et al. |
| 2008/0063423 A1 | 3/2008 | Matoba |
| 2008/0140495 A1 | 6/2008 | Bhamidipaty et al. |
| 2008/0147452 A1 | 6/2008 | Renz et al. |
| 2008/0215909 A1 | 9/2008 | Bretschneider et al. |
| 2008/0294777 A1 | 11/2008 | Karve et al. |
| 2008/0295100 A1 | 11/2008 | Ainsworth |
| 2008/0317217 A1 | 12/2008 | Bernardini et al. |
| 2009/0037363 A1 | 2/2009 | Kozlov et al. |
| 2009/0077210 A1 | 3/2009 | Musman et al. |
| 2009/0113383 A1 | 4/2009 | Delima et al. |
| 2009/0125751 A1 | 5/2009 | Dawson et al. |
| 2009/0150456 A1 | 6/2009 | Balasubramanian et al. |
| 2009/0150887 A1 | 6/2009 | Sanghvi et al. |
| 2009/0171703 A1 | 7/2009 | Bobak et al. |
| 2009/0171704 A1 | 7/2009 | Bobak et al. |
| 2009/0171705 A1 | 7/2009 | Bobak et al. |
| 2009/0171706 A1 | 7/2009 | Bobak et al. |
| 2009/0171707 A1 | 7/2009 | Bobak et al. |
| 2009/0171708 A1 | 7/2009 | Bobak et al. |
| 2009/0171730 A1 | 7/2009 | Bobak et al. |
| 2009/0171731 A1 | 7/2009 | Bobak et al. |
| 2009/0171732 A1 | 7/2009 | Bobak et al. |
| 2009/0171733 A1 | 7/2009 | Bobak et al. |
| 2009/0172149 A1 | 7/2009 | Bobak et al. |
| 2009/0172460 A1 | 7/2009 | Bobak et al. |
| 2009/0172461 A1 | 7/2009 | Bobak et al. |
| 2009/0172470 A1 | 7/2009 | Bobak et al. |
| 2009/0172668 A1 | 7/2009 | Bobak et al. |
| 2009/0172669 A1 | 7/2009 | Bobak et al. |
| 2009/0172670 A1 | 7/2009 | Bobak et al. |
| 2009/0172671 A1 | 7/2009 | Bobak et al. |
| 2009/0172674 A1 | 7/2009 | Bobak et al. |
| 2009/0172682 A1 | 7/2009 | Bobak et al. |
| 2009/0172688 A1 | 7/2009 | Bobak et al. |
| 2009/0172689 A1 | 7/2009 | Bobak et al. |
| 2009/0172769 A1 | 7/2009 | Bobak et al. |
| 2009/0249337 A1 | 10/2009 | Vasilevsky et al. |
| 2010/0280863 A1 | 11/2010 | Wilcock et al. |
| 2011/0004564 A1 | 1/2011 | Rolia et al. |

OTHER PUBLICATIONS

Final Office Action for U.S. Appl. No. 11/965,874 dated Oct. 14, 2010.
Office Action for U.S. Appl. No. 11/965,862 dated Dec. 7, 2010.
Final Office Action for U.S. Appl. No. 11/965,855 dated Dec. 22, 2010.
Office Action for U.S. Appl. No. 11/965,832 dated Dec. 22, 2010.
Final Office Action for U.S. Appl. No. 11/965,872 dated Dec. 22, 2010.
Patent Application for U.S. Appl. No. 12/975,520, filed Dec. 22, 2010 entitled "Real-Time Information Technology Environments".
Office Action for U.S. Appl. No. 11/966,495 dated Oct. 29, 2009.
Office Action for U.S. Appl. No. 11/965,874 dated Mar. 18, 2010.
Office Action for U.S. Appl. No. 11/965,897 dated Mar. 31, 2010.
Office Action for U.S. Appl. No. 11/965,930 dated Apr. 1, 2010.
Office Action for U.S. Appl. No. 11/966,619 dated Feb. 2, 2011.
Office Action for U.S. Appl. No. 11/965,926 dated Feb. 3, 2011.
Rood, Melody A., "Enterprise Architecture: Definition, Content & Utility," IEEE, Jul. 1994, pp. 106-111.
Buchanan, Richard D., et al., "Aligning Enterprise and IT Investments with Corporate Goals," OMG White Paper, 2002, p. 1-13.
Restriction Requirement for U.S. Appl. No. 11/965,889 dated Feb. 16, 2011.
Office Action for U.S. Appl. No. 11/965,913 dated Mar. 1, 2011.
Office Action for U.S. Appl. No. 11/965,845 dated Mar. 11, 2011.
Liu, Rong et al., "Modeling Business Contexture and Behavior Using Business Artifacts," Lecture Notes in Computer Science, 2007, vol. 4495/2007, pp. 324-339.
Office Action for U.S. Appl. No. 11/965,922 dated Mar. 16, 2011.
Office Action for U.S. Appl. No. 11/965,832 dated May 12, 2011.
Office Action for U.S. Appl. No. 11/965,851 dated May 20, 2011.
Bolie et al., "BPEL Cookbook: Best Practices for SOA-based Integration and Composite Applications Development", 2006, Packt Publishing, ISBN 1904811337; Chapter 1; 12 pages.
Juric, et al., Business Process Execution Language for Web Services—An Architect and Developers Guide to Orchestrating Web Services Using BPEL4WS, Second Edition; 2006; Packt Publishing; ISBN 1904811817; Chapter 5; 28 pages.
Horstman et al., Core Java 2: vol. I—Fundamentals (7th Edition); Core Series; 2003; Sun Microsystems, Inc., ISNM 0131472025; pp. 324-327.
Perry, J. Steven, "Java Management Extension: 1st Edition," Jun. 15, 2002; O'Reilly & Associates, Inc.; ISBN 0596002459; Chapter 1 (pp. 1-32) and Chapter 7 (pp. 207-222).
Weerawarana et al., "Web Services Platform Architecture: SOAP, WSDL, WS-Policy, WS-Addressing, WS-BPEL, WS-Reliable Messaging, and More," 2005; Pearson Education, Inc.; ISBN 0131488740; Chapter 14 (pp. 313-340).
Van Bon, Jan, "Foundations of IT Service Management Based on ITIL," Sep. 2005; Van Haren Publishing; ISBN 9077212582; Chapter 6 (pp. 69-85).
Kreger et al., "JAVA and JMX—Building Manageable Systems," Jan. 2003; ISBN 0672324083; pp. 54-64.
Office Action for U.S. Appl. No. 11/965,855 dated Apr. 30, 2010.
Final Office Action for U.S. Appl. No. 11/966,495 dated May 14, 2010.
Office Action for U.S. Appl. No. 11/965,978 dated Jun. 22, 2011.
Office Action for U.S. Appl. No. 11/965,889 dated May 25, 2011.
Final Office Action for U.S. Appl. No. 11/966,619 dated Jun. 15, 2011.
Office Action for U.S. Appl. No. 11/965,899 dated Jun. 20, 2011.
Office Action for U.S. Appl. No. 11/965,877 dated Jun. 20, 2011.
Office Action for U.S. Appl. No. 11/965,862 dated Jul. 8, 2011.
Office Action for U.S. Appl. No. 11/965,917 dated Jul. 11, 2011.
Final Office Action for U.S. Appl. No. 11/965,926 dated Jul. 19, 2011.
Office Action for U.S. Appl. No. 11/965,862 dated Jun. 23, 2010.
Final Office Action for U.S. Appl. No. 11/966,495 dated Jun. 14, 2010.
Office Action for U.S. Appl. No. 11/965,872 dated Jul. 6, 2010.
Evans, James, "Optimization Algorithms for Networks and Graphs, Second Edition", 1992, CCR, ISBN 0824786025, Chapters 1-3 (pp. 1-76) and Chapter 11 (pp. 390-413).
Jolliffe, Ian T., "Principal Component Analysis", 2002, Pringer, ISBN 0387954422, Chapters 1-4 (pp. 1-77), Chapters 6-7 (pp. 111-166) and Chapters 12-14 (pp. 299-405).
Lau, Hang T., "A Java Library of Graph Algorithms and Optimization Discrete Mathematics and Its Applications," 2006, Chapman & Hall, ISBN 1584887184, Chapter 2.2 (pp. 39-43).
Horstmann, Cay S. et al., Core Java 2—vol. II—Advanced Features (7th Edition), Sun Microsystems Press, 2005, ISBN 0131118269, Chapter 1 (pp. 1-22).
"Parasoft BPEL Maestro," hftp://www.parasoft.com/jsp/products/home.jsp?product=BPEL.
Final Office Action for U.S. Appl. No. 11/965,897 dated Sep. 17, 2010.
"BPEL Project", http://www.eclipse.org/bpel/.
"Factor Analysis Using SAS PROC FACTOR", http://www.utexas.edu/cc/docs/stat53.html.

(56) References Cited

OTHER PUBLICATIONS

"Principal Components and Factor Analysis", http://statsoft.com/textbook/stfacan.html.

"WebSphere Intergration Developer", http://www-306.ibm.com/software/integration/wid/about/?S_CMP=rnav.

Final Office Action for U.S. Appl. No. 11/965,922 dated Jul. 29, 2011.
Office Action for U.S. Appl. No. 11/965,845 dated Jul. 29, 2011.
Office Action for U.S. Appl. No. 11/965,832 dated Aug. 23, 2011.
Final Office Action for U.S. Appl. No. 11/965,838 dated Aug. 19, 2011.
Final Office Action for U.S. Appl. No. 11/965,913 dated Aug. 17, 2011.
Office Action for U.S. Appl. No. 11/965,894 dated Jul. 18, 2011.
Office Action for U.S. Appl. No. 11/965,855 dated Oct. 3, 2011.
Office Action for U.S. Appl. No. 11/965,951 dated Oct. 5, 2011.
Final Office Action for U.S. Appl. No. 11/965,851 dated Oct. 28, 2011.
Final Office Action for U.S. Appl. No. 11/965,877 dated Nov. 8, 2011.
Final Office Action for U.S. Appl. No. 11/965,899 dated Nov. 22, 2011.
Final Office Action for U.S. Appl. No. 11/965,917 dated Dec. 21, 2011.
Final Office Action for U.S. Appl. No. 11/965,902 dated Dec. 21, 2011.
Final Office Action for U.S. Appl. No. 11/965,894 dated Dec. 27, 2011.
Office Action for U.S. Appl. No. 11/965,926 dated Mar. 2, 2012.
Final Office Action for U.S. Appl. No. 11/965,951 dated Feb. 22, 2012.
Office Action for U.S. Appl. No. 11/965,872 dated Feb. 16, 2012.
Final Office Action for U.S. Appl. No. 11/965,862 dated Feb. 14, 2012.
Office Action for U.S. Appl. No. 11/966,495 dated Feb. 1, 2012.
Final Office Action for U.S. Appl. No. 11/965,889 dated Jan. 11, 2012.
Final Office Action for U.S. Appl. No. 11/965,832 dated Jan. 9, 2012.
Office Action for U.S. Appl. No. 11/965,874 dated Mar. 19, 2012.
Office Action for U.S. Appl. No. 11/965,845 dated Apr. 18, 2012.
Office Action for U.S. Appl. No. 11/965,922 dated Apr. 20, 2012.
Crawford, C. H. et al., "Toward an on Demand Service-Oriented Architecture," IBM Systems Journal, vol. 44, No. 1, 2005, pp. 81-107.
Office Action for U.S. Appl. No. 11/965,894 dated Jun. 13, 2012.
Final Office Action for U.S. Appl. No. 11/965,889 dated Jun. 20, 2012.
Office Action for U.S. Appl. No. 12/975,520 dated Jul. 18, 2012.
Final Office Action for U.S. Appl. No. 11/965,906 dated Jul. 23, 2012.
Final Office Action for U.S. Appl. No. 11/965,922 dated Aug. 28, 2012.
Office Action for U.S. Appl. No. 11/965,899 dated Aug. 28, 2012.
Final Office Action for U.S. Appl. No. 11/965,845 dated Aug. 29, 2012.
Office Action for U.S. Appl. No. 11/965,862 dated Sep. 26, 2012.
Final Office Action for U.S. Appl. No. 11/965,926 dated Oct. 5, 2012.
Kramer, Jeff et al., "The Evolving Philosophers Problem: Dynamic Change Management," Aug. 1991, pp. 1-33.
Final Office Action for U.S. Appl. No. 11/965,894 dated Oct. 23, 2012.
Final Office Action for U.S. Appl. No. 11/965,889 dated Jan. 11, 2013.
Final Office Action for U.S. Appl. No. 11/965,889 dated Jan. 11, 2013, pp. 1-15.
Final Office Action for U.S. Appl. No. 11/965,899 dated Jan. 29, 2013, pp. 1-17.
Final Office Action for U.S. Appl. No. 11/965,862 dated Apr. 4, 2013, pp. 1-19.
Office Action for U.S. Appl. No. 11/965,838 dated Apr. 30, 2013, pp. 1-30.
Office Action for U.S. Appl. No. 11/965,894 dated May 8, 2013, pp. 1-9.
Final Office Action for U.S. Appl. No. 11/965,838 dated Aug. 9, 2013, pp. 1-19.
Office Action for U.S. Appl. No. 11/965,845 dated Aug. 13, 2013, pp. 1-46.
Office Action for U.S. Serial No. 11/9654,926 dated Aug. 14, 2013, pp. 1-29.
Office Action for U.S. Appl. No. 11/965,922 dated Aug. 14, 2013, pp. 1-35.
Office Action for U.S. Appl. No. 11/965,899 dated Aug. 28, 2013, pp. 1-20.
Notice of Allowance for U.S. Appl. No. 11/965,917 dated Aug. 28, 2013, pp. 1-25.
Notice of Allowance for U.S. Appl. No. 11/965,862 dated Sep. 16, 2013, pp. 1-15.
Hunter, Erwin L., "Recovery from Software Faults in the EWSD Digital Switching System," IEEE International Conference on Communications, May 1994, pp. 1784-1788.
Notice of Allowance for U.S. Appl. No. 11/965,894 dated Nov. 7, 2013, pp. 1-16.
Final Office Action for U.S. Appl. No. 11/965,922 dated Dec. 27, 2013, pp. 1-65.
Charfi, Anis and Mira Mezini, "Aspect-Oriented Workflow Languages," Oct. 2006, pp. 183-200.
Charfi, Anis and Mira Mezini, "Aspect-Oriented Web Service Composition with A04BPEL," 2004 (no further date information available), pp. 168-182.
Lassen, Kristian Bisgaard and Wil M.P. van der Aalst, "WorkflowNet2BPEL4WS: A Tool for Translating Unstructured Workflow Processes to Readable BPEL," Oct. 2006, pp. 127-144.
Karastoyanova, Dimka at al., "Extending BPEL for Run Time Adaptability," Sep. 2005, pp. 15-26.
Mayer, Philip and Daniel Lubke, "Towards a BPEL Unit Testing Framework," Jul. 2006, pp. 33-42.
Notice of Allowance for U.S. Appl. No. 11/965,926 dated Dec. 31, 2013, pp. 1-28.
Notice of Allowance for U.S. Appl. No. 11/965,845 dated Dec. 31, 2013, pp. 1-28.
Notice of Allowance for U.S. Appl. No. 12/975,520 dated Jan. 17, 2014, pp. 1-19.

* cited by examiner

FIG. 6A

| MESSAGE | RESOURCE | DATE | |
|---|---|---|---|
| CONTAINMENT REGION HAS RECOVERED | CONTAINMENT1 | APR 18, 2006 | 10:50:52.193 |
| CONTAINMENT REGION CREATED FOR RESOURCE FAILURE | CONTAINMENT1 | APR 18, 2006 | 10:50:52.103 |
| CONTAINMENT REGION HAS RECOVERED | CONTAINMENT3 | APR 18, 2006 | 10:50:51.982 |
| DETECTED DYNAMIC MEMBERSHIP CHANGE: ACTIVE POLICY REED... | RECOVERYSEGMENT2 | APR 18, 2006 | 10:12:25.696 |
| THIS RESOURCE HAS ENTERED AN UNRECOVERABLE STATE AND RED... | RECOVERY MANAGER2 | APR 18, 2006 | 10:12:25.696 |
| THIS RESOURCE HAS ENTERED AN UNRECOVERABLE STATE AND RED... | RECOVERY MANAGER1 | APR 18, 2006 | 10:12:14.770 |
| ACTIVATION OF POLICY 'XYZ' HAS FAILED | RECOVERY SEGMENT1 | APR 18, 2006 | 10:12:14.760 |
| DETECTED DYNAMIC MEMBERSHIP CHANGE ACTIVE POLICY REED... | RECOVERY SEGMENT2 | APR 18, 2006 | 10:10:25.696 |

THE RESOURCE 'COBER 1 RECOVERY' HAS ENTERED AN UNRECOVERABLE STATE THAT REQUIRES YOUR INPUT. DO YOU WANT TO OPEN THE RESOURCE NOW?

[YES] [NO]

*650*

DETECT ERROR

MANAGEMENT OF RUNTIME EVENTS IN A COMPUTER ENVIRONMENT USING A CONTAINMENT REGION

TECHNICAL FIELD

This invention relates, in general, to managing customer environments to provide support for business resiliency, and in particular, to identifying resources affected by an event and to use that identification in managing a customer's environment.

BACKGROUND OF THE INVENTION

Today, customers attempt to manually manage and align their availability management with their information technology (IT) infrastructure. Changes in either business needs or the underlying infrastructure are often not captured in a timely manner and require considerable rework, leading to an inflexible environment.

Often high availability solutions and disaster recovery technologies are handled via a number of disparate point products that target specific scopes of failure, platforms or applications. Integrating these solutions into an end-to-end solution is a complex task left to the customer, with results being either proprietary and very specific, or unsuccessful.

Customers do not have the tools and infrastructure in place to customize their availability management infrastructure to respond to failures in a way that allows for a more graceful degradation of their environments. As a result, more drastic and costly actions may be taken (such as a site switch) when other options (such as disabling a set of applications or users) could have been offered, depending on business needs.

Coordination across availability management and other systems management disciplines is either nonexistent or accomplished via non-reusable, proprietary, custom technology.

There is little predictability as to whether the desired recovery objective will be achieved, prior to time of failure. There are only manual, labor intensive techniques to connect recovery actions with the business impact of failures and degradations.

Any change in the underlying application, technologies, business recovery objectives, resources or their interrelationships require a manual assessment of impact to the hand-crafted recovery scheme.

SUMMARY OF THE INVENTION

Based on the foregoing, a need exists for a capability that facilitates management of an IT environment. In particular, a need exists for a capability that identifies resources affected by an event and uses that identification to manage one or more aspects of the environment. In one example, a Containment Region is used in identifying the resources.

The shortcomings of the prior art are overcome and additional advantages are provided through the provision of a computer-implemented method of facilitating management of an Information Technology (IT) environment. The method includes, for instance, determining a plurality of resources to be included in a resource set, the determining using resource relationship information that is based on real-time characteristics of the IT environment, and wherein the resource set includes one or more resources impacted by occurrence of an event in the IT environment and one or more resources contributing to the event; and using the resource set to manage one or more aspects of the IT environment.

Computer program products and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts one example of a notification view indicating a plurality of notifications, in accordance with an aspect of the present invention;

FIG. 6B depicts one example of a notification message sent to a user, in accordance with an aspect of the present invention;

DETAILED DESCRIPTION OF THE INVENTION

Figure 1:
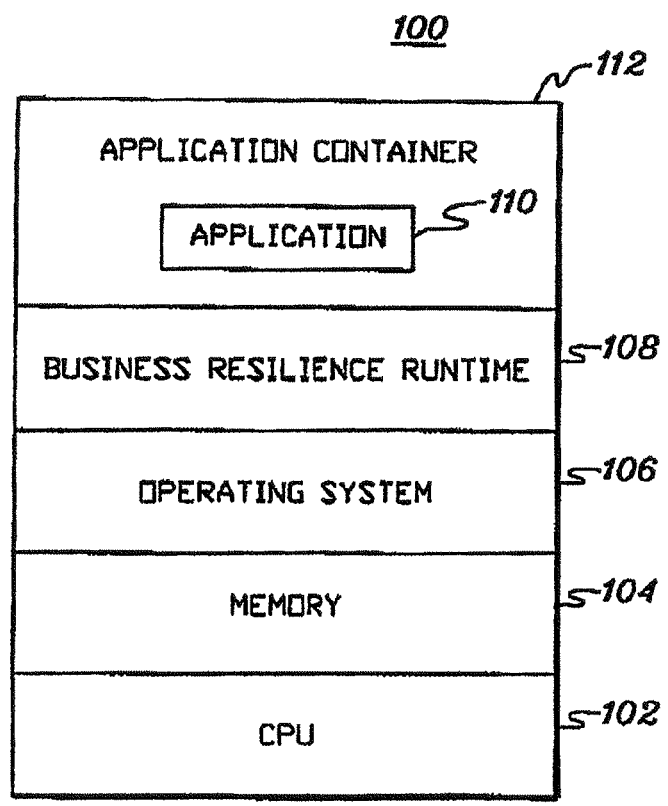
FIG. 1 depicts one embodiment of a processing environment to incorporate and use one or more aspects of the present invention.

In managing a customer's environment, such as its business environment, there is a set of requirements unaddressed by existing technology, which causes unpredictable down time, large impact failures and recoveries, and significant extra labor cost, with resulting loss of business revenue. These requirements include, for instance:

1. Ensuring that there is a consistent recovery scheme across the environment, linked to the business application, across the different types of resources; not a different methodology performed by platform silo. The recovery is to match the scope of the business application, not limited in scope to a single platform. The recovery is to be end-to-end and allow for interaction across multiple vendor products. In one example, a business application is defined as a process that is supported by IT services. It is supportive of the products and/or services created by a customer. It can be of fine granularity (e.g., a specific service/product provided) or of coarse granularity (e.g., a group of services/products provided).
2. Ability to group together mixed resource types (servers, storage, applications, subsystems, network, etc.) into logical groupings aligned with business processes requirements for availability.
3. Ability to share resources across logical groups of resources; ability to nest these logical group definitions, with specifications for goal policy accepted and implemented at each level.
4. Pre-specified recommendations for resource groupings, with customization possible, and pattern matching customer configuration with vendor or customer provided groupings/relationships—to avoid requiring customers to start from scratch for definitions.
5. Ability to group together redundant resources with functional equivalence—use during validation when customer has less redundancy than required to meet the Recovery Time Objective (RTO) goal; in recovery to select an alternate resource for one that has failed.
6. Ability to configure the definition of what constitutes available, degraded, or unavailable based on customer's own sensitivity for a given grouping of resources, and business needs, and further aggregate the state across various resources to produce an overall state for the business application. The state is to be assessed real time, based on what is actually occurring in the system at the time, rather than fixed definitions. In some cases, a performance slowdown might flag a degraded environment, and in other cases, a failure may be necessary before flagging a degraded or unavailable environment. The definitions of available, degraded and unavailable are to be consumed by an availability system that evaluates them in the context of a policy, and then determines appropriate action, including possibly launching recovery automatically.
7. Ability to relate the redundancy capability of relevant resources to the availability status of a business application.
8. Allow customers to configure when recovery actions can be delegated to lower level resources, particularly since resource sharing is becoming more relevant in many customer environments.
9. Include customer or vendor best practices for availability as prespecified workflows, expressed in a standards based manner, that can be customized.
10. Ability to specify quantitative business goals for the recovery of logical groupings of resources, effecting both how the resources are pre-configured for recovery, as well as recovered during errors. One such quantitative goal is Recovery Time Objective (RTO). As part of the specification of quantitative business goals, to be able to include time bias of applications, and facilitate the encoding of appropriate regulatory requirements for handling of certain workloads during changing business cycles in selected businesses, such as financial services.
11. Decomposition of the overall quantified RTO goal to nested logical groups; processing for shared groups having different goals.
12. Ability to configure redundancy groupings and colocation requirements with resources from other vendors, using a representation for resources (which may be, for example, standards based), with ability to clearly identify the vendor as part of the resource definition.
13. Ability to use customer's own historical system measures to automatically generate various system environments, then use these system environments when specifying quantitative recovery goals (since recovery time achievability and requirements are not consistent across time of day, business cycle, etc.). The function is to be able to incorporate historical information from dependent resources, as part of the automatic generation of system environments.
14. Specification of statistical thresholds for acceptability of using historical information; customer specification directly of expected operation times and directive to use customer specified values.
15. Environments are matched to IT operations and time of day, with automatic processing under a new system environment at time boundaries—no automatic internal adjustment of RTO is to be allowed, rather changed if the customer has specified that a different RTO is needed for different system environments.
16. Goal Validation—Prior to failure time. Ability to see assessment of achievable recovery time, in, for instance, a Gantt chart like manner, detailing what is achievable for each resource and taking into account overlaps of recovery sequences, and differentiating by system environment. Specific use can be during risk assessments, management requests for additional recovery related resources, mitigation plans for where there are potentials for RTO miss. Example customer questions:
    What is my expected recovery time for a given application during "end of month close" system environment?
    What is the longest component of that recovery time?
    Can I expect to achieve the desired RTO during the "market open" for stock exchange or financial services applications?

What would be the optimal sequence and parallelization of recovery for the resources used by my business application?

17. Ability to prepare the environment to meet the desired quantitative business goals, allowing for tradeoffs when shared resources are involved. Ensure that both automated and non-automated tasks can be incorporated into the pre-conditioning. Example of customer question: What would I need to do for pre-conditioning my system to support the RTO goal I need to achieve for this business application?
18. Ability to incorporate operations from any vendors' resources for pre-conditioning or recovery workflows, including specification of which pre-conditioning operations have effect on recoveries, which operations have dependencies on others, either within vendor resources or across resources from multiple vendors,
19. Customer ability to modify pre-conditioning workflows, consistent with supported operations on resources.
20. Ability to undo pre-conditioning actions taken, when there is a failure to complete a transactionally consistent set of pre-conditioning actions; recognize the failure, show customers the optional workflow to undo the actions taken, allow them to decide preferred technique for reacting to the failure—manual intervention, running undo set of operations, combination of both, etc.
21. Ability to divide pre-conditioning work between long running and immediate, nondisruptive short term actions.
22. Impact only the smallest set of resources required during recovery, to avoid negative residual or side effects for attempting to recover a broader set of resources than what is actually impacted by the failure.
23. Choosing recovery operations based on determination of which recovery actions address the minimal impact, to meet goal, and then prepare for subsequent escalation in event of failure of initial recovery actions.
24. Choosing a target for applications and operating systems (OS), based on customer co-location specifications, redundancy groups, and realtime system state.
25. Ability for customer to indicate specific effect that recovery of a given business process can have on another business process—to avoid situations where lower priority workloads are recovered causing disruption to higher priority workloads; handling situations where resources are shared.
26. Ability to prioritize ongoing recovery processing over configuration changes to an availability system, and over any other administration functions required for the availability system.
27. Ability for recoveries and pre-conditioning actions to run as entire transactions so that partial results are appropriately accounted for and backed out or compensated, based on actual effect (e.g., during recovery time or even pre-conditioning, not all actions may succeed, so need to preserve a consistent environment).
28. Allow for possible non-responsive resources or underlying infrastructure that does not have known maximum delays in response time in determining recovery actions, while not going beyond the allotted recovery time.
29. Allow customer to change quantified business recovery goals/targets without disruption to the existing recovery capability, with appropriate labeling of version of the policy to facilitate interaction with change management systems.
30. Allow customers to change logical groupings of resources that have assigned recovery goals, without disruption to the existing recovery capability, with changes versioned to facilitate interaction with change management systems.
31. Ability to specify customizable human tasks, with time specifications that can be incorporated into the goal achievement validation so customers can understand the full time involved for a recovery and where focusing on IT and people time is critical to reducing RTO.
32. There is a requirement/desire to implement dynamically modified redundancy groupings for those resources which are high volume—automatic inclusion based on a specified set of characteristics and a matching criteria.
33. There is a requirement/desire to automatically add/delete resources from the logical resource groupings for sets of resources that are not needing individual assessment.

The above set of requirements is addressed, however, by a Business Resiliency (BR) Management System, of which one or more aspects of the present invention are included. The Business Resiliency Management System provides, for instance:

1. Rapid identification of fault scope.
   Correlation and identification of dependencies between business functions and the supporting IT resources.
   Impact analysis of failures affecting business functions, across resources used within the business functions, including the applications and data.
   Isolation of failure scope to smallest set of resources, to ensure that any disruptive recovery actions effect only the necessary resources.
2. Rapid granular and graceful degradation of IT service.
   Discontinuation of services based on business priorities.
   Selection of alternate resources at various levels may include selection of hardware, application software, data, etc.
   Notifications to allow applications to tailor or reduce service consumption during times of availability constraints.
3. Integration of availability management with normal business operations and other core business processes.
   Policy controls for availability and planned reconfiguration, aligned with business objectives.
   Encapsulation, integration of isolated point solutions into availability IT fabric, through identification of affected resources and operations initiated by the solutions, as well as business resiliency.
   Goal based policy support, associated with Recovery Segments that may be overlapped or nested in scope.
   Derivation of data currency requirements, based on business availability goals.

One goal of the BR system is to allow customers to align their supporting information technology systems with their business goals for handling failures of various scopes, and to offer a continuum of recovery services from finer grained process failures to broader scoped site outages. The BR system is built around the idea of identifying the components that constitute a business function, and identifying successive levels of recovery that lead to more complex constructs as the solution evolves. The various recovery options are connected by an overall BR management capability that is driven by policy controls.

Various characteristics of one embodiment of a BR system include:
1. Capability for dynamic generation of recovery actions, into a programmatic and manageable entity.
2. Dynamic generation of configuration changes required/desired to support a customer defined Recovery Time Objective (RTO) goal.
3. Dynamic definition of key Pattern System Environments (PSEs) through statistical analysis of historical observations.
4. Validation of whether requested RTO goals are achievable, based on observed historical snapshots of outages or customer specified recovery operation time duration, in the context of key Pattern System Environments.
5. BR system dynamic, automatic generation and use of standards based Business Process Execution Language (BPEL) workflows to specify recovery transactions and allow for customer integration through workflow authoring tools.
6. Ability to configure customized scopes of recovery, based on topologies of resources and their relationships, called Recovery Segments (RSs).
7. Best practice workflows for configuration and recovery, including, but not limited to, those for different resource types: servers, storage, network, and middleware, as examples.
8. Ability to customize the definition of available, degraded, unavailable states for Recovery Segments.
9. Ability to represent customers' recommended configurations via best practice templates.
10. Ability to define the impact that recovery of one business application is allowed to have on other business applications.
11. Ability to correlate errors from the same or multiple resources into related outages and perform root cause analysis prior to initiating recovery actions.
12. Quantified policy driven, goal oriented management of unplanned outages.
13. Groupings of IT resources that have associated, consistent recovery policy and recovery actions, classified as Recovery Segments.
14. Handling of situations where the underlying error detection and notifications system itself is unavailable.

A Business Resilience System is capable of being incorporated in and used by many types of environments. One example of a processing environment to incorporate and use aspects of a BR system, including one or more aspects of the present invention, is described with reference to FIG. 1.

Processing environment 100 includes, for instance, a central processing unit (CPU) 102 coupled to memory 104 and executing an operating system 106. Examples of operating systems include AIX® and z/OS®, offered by International Business Machines Corporation; Linux; etc. AIX® and z/OS® are registered trademarks of International Business Machines Corporation, Armonk, N.Y., U.S.A. Other names used herein may be registered trademarks, trademarks or product names of International Business Machines Corporation or other companies.

The operating system manages execution of a Business Resilience Runtime Component 108 of a Business Resilience System, described herein, and one or more applications 110 of an application container 112.

As examples, processing environment 100 includes an IBM® System z™ processor or a pSeries® server offered by International Business Machines Corporation; a Linux server; or other servers, processors, etc. Processing environment 100 may include more, less and/or different components than described herein. (pSeries® is a registered trademark of International Business Machines Corporation, Armonk, N.Y., USA.)

Figure 2:
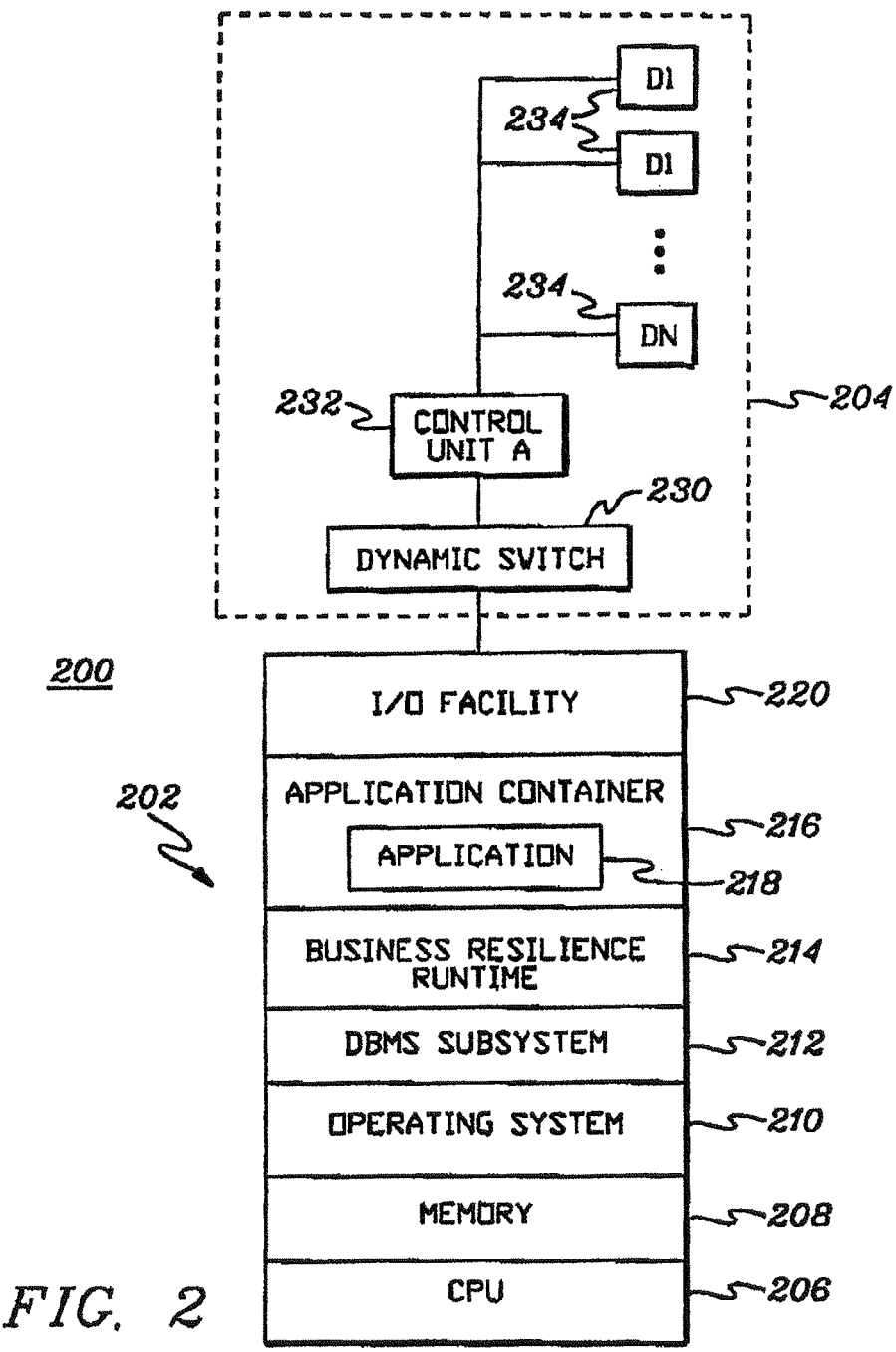
FIG. 2 depicts another embodiment of a processing environment to incorporate and use one or more aspects of the present invention.

Another example of a processing environment to incorporate and use aspects of a BR System, including one or more aspects of the present invention, is described with reference to FIG. 2.

As shown, a processing environment 200 includes for instance, a central processing complex 202 coupled to an input/output (I/O) subsystem 204. Central processing complex 202 includes, for instance, a central processing unit 206, memory 208, an operating system 210, a database management system 212, a Business Resilience Runtime Component 214, an application container 216 including one or more applications 218, and an I/O facility 220.

I/O facility 220 couples central processing complex 202 to I/O subsystem 204 via, for example, a dynamic switch 230. Dynamic switch 230 is coupled to a control unit 232, which is further coupled to one or more I/O devices 234, such as one or more direct access storage devices (DASD).

Processing environments 100 and/or 200 may include, in other embodiments, more, less and/or different components.

Figure 3:
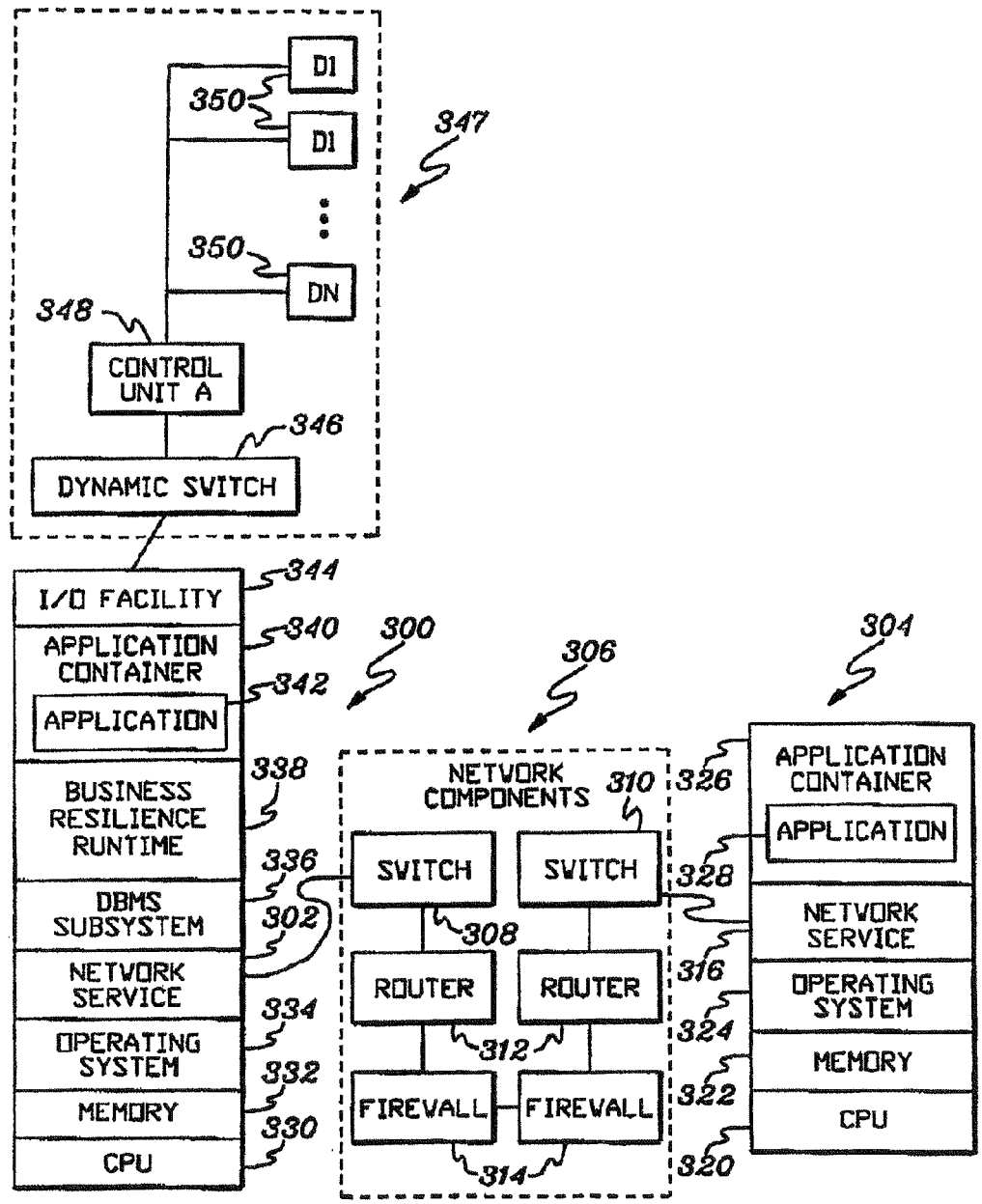
FIG. 3 depicts yet a further embodiment of a processing environment to incorporate and use one or more aspects of the present invention.

In yet another embodiment, a central processing complex 300 (FIG. 3) further includes a network service 302, which is used to couple a central processing complex 300 to a processing environment 304 via a network subsystem 306.

For example, network service 302 of central processing complex 300 is coupled to a switch 308 of network subsystem 306. Switch 308 is coupled to a switch 310 via routers 312 and firewalls 314. Switch 310 is further coupled to a network service 316 of processing environment 304.

Processing environment 304 further includes, for instance, a central processing unit 320, a memory 322, an operating system 324, and an application container 326 including one or more applications 328. In other embodiments, it can include more, less and/or different components.

Moreover, CPC 300 further includes, in one embodiment, a central processing unit 330, a memory 332, an operating system 334, a database management system 336, a Business Resilience Runtime Component 338, an application container 340 including one or more applications 342, and an I/O facility 344. It also may include more, less and/or different components.

I/O facility 344 is coupled to a dynamic switch 346 of an I/O subsystem 347. Dynamic switch 346 is further coupled to a control unit 348, which is coupled to one or more I/O devices 350.

Although examples of various environments are provided herein, these are only examples. Many variations to the above environments are possible and are considered within the scope of the present invention.

In the above-described environments, a Business Resilience Runtime Component of a Business Resilience System is included. Further details associated with a Business Resilience Runtime Component and a Business Resilience System are described with reference to FIG. 4.

In one example, a Business Resilience System 400 is a component that represents the management of recovery operations and configurations across an IT environment. Within that Business Resilience System, there is a Business Resilience Runtime Component (402) that represents the management functionality across multiple distinct Recovery Segments, and provides the service level automation and the support of creation of the recovery sequences. In addition, there are user interface (404), administration (406), installation (408) and configuration template (410) components within the Business Resilience System that enable the administrative operations that are to be performed. Each of these components is described in further detail below.

Business Resilience Runtime Component 402 includes a plurality of components of the BR System that are directly responsible for the collection of observations, creation of PSEs, policy acceptance, validation, error detection, and formulation of recovery sequences. As one example, Business Resilience Runtime Component 402 includes the following components:

1. One or more Business Resilience Managers (BRM) (412).

The Business Resilience Manager (BRM) is the primary component containing logic to detect potential errors in the IT environment, perform assessment to find resources causing errors, and formulate recovery sequences to reestablish the desired state for resources for all Recovery Segments that may be impacted.

The Business Resilience Manager is a component of which there can be one or more. It manages a set of Recovery Segments, and has primary responsibility to formulate recovery sequences. The association of which Recovery Segments are managed by a given BRM is determined at deployment time by the customer, with the help of deployment time templates. BRMs are primarily responsible for operations that relate to error handling and recovery workflow generation, and cross RS interaction.

2. One or more Recovery Segments (RS) (414).

Recovery Segments are customer-defined groupings of IT resources to which consistent availability policy is assigned. In other words, a Recovery Segment acts as a context within which resource recovery is performed. In many cases, Recovery Segments are compositions of IT resources that constitute logical entities, such as a middleware and its related physical resources, or an "application" and its related components.

There is no presumed granularity of a Recovery Segment. Customers can choose to specify fine-grained Recovery Segments, such as one for a given operating system, or a coarser grained Recovery Segment associated with a business process and its component parts, or even a site, as examples.

Relationships between IT resources associated with a RS are those which are part of the IT topology.

Recovery Segments can be nested or overlapped. In case of overlapping Recovery Segments, there can be policy associated with each RS, and during policy validation, conflicting definitions are reconciled. Runtime assessment is also used for policy tradeoff.

The Recovery Segment has operations which support policy expression, validation, decomposition, and assessment of state.

The number of Recovery Segments supported by a BR System can vary, depending on customer configurations and business needs.

One BRM can manage multiple Recovery Segments, but a given RS is managed by a single BRM. Further, Recovery Segments that share resources, or are subset/superset of other Recovery Segments are managed by the same BRM, in this example. Multiple BRMs can exist in the environment, depending on performance, availability, and/or maintainability characteristics.

3. Pattern System Environments (PSEs) (416).

Pattern System Environments (PSEs) are representations of a customer's environment. Sets of observations are clustered together using available mathematical tooling to generate the PSEs. In one embodiment, the generation of a PSE is automatic. A PSE is associated with a given RS, but a PSE may include information that crosses RSs.

As one example, the representation is programmatic in that it is contained within a structure from which information can be added/extracted.

4. Quantified Recovery Goal (418).

A quantified recovery goal, such as a Recovery Time Objective (RTO), is specified for each Recovery Segment that a customer creates. If customers have multiple Pattern System Environments (PSEs), a unique RTO for each PSE associated with the RS may be specified.

5. Containment Region (CR) (420).

Containment Region(s) are components of the BR System which are used at runtime to reflect the scope and impact of an outage. A Containment Region includes, for instance, identification for a set of impacted resources, as well as BR specific information about the failure/degraded state, as well as proposed recovery. CRs are associated with a set of impacted resources, and are dynamically constructed by BR in assessing the error.

The original resources reporting degraded availability, as well as the resources related to those reporting degraded availability, are identified as part of the Containment Region. Impacted resources are accumulated into the topology by traversing the IT relationships and inspecting the attributes defined to the relationships. The Containment Region is transitioned to an inactive state after a successful recovery workflow has completed, and after all information (or a selected subset in another example) about the CR has been logged.

6. Redundancy Groups (RG) (422).

Redundancy Group(s) (422) are components of the BR System that represent sets of logically equivalent services that can be used as alternates when a resource experiences failure or degradation. For example, three instances of a database may form a redundancy group, if an application server requires connectivity to one of the set of three, but does not specify one specific instance.

There can be zero or more Redundancy Groups in a BR System.

Redundancy Groups also have an associated state that is maintained in realtime, and can contribute to the definition of what constitutes available, degraded, or unavailable states. In addition, Redundancy Groups members are dynamically and automatically selected by the BR System, based on availability of the member and co-location constraints.

7. BR Manager Data Table (BRMD) (424).

BR maintains specific internal information related to various resources it manages and each entry in the BR specific Management Data (BRMD) table represents such a record of management. Entries in the BRMD represent IT resources.

8. BR Manager Relationship Data Table (BRRD) (426).

BR maintains BR specific internal information related to the pairings of resources it needs to interact with, and each entry in the BR specific Relationship Data (BRRD) table represents an instance of such a pairing. The pairing record identifies the resources that participate in the pairing, and resources can be any of those that appear in the BRMD above. The BRRD includes information about the pairings, which include operation ordering across resources, failure and degradation impact across resources, constraint specifications for allowable recovery actions, effect an operation has on resource state, requirements for resource to co-locate or anti-co-locate, and effects of preparatory actions on resources.

9. BR Asynchronous Distributor (BRAD) (428).

The BR Asynchronous Distributor (BRAD) is used to handle asynchronous behavior during time critical queries for resource state and key properties, recovery, and for getting observations back from resources for the observation log.

10. Observation Log (430).

The Observation Log captures the information that is returned through periodic observations of the environment. The information in the Observation Log is used by cluster tooling to generate Pattern System Environments (PSE).

11. RS Activity Log (432).

Each RS has an activity log that represents the RS actions, successes, failures. Activity logs are internal BR structures. Primarily, they are used for either problem determination purposes or at runtime, recovery of failed BR components. For example, when the RS fails and recovers, it reads the Activity Log to understand what was in progress at time of failure, and what needs to be handled in terms of residuals.

12. BRM Activity Log (434).

The BRM also has an activity log that represents BRM actions, success, failures. Activity logs are internal BR structures.

13. Transaction Table (TT) (436).

The transaction table is a serialization mechanism used to house the counts of ongoing recovery and preparatory operations. It is associated with the RS, and is referred to as the RS TT.

In addition to the Business Resilience Runtime Component of the BR system, the BR system includes the following components, previously mentioned above.

User Interface (UI) Component (404).

The User interface component is, for instance, a graphical environment through which the customer's IT staff can make changes to the BR configuration. As examples: create and manage Recovery Segments; specify recovery goals; validate achievability of goals prior to failure time; view and alter BR generated workflows.

The user interface (UI) is used as the primary interface for configuring BR. It targets roles normally associated with a Business Analyst, Solution Architect, System Architect, or Enterprise Architect, as examples.

One purpose of the BR UI is to configure the BR resources. It allows the user to create BR artifacts that are used for a working BR runtime and also monitors the behaviors and notifications of these BR resources as they run. In addition, the BR UI allows interaction with resources in the environment through, for instance, relationships and their surfaced properties and operations. The user can add resources to BR to affect recovery and behaviors of the runtime environment.

The BR UI also surfaces recommendations and best practices in the form of templates. These are reusable constructs that present a best practice to the user which can then be approved and realized by the user.

Interaction with the BR UI is based on the typical editor save lifecycle used within, for instance, the developmental tool known as Eclipse (available and described at www.Eclipse.org). The user typically opens or edits an existing resource, makes modifications, and those modifications are not persisted back to the resource until the user saves the editor.

Predefined window layouts in Eclipse are called perspectives. Eclipse views and editors are displayed in accordance with the perspective's layout, which can be customized by the user. The BR UI provides a layout as exemplified in the screen display depicted in FIG. 5A.

Figure 5A:
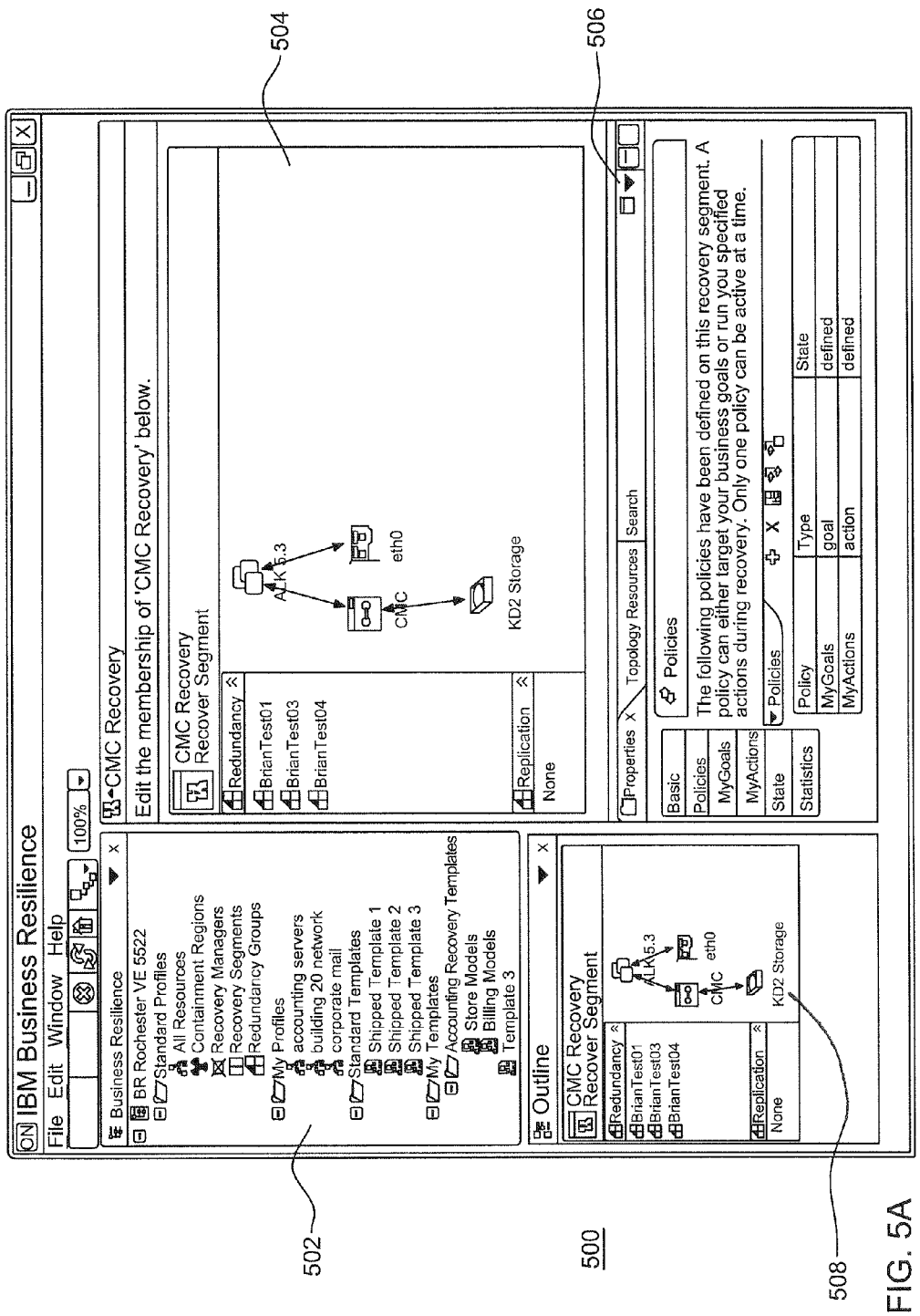
FIG. 5A depicts one example of a screen display of a business resilience perspective, in accordance with an aspect of the present invention.

Screen display 500 depicted in FIG. 5A displays one example of a Business Resilience Perspective. Starting in the upper left corner and rotating clockwise, the user interface includes, for instance:

1. Business Resilience View 502

This is where the user launches topologies and definition templates for viewing and editing.

2. Topology/Definition Template Editor 504

This is where the editors are launched from the Business Resilience View display. The user can have any number of editors open at one time.

3. Properties View/Topology Resources View/Search View 506

The property and topology resource views are driven off the active editor. They display information on the currently selected resource and allow the user to modify settings within the editor.

4. Outline View 508

This view provides a small thumbnail of the topology or template being displayed in the editor. The user can pan around the editor quickly by moving the thumbnail.

Figure 5B:
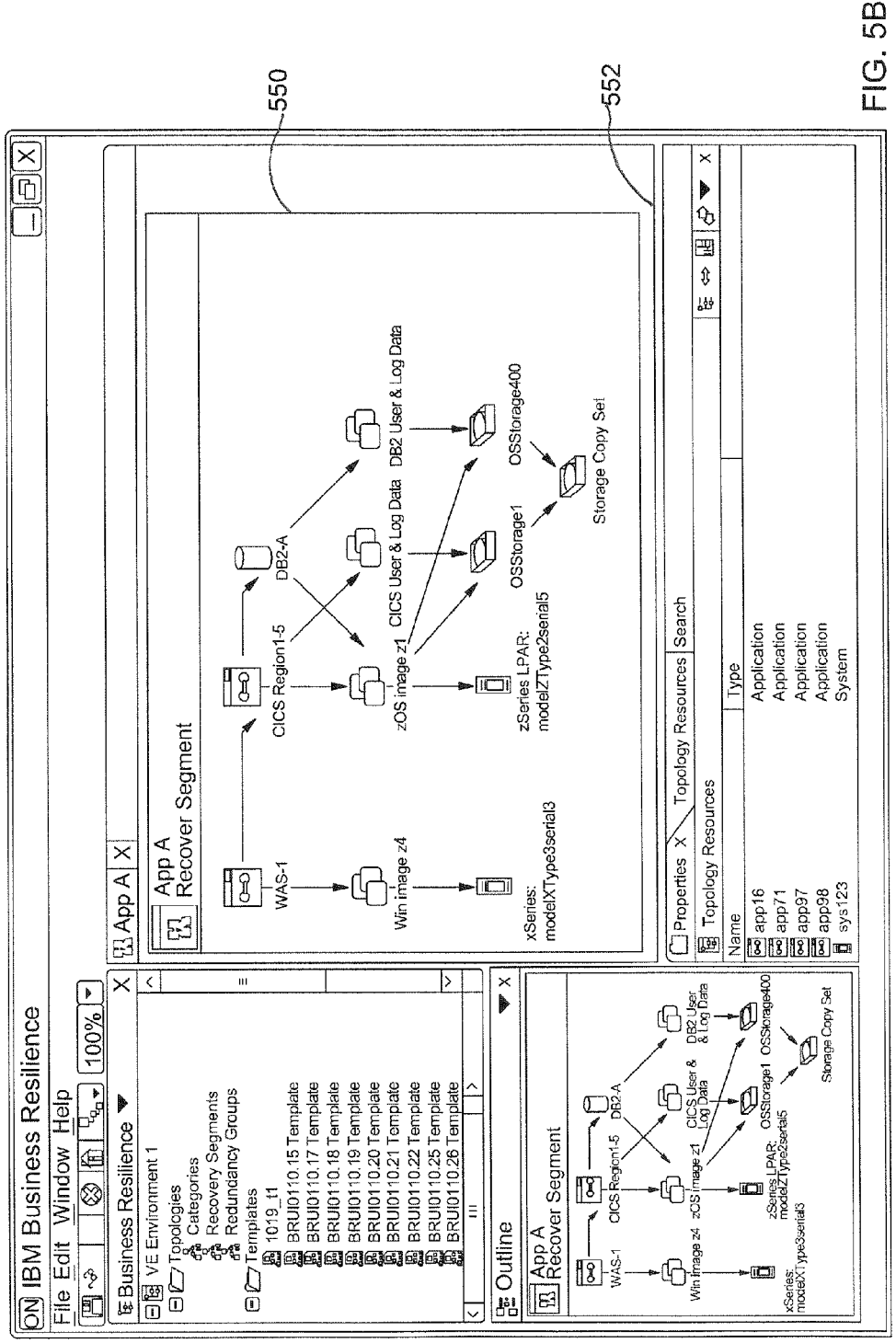
FIG. 5B depicts one example of a screen display of a Recovery Segment, in accordance with an aspect of the present invention.

The topology is reflected by a RS, as shown in the screen display of FIG. 5B. In FIG. 5B, a Recovery Segment 550 is depicted, along with a list of one or more topology resources 552 of the RS (not necessarily shown in the current view of the RS).

In one example, the BR UI is created on the Eclipse Rich Client Platform (RCP), meaning it has complete control over the Eclipse environment, window layouts, and overall behavior. This allows BR to tailor the Eclipse platform and remove Eclipse artifacts not directly relevant to the BR UI application, allowing the user to remain focused, while improving usability.

BR extends the basic user interface of Eclipse by creating software packages called "plugins" that plug into the core Eclipse platform architecture to extend its capabilities. By implementing the UI as a set of standard Eclipse plug-ins, BR has the flexibility to plug into Eclipse, WebSphere Integration Developer, or Rational product installs, as examples. The UI includes two categories of plug-ins, those that are BR specific and those that are specific to processing resources in the IT environment. This separation allows the resource plug-ins to be potentially re-used by other products.

By building upon Eclipse, BR has the option to leverage other tooling being developed for Eclipse. This is most apparent in its usage of BPEL workflow tooling, but the following packages and capabilities are also being leveraged, in one embodiment, as well:

The Eclipse platform provides two graphical toolkit packages, GEF and Draw2D, which are used by BR, in one example, to render topology displays and handle the rather advanced topology layouts and animations. These packages are built into the base Eclipse platform and provide the foundation for much of the tooling and topology user interfaces provided by this design.

The Eclipse platform allows building of advanced editors and forms, which are being leveraged for BR policy and template editing. Much of the common support needed for editors, from the common save lifecycle to undo and redo support, is provided by Eclipse.

The Eclipse platform provides a sophisticated Welcome and Help system, which helps introduce and helps users to get started configuring their environment. Likewise, Eclipse provides a pluggable capability to create task instructions, which can be followed step-by-step by the user to accomplish common or difficult tasks.

Figure 4:
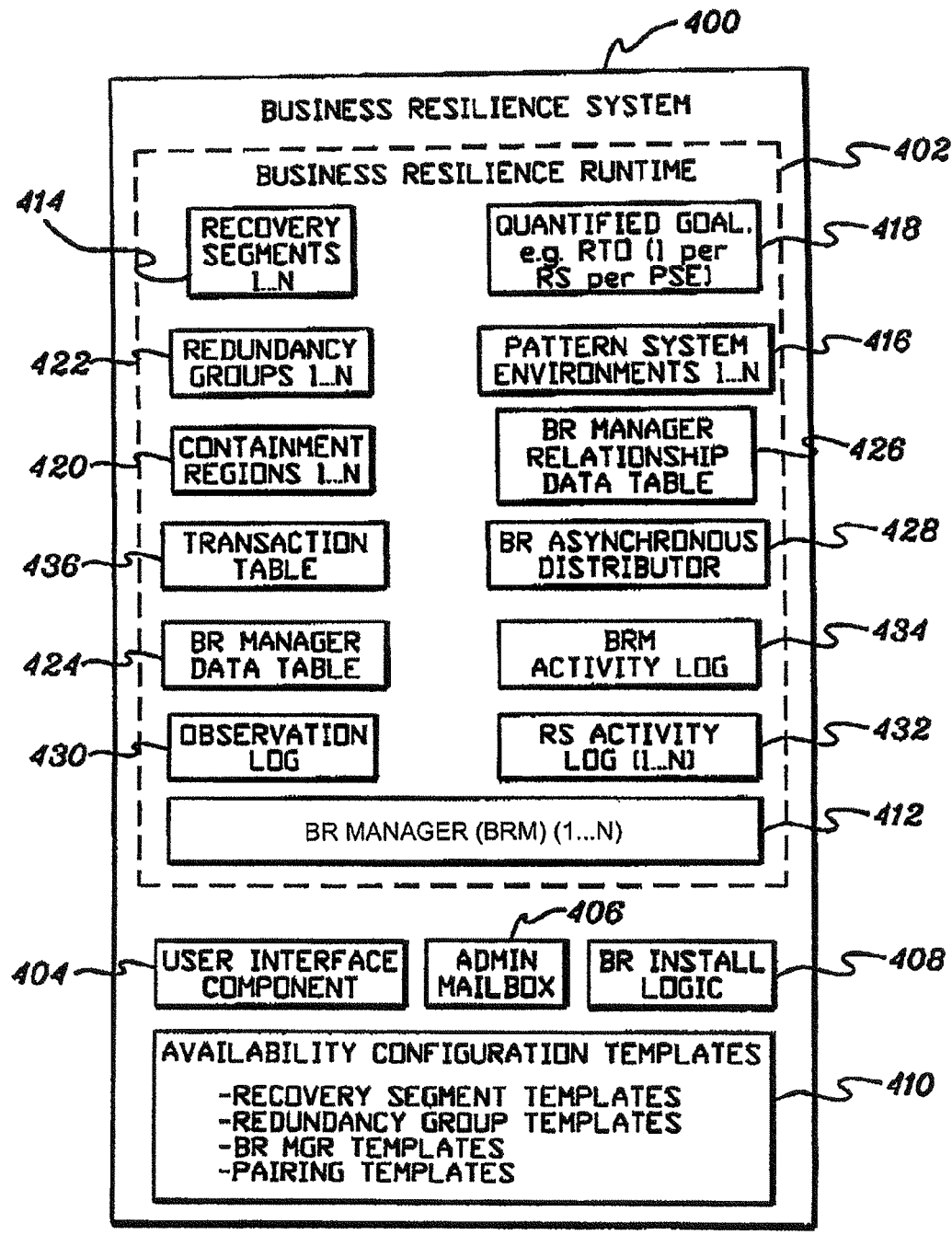
FIG. 4 depicts one embodiment of a Business Resilience System used in accordance with an aspect of the present invention.

BR Admin Mailbox (406) (FIG. 4).

The BR Admin (or Administrative) Mailbox is a mechanism used by various flows of the BR runtime to get requests to an administrator to take some action. The Admin mailbox periodically retrieves information from a table, where BR keeps an up-to-date state.

As an example, the Admin Mailbox defines a mechanism where BR can notify the user of important events needing user attention or at least user awareness. The notifications are stored in the BR database so they can be recorded while the UI is not running and then shown to the user during their next session.

The notifications are presented to the user, in one example, in their own Eclipse view, which is sorted by date timestamp to bubble the most recent notifications to the top. An example of this view is shown in FIG. 6A. As shown, a view 600 is presented that includes messages 602 relating to resources 604. A date timestamp 606 is also included therewith.

Double clicking a notification opens an editor on the corresponding resource within the BR UI, which surfaces the available properties and operations the user may need to handle the notification.

The user is able to configure the UI to notify them whenever a notification exceeding a certain severity is encountered. The UI then alerts 650 the user of the notification and message when it comes in, as shown in FIG. 6B, in one example.

When alerted, the user can choose to open the corresponding resource directly. If the user selects No, the user can revisit the message or resource by using the above notification log view.

BR Install Logic (408) (FIG. 4).

The BR Install logic initializes the environment through accessing the set of preconfigured template information and vendor provided tables containing resource and relationship information, then applying any customizations initiated by the user.

Availability Configuration Templates (410):

Recovery Segment Templates

The BR System has a set of Recovery Segment templates which represent common patterns of resources and relationships. These are patterns matched with each individual customer environment to produce recommendations for RS definitions to the customer, and offer these visually for customization or acceptance.

Redundancy Group Templates

The BR System has a set of Redundancy Group templates which represent common patterns of forming groups of redundant resources. These are optionally selected and pattern matched with each individual customer environment to produce recommendations for RG definitions to a customer.

BR Manager Deployment Templates

The BR System has a set of BR Manager Deployment templates which represent recommended configurations for deploying the BR Manager, its related Recovery Segments, and the related BR management components. There are choices for distribution or consolidation of these components. Best practice information is combined with optimal availability and performance characteristics to recommend a configuration, which can then be subsequently accepted or altered by the customer.

Pairing Templates

The BR System has a set of Pairing Templates used to represent best practice information about which resources are related to each other.

The user interface, admin mailbox, install logic and/or template components can be part of the same computing unit executing BR Runtime or executed on one or more other distributed computing units.

To further understand the use of some of the above components and their interrelationships, the following example is offered. This example is only offered for clarification purposes and is not meant to be limiting in any way.

Figure 7:
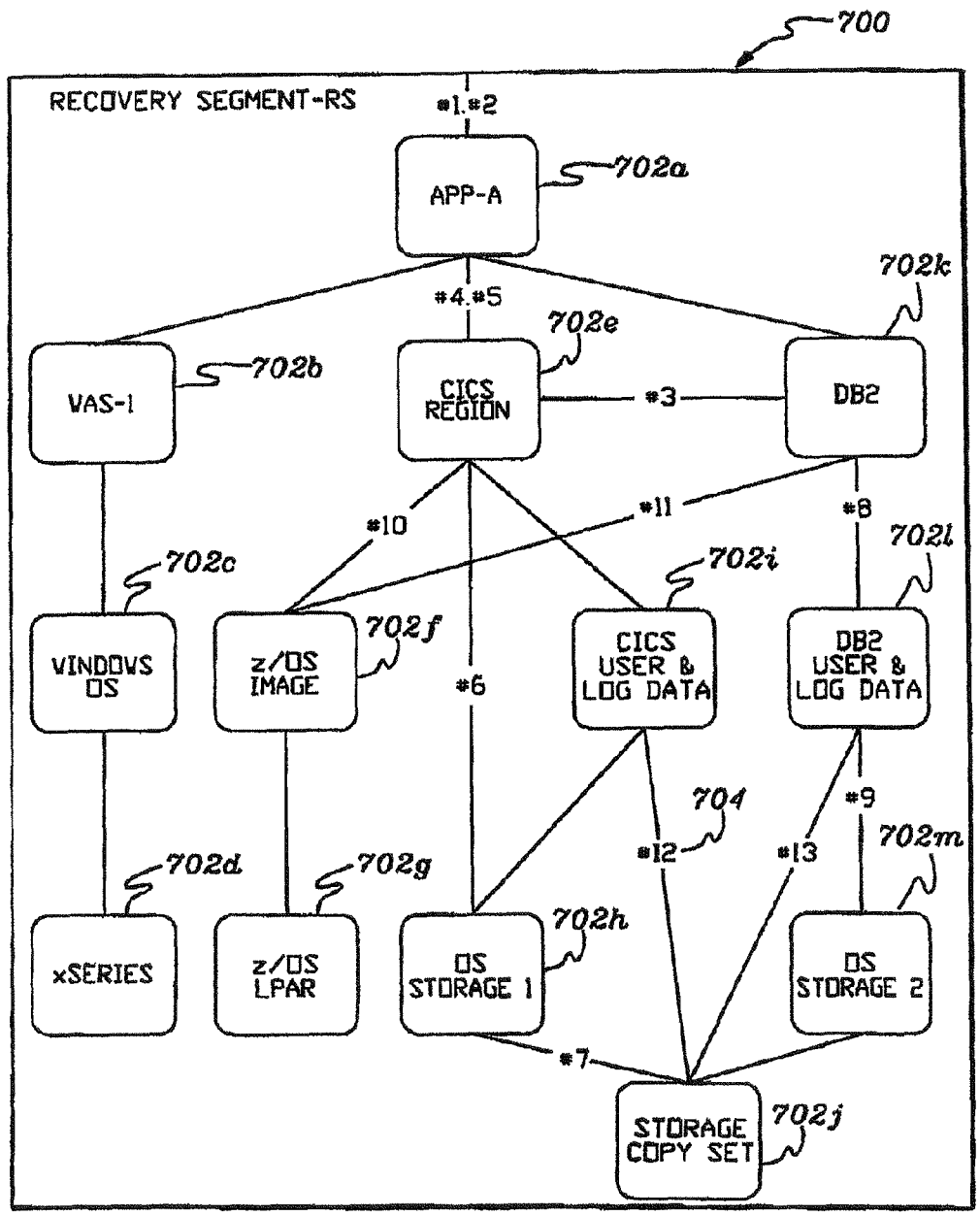
FIG. 7 depicts one example of a Recovery Segment of the Business Resilience System of FIG. 4, in accordance with an aspect of the present invention.

Referring to FIG. 7, a Recovery Segment RS 700 is depicted. It is assumed for this Recovery Segment that:

The Recovery Segment RS has been defined associated with an instantiated and deployed BR Manager for monitoring and management.

Relationships have been established between the Recovery Segment RS and the constituent resources 702a-702m.

A goal policy has been defined and validated for the Recovery Segment through interactions with the BR UI.

The following impact pairings have been assigned to the resources and relationships:

| Rule | Resource #1 | State | Resource #2 | State |
|---|---|---|---|---|
| 1 | App-A | Degraded | RS | Degraded |
| 2 | App-A | Unavailable | RS | Unavailable |
| 3 | DB2 | Degraded | CICS | Unavailable |
| 4 | CICS | Unavailable | App-A | Unavailable |
| 5 | CICS | Degraded | App-A | Degraded |
| 6 | OSStorage-1 | Unavailable | CICS | Degraded |
| 7 | OSStorage-1 | Unavailable | Storage Copy Set | Degraded |
| 8 | DB2 User & Log Data | Degraded | DB2 | Degraded |
| 9 | OSStorage-2 | Unavailable | DB2 User & Log Data | Degraded |
| 10 | z/OS | Unavailable | CICS | Unavailable |
| 11 | z/OS | Unavailable | DB2 | Unavailable |
| 12 | Storage Copy Set | Degraded | CICS User & Log Data | Degraded |
| 13 | Storage Copy Set | Degraded | DB2 User & Log Data | Degraded |

The rules in the above table correspond to the numbers in the figure. For instance, #12 (704) corresponds to Rule 12 above.

Observation mode for the resources in the Recovery Segment has been initiated either by the customer or as a result of policy validation.

The environment has been prepared as a result of that goal policy via policy validation and the possible creation and execution of a preparatory workflow.

The goal policy has been activated for monitoring by BR.

As a result of these conditions leading up to runtime, the following subscriptions have already taken place:

The BRM has subscribed to runtime state change events for the RS.

RS has subscribed to state change events for the constituent resources.

These steps highlight one example of an error detection process:

The OSStorage-1 resource 702h fails (goes Unavailable).
RS gets notified of state change event.
1st level state aggregation determines:
  Storage Copy Set→Degraded
  CICS User & Log Data→Degraded
  DB2 User & Log Data→Degraded
  DB2→Degraded
  CICS→Unavailable
  App-A→Unavailable
1st level state aggregation determines:
  RS→Unavailable
BRM gets notified of RS state change. Creates the following Containment Region:

| Resource | Reason |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

Creates a recovery workflow based on the following resources:

| Resource | State |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

In addition to the above, BR includes a set of design points that help in the understanding of the system. These design points include, for instance:

Goal Policy Support

BR is targeted towards goal based policies—the customer configures his target availability goal, and BR determines the preparatory actions and recovery actions to achieve that goal (e.g., automatically).

Availability management of the IT infrastructure through goal based policy is introduced by this design. The BR system includes the ability to author and associate goal based availability policy with the resource Recovery Segments described herein. In addition, support is provided to decompose the goal policy into configuration settings, preparatory actions and runtime procedures in order to execute against the deployed availability goal. In one implementation of the BR system, the Recovery Time Objective (RTO—time to recover post outage) is a supported goal policy. Additional goal policies of data currency (e.g., Recovery Point Objective) and downtime maximums, as well as others, can also be implemented with the BR system. Recovery Segments provide the context for association of goal based availability policies, and are the scope for goal policy expression supported in the BR design. The BR system manages the RTO through an understanding of historical information, metrics, recovery time formulas (if available), and actions that affect the recovery time for IT resources.

RTO goals are specified by the customer at a Recovery Segment level and apportioned to the various component resources grouped within the RS. In one example, RTO goals are expressed as units of time intervals, such as seconds, minutes, and hours. Each RS can have one RTO goal per Pattern System Environment associated with the RS. Based on the metrics available from the IT resources, and based on observed history and/or data from the customer, the RTO goal associated with the RS is evaluated for achievability, taking into account which resources are able to be recovered in parallel.

Based on the RTO for the RS, a set of preparatory actions expressed as a workflow is generated. This preparatory workflow configures the environment or makes alterations in the current configuration, to achieve the RTO goal or to attempt to achieve the goal.

In terms of optimizing RTO, there are tradeoffs associated with the choices that are possible for preparatory and recovery actions. Optimization of recovery choice is performed by BR, and may include interaction at various levels of sophistication with IT resources. In some cases, BR may set specific configuration parameters that are surfaced by the IT resource to align with the stated RTO. In other cases, BR may request that an IT resource itself alter its management functions to achieve some portion of the overall RS RTO. In either case, BR aligns availability management of the IT resources contained in the RS with the stated RTO.

Metrics and Goal Association

In this design, as one example, there is an approach to collecting the required or desired metrics data, both observed and key varying factors, system profile information that is slow or non-moving, as well as potential formulas that reflect a specific resource's use of the key factors in assessing and performing recovery and preparatory actions, historical data and system information. The information and raw metrics that BR uses to perform analysis and RTO projections are expressed as part of the IT resources, as resource properties. BR specific interpretations and results of statistical analysis of key factors correlated to recovery time are kept as BR Specific Management data (BRMD).

Relationships Used By BR, and BR Specific Resource Pairing Information

BR maintains specific information about the BR management of each resource pairing or relationship between resources. Information regarding the BR specific data for a resource pairing is kept by BR, including information such as ordering of operations across resources, impact assessment information, operation effect on availability state, constraint analysis of actions to be performed, effects of preparatory actions on resources, and requirements for resources to co-locate or anti-co-locate.

Evaluation of Failure Scope

One feature of the BR function is the ability to identify the scope and impact of a failure. The BR design uses a Containment Region to identify the resources affected by an incident. The Containment Region is initially formed with a fairly tight restriction on the scope of impact, but is expanded on receiving errors related to the first incident. The impact and scope of the failure is evaluated by traversing the resource relationships, evaluating information on BR specific resource pairing information, and determining most current state of the resources impacted.

Generation and Use of Workflow

Various types of preparatory and recovery processes are formulated and in some cases, optionally initiated. Workflows used by BR are dynamically generated based on, for instance, customer requirements for RTO goal, based on actual scope of failure, and based on any configuration settings customers have set for the BR system.

A workflow includes one or more operations to be performed, such as Start CICS, etc. Each operation takes time to execute and this amount of time is learned based on execution of the workflows, based on historical data in the observation log or from customer specification of execution time for operations. The workflows formalize, in a machine readable, machine editable form, the operations to be performed.

In one example, the processes are generated into Business Process Execution Language (BPEL) compliant workflows with activities that are operations on IT resources or specified manual, human activities. For example, BRM automatically generates the workflows in BPEL. This automatic generation includes invoking routines to insert activities to build the workflow, or forming the activities and building the XML (Extensible Mark-Up Language). Since these workflows are BPEL standard compliant, they can be integrated with other BPEL defined workflows which may incorporate manual activities performed by the operations staff. These BR related workflows are categorized as follows, in one example:

Preparatory—Steps taken during the policy prepare phase in support of a given goal, such as the setting of specific configuration values, or the propagation of availability related policy on finer grained resources in the Recovery Segment composition. BR generates preparatory workflows, for instance, dynamically. Examples of preparatory actions include setting up storage replication, and starting additional instances of middleware subsystems to support redundancy.

Recovery—Steps taken as a result of fault detection during runtime monitoring of the environment, such as, for example, restarting a failed operating system (OS). BR generates recovery workflows dynamically, in one example, based on the actual failure rather than a pre-specified sequence.

Preventive—Steps taken to contain or fence an error condition and prevent the situation from escalating to a more substantial outage or impact; for example, the severing of a failed resource's relationship instances to other resources. Preventive workflows are also dynamically generated, in one example.

Return—Steps taken to restore the environment back to 'normal operations' post recovery, also represented as dynamically generated workflows, as one example.

Capturing of Workflow Information

Since the set of BR actions described above modify existing IT environments, visibility to the actions that are taken by BR prior to the actual execution is provided. To gain trust in the decisions and recommendations produced by BR, the BR System can run in 'advisory mode'. As part of advisory mode, the possible actions that would be taken are constructed into a workflow, similar to what would be done to actually execute the processes. The workflows are then made visible through standard workflow authoring tooling for customers to inspect or modify. Examples of BPEL tooling include:

Bolie, et al., BPEL Cookbook: Best Practices for SOA-based Integration and Composite Applications Development, ISBN 1904811337, 2006, PACKT Publishing, hereby incorporated herein by reference in its entirety;

Juric, et al., Business Process Execution Language for Web Services: BPEL and BPELYWS, ISBN 1-904811-18-3, 2004, PACKT Publishing, hereby incorporated herein by reference in its entirety.

http://www-306.ibm.com/software/integration/wid/about/?S_CMP=rnav http://www.eclipse.org/bpel/ http://www.parasoft.com/jsp/products/home.jsp;jessionid=aaa56iqFywA-HJ?product=BPEL&redname=googbpelm&referred=searchengine%2Fgoogle%Fbpel Tooling Lifecycle, Support of Managed Resources and Roles BR tooling spans the availability management lifecycle from definition of business objectives, IT resource selection, availability policy authoring and deployment, development and deployment of runtime monitors, etc. In one example, support for the following is captured in the tooling environment for the BR system:

Visual presentation of the IT resources & their relationships, within both an operations and administration context.

Configuration and deployment of Recovery Segments and BRMs.

Authoring and deployment of a BR policy.

Modification of availability configuration or policy changes for BR.

BPEL tooling to support viewing of BR created, as well as customer authored, workflows.

BPEL tooling to support monitoring of workflow status, related to an operations console view of IT resource operational state.

Policy Lifecycle

The policy lifecycle for BR goal policies, such as RTO goals, includes, for example:

Define—Policy is specified to a RS, but no action is taken by the BRM to support the policy (observation information may be obtained).

Validate—Policy is validated for syntax, capability, etc.; preparatory workflow created for viewing and validation by customer.

Prepare—Preparatory action workflows are optionally executed.

Activate—Policy is activated for runtime monitoring of the environment.

Modify—Policy is changed dynamically in runtime.

Configurable State Aggregation

One of the points in determining operational state of a Recovery Segment is that this design allows for customers to configure a definition of specific 'aggregated' states, using properties of individual IT resources. A Recovery Segment is an availability management context, in one example, which may include a diverse set of IT resources.

The customer may provide the rules logic used within the Recovery Segment to consume the relevant IT resource properties and determine the overall state of the RS (available, degraded and unavailable, etc). The customer can develop and deploy these rules as part of the Recovery Segment availability policy. For example, if there is a database included in the Recovery Segment, along with the supporting operating system, storage, and network resources, a customer may configure one set of rules that requires that the database must have completed the recovery of in-flight work in order to consider the overall Recovery Segment available. As another example, customers may choose to configure a definition of availability based on transaction rate metrics for a database, so that if the rate falls below some value, the RS is considered unavailable or degraded, and evaluation of 'failure' impact will be triggered within the BR system. Using these configurations, customers can tailor both the definitions of availability, as well as the rapidity with which problems are detected, since any IT resource property can be used as input to the aggregation, not just the operational state of IT resources.

Failure During Workflow Sequences of Preparatory, Recovery, Preventive

Failures occurring during sequences of operations executed within a BPEL compliant process workflow are intended to be handled through use of BPEL declared compensation actions, associated with the workflow activities that took a failure. The BR System creates associated "undo" workflows that are then submitted to compensate, and reset the environment to a stable state, based on where in the workflow the failure occurred.

Customer Values

The following set of customer values, as examples, are derived from the BR system functions described above, listed here with supporting technologies from the BR system:
  Align total IT runtime environment to business function availability objectives:
    RS definition from representation of IT Resources;
    Goal (RTO) and action policy specification, validation and activation; and
    Tooling by Eclipse, as an example, to integrate with IT process management.
  Rapid, flexible, administrative level:
    Alteration of operation escalation rules;
    Customization of workflows for preparatory and recovery to customer goals;
    Customization of IT resource selection from RG based on quality of service (QoS);
    Alteration of definition of IT resource and business application state (available, degraded, or unavailable);
    Customization of aggregated state;
    Modification of topology for RS and RG definition;
    Selection of BR deployment configuration;
    Alteration of IT resource recovery metrics;
    Customization of generated Pattern System Environments; and
    Specification of statistical tolerances required for system environment formation or recovery metric usage.
  Extensible framework for customer and vendor resources:
    IT resource definitions not specific to BR System; and
    Industry standard specification of workflows, using, for instance, BPEL standards.
  Adaptive to configuration changes and optimization:
    IT resource lifecycle and relationships dynamically maintained;
    System event infrastructure utilized for linkage of IT resource and BR management;
    IT resource recovery metrics identified and collected;
    IT resource recovery metrics used in forming Pattern System Environments;
    Learned recovery process effectiveness applied to successive recovery events;
    System provided measurement of eventing infrastructure timing;
    Dynamic formation of time intervals for aggregation of related availability events to a root cause; and
    Distribution of achieved recovery time over constituent resources.
  Incremental adoption and coexistence with other availability offerings:
    Potential conflict of multiple managers for a resource based on IT representation;
    Workflows for recovery and preparatory reflect operations with meta data linked to existing operations;
    Advisory mode execution for preparatory and recovery workflows; and
    Incremental inclusion of resources of multiple types.
  Support for resource sharing:
    Overlapping and contained RS;
    Merger of CR across RS and escalation of failure scope; and
    Preparatory and recovery workflows built to stringency requirements over multiple RS.
  Extensible formalization of best practices based on industry standards:
    Templates and patterns for RS and RG definition;
    Preparatory and recovery workflows (e.g., BPEL) for customization, adoption; and
    Industry standard workflow specifications enabling integration across customer and multiple vendors.
  Integration of business resilience with normal runtime operations and IT process automation:
    Option to base on IT system wide, open industry standard representation of resources;
    BR infrastructure used for localized recovery within a system, cluster and across sites; and
    Utilization of common system infrastructure for events, resource discovery, workflow processing, visualization.

Management of the IT environment is adaptively performed, as described herein and in a U.S. patent application "Adaptive Business Resiliency Computer System for Information Technology Environments," U.S. Ser. No. 11/966,495, Bobak et al., co-filed herewith, which is hereby incorporated herein by reference in its entirety.

Many different sequences of activities can be undertaken in creating a BR environment. The following represents one possible sequence; however, many other sequences are possible. This sequence is provided merely to facilitate an understanding of a BR system and one or more aspects of the present invention. This sequence is not meant to be limiting in any way. In the following description, reference is made to various U.S. patent applications, which are co-filed herewith.

On receiving the BR and related product offerings, an installation process is undertaken. Subsequent to installation of the products, a BR administrator may define the configuration for BR manager instances with the aid of BRM configuration templates.

Having defined the BRM configuration a next step could be to define Recovery Segments as described in "Recovery Segments for Computer Business Applications," U.S. Ser. No. 11/965,855, Bobak et al., which is hereby incorporated herein by reference in its entirety.

Definition of a RS may use a representation of resources in a topology graph as described in "Use of Graphs in Managing Computing Environments," U.S. Ser. No. 11/965,906, Bobak et al., which is hereby incorporated herein by reference in its entirety.

It is expected that customers will enable BR operation in "observation" mode for a period of time to gather information regarding key metrics and operation execution duration associated with resources in a RS.

At some point, sufficient observation data will have been gathered or a customer may have sufficient knowledge of the environment to be managed by BR. A series of activities may then be undertaken to prepare the RS for availability management by BR. As one example, the following steps may be performed iteratively.

A set of functionally equivalent resources may be defined as described in "Use of Redundancy Groups in Runtime Computer Management of Business Applications," U.S. Ser. No. 11/965,877, Bobak et al., which is hereby incorporated herein by reference in its entirety.

Specification of the availability state for individual resources, redundancy groups and Recovery Segments may be performed as described in "Use of Multi-Level State Assessment in Computer Business Environments," U.S. Ser. No. 11/965, 832, Bobak et al., which is hereby incorporated herein by reference in its entirety.

Representations for the IT environment in which BR is to operate may be created from historical information captured during observation mode, as described in "Computer Pattern System Environment Supporting Business Resiliency," U.S. Ser. No. 11/965,851, Bobak et al., which is hereby incorporated herein by reference in its entirety. These definitions provide the context for understanding how long it takes to perform operations which change the configuration—especially during recovery periods.

Information on relationships between resources may be specified based on recommended best practices—expressed in templates—or based on customer knowledge of their IT environment as described in "Conditional Computer Runtime Control of an Information Technology Environment Based on Pairing Constructs," U.S. Ser. No. 11/965,874, Bobak et al., which is hereby incorporated herein by reference in its entirety. Pairing processing provides the mechanism for reflecting required or desired order of execution for operations, the impact of state change for one resource on another, the effect execution of an operation is expected to have on a resource state, desire to have one subsystem located on the same system as another and the effect an operation has on preparing the environment for availability management.

With preliminary definitions in place, a next activity of the BR administrator might be to define the goals for availability of the business application represented by a Recovery Segment as described in "Programmatic Validation in an Information Technology Environment," U.S. Ser. No. 11/966,619, Bobak et al., which is hereby incorporated herein by reference in its entirety.

Managing the IT environment to meet availability goals includes having the BR system prioritize internal operations. The mechanism utilized to achieve the prioritization is described in "Serialization in Computer Management," U.S. Ser. No. 11/965,978, Bobak et al., which is hereby incorporated herein by reference in its entirety.

Multiple operations are performed to prepare an IT environment to meet a business application's availability goal or to perform recovery when a failure occurs. The BR system creates workflows to achieve the required or desired ordering of operations, as described in "Dynamic Generation of Processes in Computing Environments," U.S. Ser. No. 11/965,894, Bobak et al., which is hereby incorporated herein by reference in its entirety.

A next activity in achieving a BR environment might be execution of the ordered set of operations used to prepare the IT environment, as described in "Dynamic Selection of Actions in an Information Technology Environment," U.S. Ser. No. 11/965,951, Bobak et al., which is hereby incorporated herein by reference in its entirety.

Management by BR to achieve availability goals may be initiated, which may initiate or continue monitoring of resources to detect changes in their operational state, as described in "Real-Time Information Technology Environments," U.S. Ser. No. 11/965,930, Bobak et al., which is hereby incorporated herein by reference in its entirety. Monitoring of resources may have already been initiated as a result of "observation" mode processing.

Changes in resource or redundancy group state may result in impacting the availability of a business application represented by a Recovery Segment. Analysis of the environment following an error is performed. The analysis allows sufficient time for related errors to be reported, insures gathering of resource state completes in a timely manner and insures sufficient time is provided for building and executing the recovery operations—all within the recovery time goal, as described in "Management Based on Computer Dynamically Adjusted Discrete Phases of Event Correlation," U.S. Ser. No. 11/965,838, Bobak et al., which is hereby incorporated herein by reference in its entirety.

A mechanism is provided for determining if events impacting the availability of the IT environment are related, and if so, aggregating the failures to optimally scope the outage, as described herein, in accordance with one or more aspects of the present invention.

Ideally, current resource state can be gathered after scoping of a failure. However, provisions are made to insure management to the availability goal is achievable in the presence of non-responsive components in the IT environment, as described in "Managing the Computer Collection of Information in an Information Technology Environment," U.S. Ser. No. 11/965,917, Bobak et al., which is hereby incorporated herein by reference in its entirety.

With the outage scoped and current resource state evaluated, the BR environment can formulate an optimized recovery set of operations to meet the availability goal, as described in "Defining a Computer Recovery Process that Matches the Scope of Outage," U.S. Ser. No. 11/965,862, Bobak et al., which is hereby incorporated herein by reference in its entirety.

Formulation of a recovery plan is to uphold customer specification regarding the impact recovery operations can have between different business applications, as described in "Managing Execution Within a Computing Environment," U.S. Ser. No. 11/965,913, Bobak et al., which is hereby incorporated herein by reference in its entirety.

Varying levels of recovery capability exist with resources used to support a business application. Some resources possess the ability to perform detailed recovery actions while others do not. For resources capable of performing recovery operations, the BR system provides for delegation of recovery if the resource is not shared by two or more business applications, as described in "Conditional Actions Based on Runtime Conditions of a Computer System Environment," U.S. Ser. No. 11/965,897, Bobak et al., which is hereby incorporated herein by reference in its entirety.

Having evaluated the outage and formulated a set of recovery operations, the BR system resumes monitoring for subsequent changes to the IT environment.

In support of mainline BR system operation, there are a number of activities including, for instance:

Coordination for administrative task that employ multiple steps, as described in "Adaptive Computer Sequencing of Actions," U.S. Ser. No. 11/965,899, Bobak et al., which is hereby incorporated herein by reference in its entirety.

Use of provided templates representing best practices in defining the BR system, as described in "Defining and Using Templates in Configuring Information Technology Environments," U.S. Ser. No. 11/965,845, Bobak et al., which is hereby incorporated herein by reference in its entirety.

Use of provided templates in formulation of workflows, as described in "Using Templates in a Computing Environment," U.S. Ser. No. 11/965,922, Bobak et al., which is hereby incorporated herein by reference in its entirety.

Making changes to the availability goals while supporting ongoing BR operation, as described in "Non-Disruptively Changing a Computing Environment," U.S. Ser. No. 11/965,926, Bobak et al., which is hereby incorporated herein by reference in its entirety.

Making changes to the scope of a business application or Recovery Segment, as described in "Non-Disruptively Changing Scope of Computer Business Applications Based on Detected Changes in Topology," U.S. Ser. No. 11/965,889, Bobak et al., which is hereby incorporated herein by reference in its entirety.

Detecting and recovery for the BR system is performed non-disruptively, as described in "Managing Processing of a Computing Environment During Failures of the Environment," U.S. Ser. No. 11/965,872, Bobak et al., which is hereby incorporated herein in its entirety.

In order to build a BR environment that meets recovery time objectives, IT configurations within a customer's location are to be characterized and knowledge about the duration of execution for recovery time operations within those configurations is to be gained. IT configurations and the durations for operation execution vary by time, constituent resources, quantity and quality of application invocations, as examples. Customer environments vary widely in configuration of IT resources in support of business applications. Understanding the customer environment and the duration of operations within those environments aids in insuring a Recovery Time Objective is achievable and in building workflows to alter the customer configuration of IT resources in advance of a failure and/or when a failure occurs.

A characterization of IT configurations within a customer location is built by having knowledge of the key recovery time characteristics for individual resources (i.e., the resources that are part of the IT configuration being managed; also referred to as managed resources). Utilizing the representation for a resource, a set of key recovery time objective (RTO) metrics are specified by the resource owner. During ongoing operations, the BR manager gathers values for these key RTO metrics and gathers timings for the operations that are used to alter the configuration. It is expected that customers will run the BR function in "observation" mode prior to having provided a BR policy for availability management or other management. While executing in "observation" mode, the BR manager periodically gathers RTO metrics and operation execution durations from resource representations. The key RTO metrics properties, associated values and operation execution times are recorded in an Observation log for later analysis through tooling. Key RTO metrics and operation execution timings continue to be gathered during active BR policy management in order to maintain currency and iteratively refine data used to characterize customer IT configurations and operation timings within those configurations.

Examples of RTO properties and value range information by resource type are provided in the below table. It will be apparent to those skilled in the art that additional, less, and/or different resource types, properties and/or value ranges may be provided.

| Resource Type | Property | Value Range |
| --- | --- | --- |
| Operating System | Identifier | Text |
| | State | Ok, stopping, planned stop, stopped, starting, error, lost monitoring capability, unknown |
| | Memory Size | Units in MB |
| | Number of systems in sysplex, if applicable | integer |
| | Last IPL time of day | Units in time of day/clock |
| | Type of last IPL | Cold, warm, emergency |
| | Total Real Storage Available | Units in MB |
| | GRS Star Mode | Yes or No |
| | Complete IPL time to reach 'available' | Units of elapsed time |
| | Total CPU using to reach available during IPL | Units of elapsed time |
| | Total CPU delay to reach available during IPL | Units of elapsed time |
| | Total Memory using to reach available during IPL | Units in MB |
| | Total Memory delay to reach available during IPL | Units of elapsed time |
| | Total i/o requests | Integer value, number of requests |
| | Total i/o using to reach available during IPL | Units of elapsed time |
| | Total i/o delay to reach available during IPL | Units of elapsed time |
| Computer System (LPAR, Server, etc.) | Identifier | Text |
| | State | Ok, stopping, stopped, planned down, starting, error, lost monitoring capability, unknown |
| | Type of CPU - model, type, serial | Text value |

-continued

| Resource Type | Property | Value Range |
|---|---|---|
| | Number of CPUs | integer |
| | Number of shared processors | integer |
| | Number of dedicated processors | integer |
| | Last Activate Time of Day | Units in time of day/clock |
| Network Components | | |
| Group of Network Connections | Identity | |
| | Operational State | Ok, Starting, Disconnected, Stopping, Degraded, Unknown |
| | State of each associated Network Application Connection | Text |
| | Performance Stats on loss and delays | Complex |
| | Recovery Time for any associated application network connections | Units in elapsed time |
| | Number of active application network connections associated at time of network problem | Integer |
| | Stopped Time/duration for group of connectoins | Units in elapsed time |
| | Maximum Network Recovery Time for any application connection in group | Units in elapsed time |
| | Maximum Number of active connections at time of network problem encountered, for any application connection in group | Integer |
| | Maximum Number of connections processed at time of network recovery, for the group of connections | Integer |
| | Maximum network connection recovery time/duration for any application connection in the group | Units in elapsed time |
| | Maximum Number of connections dropped at time of application network connection recovery, for any application connection in the group | Integer |
| Network Application Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Network Recovery Time for app connection | Units in elapsed time |
| | Number of active connections at time of network problem encountered, on a per app connection basis | Integer |
| | Number of connections processed at time of network recovery, for the app connection | Integer |
| | application network connection recovery time/duration | Units in elapsed time |
| | Number of connections at time of application network connection problem encountered | Integer |
| | Number of connections processed at time of application network connection recovery | Integer |
| | Number of connections dropped at time of application network connection recovery | Integer |
| Network Host Connection | Identity | Text |
| | State | Ok, Stopping, Degraded, Error, Unknown |
| | Configuration Settings | Complex |

-continued

| Resource Type | Property | Value Range |
|---|---|---|
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Number of QoS Events, indicating potential degradation | Integer |
| | Number of QoS Events handled, | Integer |
| | Last handled QoS Event | Text |
| Database Subsystem | Name, identifier | Text |
| | Operational State | Operational, Nonoperational, starting, stopping, in recovery, log suspended, backup initiated, restore initiated, restore complete, in checkpoint, checkpoint completed, applying log, backing out inflights, resolving indoubts, planned termination, lost monitoring capability |
| | Time spent in log apply | Units of elapsed time |
| | Time spent during inflight processing | Units of elapsed time |
| | Time spent during indoubt processing | Units of elapsed time |
| | Total time to restart | Units of elapsed time |
| | Checkpoint frequency | Units of time |
| | Backout Duration | Number of records to read back in log during restart processing |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O using during restart | Units of elapsed time |
| | I/O Delay during restart | Units of elapsed time |
| Database Datasharing Group | Identifer | Text |
| | Operational State | Operational, nonoperational, degraded (some subset of members non operational), lost monitoring capability |
| | Number of locks in Shared Facility | Integer value |
| | Time spent in lock cleanup for last restart | Elapsed time value |
| Database | Identifier | Text |
| Tablespace | Identifier | Text |
| Transaction Region | Identifier | Text |
| | Name | Text |
| | Associated job name | Text |
| | Maximum number of tasks/threads | Integer value |
| | Restart type for next restart | Warm, cold, emergency |
| | Forward log name | Text |
| | System log name | Text |
| | Operational State | Operational, nonoperational, in recovery, starting, stop normal first quiesce, stop normal second quiesce, stop normal third quiesce |
| | Time spent in log apply | Units of elapsed time |
| | Time during each recovery stage | Units of elapsed time |
| | Total time to restart | Units of elapsed time |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O connect time during restart | Units of elapsed time |
| | I/O Delay during restart | Units of elapsed time |
| | System Logsize | Units in MB |
| | Forward Logsize | Units in MB |

-continued

| Resource Type | Property | Value Range |
| --- | --- | --- |
| | Activity Keypoint frequency | Integer - number of writes before activity checkpoint taken |
| | Average Transaction Rate for this region | Number of transactions per second, on average |
| Transaction Group | Group name | Text |
| Transaction Region File | Filename | Text |
| | Region Name | Text |
| | Dataset Name | Text |
| | Operational State | Operational/enabled, nonoperational/disabled |
| | Open status | Open, closed, closing |
| Transaction | Identifier | Text |
| | Operational State | Running, failed, shunted, retry in progress |
| | Region Name (s) that can run this transaction | Text |
| | Program Name | Text |
| Logical Replication Group of related datasets | Identity | Text |
| | State | |
| | Required currency characteristics for datasets | Complex |
| | Required consistency characteristics for datasets | Complex |
| Replication Group | Identity | |
| | State | |
| Replication Session | Identity | |
| | State | Established, in progress replication, replication successful complete |
| | Type of Session | Flash copy, metro mirror, etc. |
| | Duration of last replication | Units in elapsed time |
| | Time of Day for last replication | Units in time of day/clock |
| | Amount of data replicated at last replication | Units in MB |
| Roleset | Identity | Text |
| | State | |
| CopySet | Identity | Text |
| | State | |
| Dataset | Identity | Text |
| | State | Open, Closed |
| Storage Group | Identity | Text |
| | State | |
| Storage Volume | Identity | Text |
| | State | Online, offline, boxed, unknown |
| Logical Storage Subsystem | Identity | Text |
| | State | |
| Storage Subsystem | Identity | Text |
| | State | |
| | Subsystem I/O Velocity - ratio of time channels are being used | |
| Replication Link (Logical) between Logical Subsystems | Identity | Text |
| | State | Operational, nonoperational, degraded redundancy |
| | Number of configured pipes | Integer |
| | Number of operational pipes | Integer |

Figure 8A:
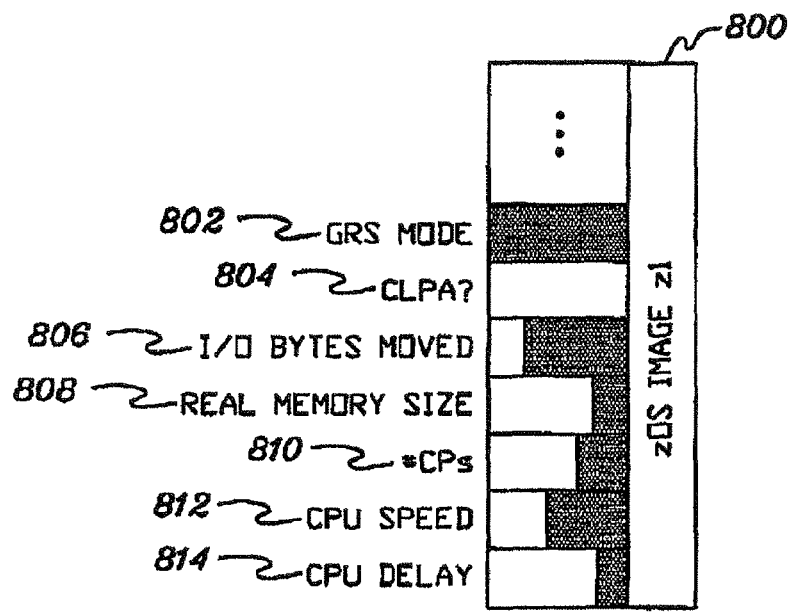
FIG. 8A depicts examples of key Recovery Time Objective properties for a particular resource, in accordance with an aspect of the present invention.

A specific example of key RTO properties for a z/OS® image is depicted in FIG. 8A. As shown, for a z/OS® image 800, the following properties are identified: GRS mode 802, CLPA? (i.e., Was the link pack area page space initialized?) 804, I/O bytes moved 806, real memory size 808, # CPs 810, CPU speed 812, and CPU delay 814, as examples.

Figure 8B:
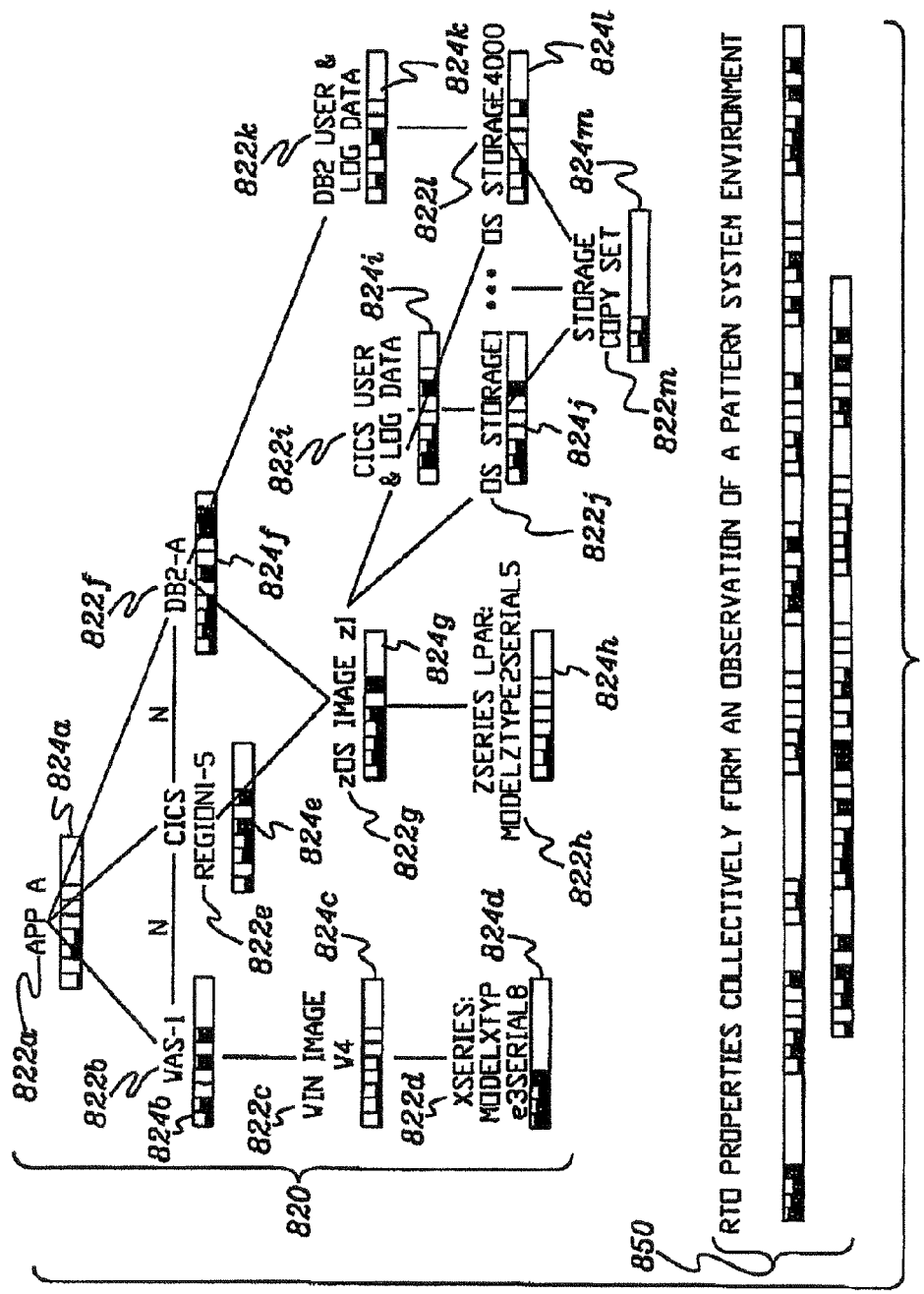
FIG. 8B depicts one example in which Recovery Time Objective properties collectively form an observation of a Pattern System Environment, in accordance with an aspect of the present invention.

The z/OS® image has a set of RTO metrics associated therewith, as described above. Other resources may also have its own set of metrics. An example of this is depicted in FIG. 8B, in which a Recovery Segment 820 is shown that includes a plurality of resources 822a-m, each having its own set of metrics 824a-m, as indicated by the shading.

Further, in one example, the RTO properties from each of the resources that are part of the Recovery Segment for App A have been gathered by BR and formed into an "observation" for recording to the Observation log, as depicted at 850.

Resources have varying degrees of functionality to support RTO goal policy. Such capacity is evaluated by BR, and expressed in resource property RTOGoalCapability in the BRMD entry for the resource. Two options for BR to receive information operation execution timings are: use of historical data or use of explicitly customer configured data. If BR relies on historical data to make recovery time projections, then before a statistically meaningful set of data is collected, this resource is not capable of supporting goal policy. A mix of resources can appear in a given RS—some have a set of observations that allow classification of the operation execution times, and others are explicitly configured by the customer.

Calculation of projected recovery time can be accomplished in two ways, depending on customer choice: use of historical observations or use of customers input timings. The following is an example of values for the RTOGoalCapability metadata that is found in the BRMD entry for the resource that indicates this choice:

| | |
|---|---|
| UseHistoricalObservations | The resource has a collection of statistically meaningful observations of recovery time, where definition of 'statistically valid' is provided on a resource basis, as default by BR, but tailorable by customers |
| UseCustomerInputTimings | The customer can explicitly set the operation timings for a resource |

If the customer is in observation mode, then historical information is captured, regardless of whether the customer has indicated use of explicitly input timings or use of historical information.

The administrator can alter, on a resource basis, which set of timings BR is to use. The default is to use historical observations. In particular, a change source of resource timing logic is provided that alters the source that BR uses to retrieve resource timings. The two options for retrieving timings are from observed histories or explicitly from admin defined times for operation execution. The default uses information from the observed histories, gathered from periodic polls. If the customer defines times explicitly, the customer can direct BR to use those times for a given resource. If activated, observation mode continues and captures information, as well as running averages, and standard deviations. The impact to this logic is to alter the source of information for policy validation and formulation of recovery plan.

With respect to the historical observations, there may be a statistically meaningful set of observations to verify. The sample size should be large enough so that a time range for each operation execution can be calculated, with a sufficient confidence interval. The acceptable number of observations to qualify as statistically meaningful, and the desired confidence interval are customer configurable using BR UI, but provided as defaults in the BRMD entry for the resource. The default confidence interval is 95%, in one example.

There are metrics from a resource that are employed by BR to enable and perform goal management. These include, for instance:

There is also a set of information about the resource that is employed—this information is provided as defaults in the BRMD entry for the resource, but provided to the BR team in the form of best practices information/defaults by the domain owners:

The operational state of the resource at which the observed recovery time interval started.
  The operational state of the resource at which the observed recovery time interval ended.
  The operational states of the resource at which point it can unblock dependent resources (example: operational states at which a DB2 could unblock new work from CICS, at which it could allow processing of logs for transactions ongoing at time of failure . . . ).
  Values of statistical thresholds to indicate sufficient observations for goal managing the resource (number of observations, max standard deviations, confidence level).

In addition to the resources defined herein as part of the IT configuration that is managed, there are other resources, referred to herein as assessed resources. Assessed resources are present primarily to provide observation data for PSE formation, and to understand impact(s) on managed resources. They do not have a decomposed RTO associated with them nor are they acted on for availability by BR. Assessed resources have the following characteristics, as examples:

Are present to collect observation data for PSE formation.
  Are present to understand impacts on managed resources.
  No decomposed RTO is associated with an assessed resource.
  They are resources on which resources managed by BR depend upon, but are not directly acted on for availability by BR.
  They are resources removed (or not explicitly added) from the actively monitored set of resources by the BR admin during RS definition.
  They are resources that BR does not try to recover and BR thus will not invoke any preparatory or recovery operations on them.

Similarly, there are likely scenarios where a resource exists in a customer environment that already has an alternative

| Metric | Qualification |
|---|---|
| Last observed recovery/restart time | In milliseconds; or alternately specifying units to use in calculations |
| The key factors and associated values of the resource that affect recovery time | Captured at last observed recovery time, and capturable at a point in time by BR |
| The key factors and associated values of the resource that affect other dependent resources' recovery times | Captured at last observed recovery time, and capturable at a point in time by BR |
| Observed time interval from 'start' state to each 'non-blocking' state | If there are various points in the resource recovery lifecycle at which it becomes non-blocking to other resources which depend upon it, then: Observed time interval from 'start' state to each 'non-blocking' state |
| Resource Consumption Information | If the resource can provide information about its consumption, or the consumption of dependent resources, on an interval basis, then BR will use this information in forming PSEs and classifying timings. One example of this is: cpu, i/o, memory usage information that is available from zOS WLM for an aggregation of processes/address spaces over a given interval. | availability management solution, and does not require BR for its availability. However, since other resources that are managed by BR may be dependent on them, they are observed and assessed in order to collect observation data and understand their impacts on managed resources. Additionally, there may be resources that do not have alternative management solutions, but the customer simply does not want them managed by BR, but other managed resources are dependent upon them. They too are classified as assessed resources.

These assessed resources share many of the same characteristics of managed resources, such as, for example:

- They have an entry in the BRMD, depending on their use, and the BRMD entry has an indication of assessed vs. managed.
- The RS subscribes to state change notifications for assessed resources (and possibly other notifiable properties).
- Relationships between observed and managed resources are possible (and likely).
- BR monitors for lifecycle events on assessed resources in the same manner as for managed resources.
- Assessed resources can be added and/or removed from Recovery Segments.
- They can be used to contribute to the aggregated state of an RS.

Finally, there are a few restrictions that BR imposes upon assessed resources, in this embodiment:

- Again, BR does not invoke any workflow operations on assessed resources.
- A resource that is shared between two Recovery Segments is not categorized as an assessed resource in one RS and a managed resource in the other. It is one or the other in the RS's, but not both.

To facilitate the building of the customer's IT configuration, observations regarding the customer's environment are gathered and stored in an observation log. In particular, the observation log is used to store observations gathered during runtime in customer environments, where each observation is a collection of various data points. They are created for each of the Recovery Segments that are in "observation" mode. These observations are used for numerous runtime and administrative purposes in the BR environment. As examples the observations are used:

- To perform statistical analysis from the BR UI to form characterizations of customers' normal execution environments, represented in BR as Pattern System Environments (PSE).
- To classify operations on resources into these PSEs for purposes of determining operation execution duration.
- Help determine approximate path length of operations that are pushed down from BR to the resources, and possibly to the underlying instrumentation of each resource.
- Help determine approximate path length of activities executed within BPEL workflows.
- Finally, the data collected via the observation is also used to update the metadata associated with the resource (i.e., in the BRMD table) where appropriate.

BR gathers observations during runtime when "observation mode" is enabled at the Recovery Segment level. There are two means for enabling observation mode, as examples:

1. The BR UI allows the administrator to enable observation mode at a Recovery Segment, which will change its "ObservationMode" resource property to "True", and to set the polling interval (default=15 minutes). The Recovery Segment is defined in order to allow observation mode, but a policy does not have to be defined or activated for it.

2. Once a policy is defined though and subsequently activated, observation mode is set for the Recovery Segment (due to the data being used in managing and monitoring the customer's environment). Thus, it is set automatically at policy activation, if not already set explicitly by the administrator (see 1 above) using the default polling interval (15 minutes).

The administrator may also disable observation mode for a Recovery Segment, which stops it from polling for data and creating subsequent observation records for insertion in the log. However, the accumulated observation log is not deleted. In one example, an RS remains in observation mode throughout its lifecycle. The UI displays the implications of disabling observation mode.

In BR, the observations that are collected by BR during runtime can be grouped into two categories, as examples:

1. Periodic poll.
2. Workflow (includes workflow begin/end, and workflow activity begin/end).

A periodic poll observation is a point-in-time snapshot of the constituent resources in a Recovery Segment. Observation data points are collected for those resources in the Recovery Segment(s) which have associated BR management data for any of the following reasons, as examples:

1. Resource has RTO properties.
2. Resource has operations.
3. Resource participates in the aggregated state for the Recovery Segment, in which it is contained.
4. Resource participates in any of the six types of pairing rules.

The full value of these observations is derived for an RS when they include data that has been gathered for its constituent resources, plus the resources that those are dependent upon. In one embodiment, the administrator is not forced to include all dependent resources when defining a Recovery Segment, and even if that were the case, there is nothing that prevents them from deleting various dependent resources. When defining a Recovery Segment, the BR UI provides an option that allows the customer to display the dependency graph for those resources already in the Recovery Segment. This displays the topology from the seed node(s) in the Recovery Segment down to and including the dependent leaf nodes. The purpose of this capability is to give the customer the opportunity to display the dependent nodes and recommend that they be included in the Recovery Segment.

Preparatory and recovery workflows are built by the BR manager to achieve the customer requested RTO policy based on resource operations timings. During active policy monitoring by the BR manager, measurements of achieved time for operations are recorded in observations to the log and used to maintain the running statistical data on operation execution times. Observations written to the log may vary in the contained resource RTO metrics and operation execution timings.

Observations are also collected from any of the BPEL workflows created by BR in the customer's environment. There is a standard template that each BR BPEL workflow uses. As part of that template, observation data is captured at the start of, during, and at the completion of each workflow. Specifically, in one example, one observation is created at the end of the workflow with data accumulated from completion of each activity. This information is used to gather timings for workflow execution for use in creating subsequent workflows at time of failure.

In accordance with an aspect of the present invention, management of a BR environment is facilitated by the use of Containment Regions to relate events, such as outage events, and to aggregate current resource state information for those resources affected by the events.

A Containment Region (CR) is, in one embodiment, dynamically defined by BR to be the set of resources affected by an event (e.g., outage/incident). The affected resources are identified by their resource representations. Containment Regions can cross RS boundaries, but do not cross BRM boundaries, in this embodiment. This is because, in this embodiment, sharing RSs are managed by a single BRM.

In one example, the Containment Region is implemented as one or more DB2® tables in the Business Resilience datastore that physically resides in the BR environment. That database is created at installation time, and a Containment Region is created and initialized (if necessary) at that time. The CR is associated with a particular BRM, but is not used to persist any BRM resource properties. The typical access mechanism is, for instance, via JDBC calls from the BR UI client(s) and the BR manager using JDBC type 4 drivers.

Figure 9:
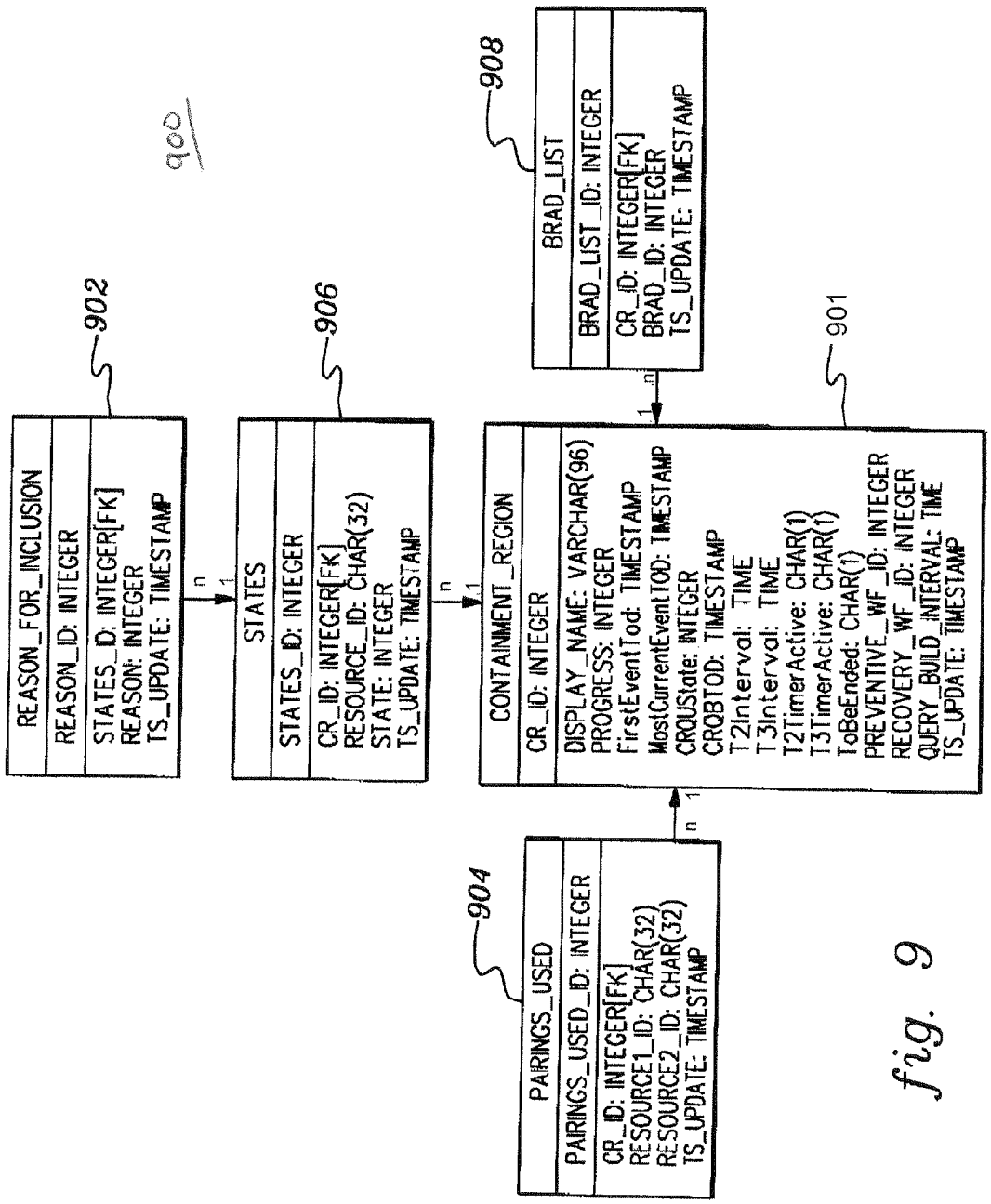
FIG. 9 depicts one example of a Containment Region and related data structures, in accordance with an aspect of the present invention.

One example of a physical model of the Containment Region is depicted in FIG. 9 and described in detail below. With reference to FIG. 9, a Containment Region 900 includes a plurality of tables, including for instance, a Containment_Region table 901, a Reason_For_Inclusion table 902, a Pairings_Used table 904, a States table 906 and a Brad_List table 908, each of which is described below.

In one example, Containment_Region table 901 includes the singleton values associated with the CR. One example of the fields of this table is described below.

| Data Field | Data Type | Description | Keys |
|---|---|---|---|
| CR_ID | Integer | Generated integer key for uniqueness via a DB2 sequence. Note all primary keys in the BR database will be a generated integer for compatibility with other non-DB2 databases. | Primary |
| DISPLAY_NAME | Varchar(96) | Name if entered from the BR UI. Display_Name uniqueness for CRs will be enforced by the UI. | User |
| Progress | Integer | The index into the array of progress indicators for the CR. For example. 1. T1→T2 2. T2→T3 3. T3→T4 4. T4→T5 5. Free 6. Inuse 7. Etc. | |
| FirstEventTod | Timestamp | Timestamp of the first event that caused the creation of this CR (for use in the sliding window technique). | |
| MostCurrentEventTOD | Timestamp | Timestamp of the most current event that caused an addition to this CR. | |
| CRQUState | Integer | The index into the array of states for the asynchronous query build function. For example: 1. Initial 2. Finished 3. InProcess 4. Etc. | |
| CRQBTOD | Timestamp | Timestamp used to place a request for resource data from the BRAD(s). | |
| T2Interval | Time | Time interval from the first event to T2 (used in the CR sliding window technique). | |
| T3Interval | Time | Time interval from the first event to T3 (used in the CR sliding window technique). | |
| T2TimerActive | Char(1) | Flag used in the CR sliding window technique to indicate that the T2 timer is active. | |
| T3TimerActive | Char(1) | Flag used in the CR sliding window technique to indicate that the T3 timer is active. | |
| ToBeEnded | Char(1) | Flag to indicate this CR is to be eliminated (since a merge has happened and another CR was chosen instead of this CR). | |
| PREVENTIVE_WF_ID | Integer | Key into the workflow table. | |
| RECOVERY_WF_ID | Integer | Key into the workflow table. | |
| TS_UPDATE | Timestamp | Timestamp of initial create or last update and defaults to current timestamp. | |

Related to the Containment_Region table is Reason_For_Inclusion table 902 that includes the reasons that a specific resource is under evaluation as potentially impacted, implicated or perpetrating by the outage event represented by CR. In one example, Reason_For_Inclusion table 902 includes the following fields:

| Data Field | Data Type | Description | Keys |
| --- | --- | --- | --- |
| REASON_ID | Integer | Generated integer key for uniqueness via a DB2 sequence. Note all primary keys in the BR database will be a generated integer for compatibility with other non-DB2 databases. | Primary |
| STATES_ID | Integer | Foreign key from the States c table that an be used to retrieve the list of reasons that a resource is in the Impacted_Resource table. | Foreign |
| Reason | Integer | The index into the array of possible reasons. For example:<br>1. Primary<br>2. Implicated<br>3. Question perpetration<br>4. Etc. | |
| TS_UPDATE | Timestamp | Timestamp of initial create or last update and defaults to current timestamp. | |

Pairings_Used table 904 includes the pairings that caused a resource to be in the impacted resource list. In one example, it includes the following:

| Data Field | Data Type | Description | Keys |
| --- | --- | --- | --- |
| PAIRINGS_USED_ID | Integer | Generated integer key for uniqueness via a DB2 sequence. Note all primary keys in the BR database will be a generated integer for compatibility with other non-DB2 databases. | Primary |
| CR_ID | Integer | Foreign key from the Containment Region table that can be used to retrieve the list of pairings used in the formulation of the CR. | Foreign |
| RESOURCE1_ID | Char(32) | ID of the first resource in the pairing. | |
| RESOURCE2_ID | Char(32) | ID of the second resource in the pairing. | |
| TS_UPDATE | Timestamp | Timestamp of initial create or last update and defaults to current timestamp. | |

Additionally, States table 906 includes the states of each resource associated with the CR. In one example, this table includes:

| Data Field | Data Type | Description | Keys |
| --- | --- | --- | --- |
| STATES_ID | Integer | Generated integer key for uniqueness via a DB2 sequence. Note all primary keys in the BR database will be a generated integer for compatibility with other non-DB2 databases. | Primary |
| CR_ID | Integer | Foreign key from the Containment Region table that can be used to retrieve the list of states for the CR. | Foreign |
| RESOURCE_ID | Char(32) | Resource ID. | |
| STATE | Integer | The index into the array of possible states. For example:<br>1. Available<br>2. Unavailable<br>3. Degraded<br>4. Etc. | |
| TS_UPDATE | Timestamp | Timestamp of initial create or last update and defaults to current timestamp. | |

Further, Brad_List table 908 includes the BRADs being targeted for a request for resource data. In one example, this table includes:

| Data Field | Data Type | Description | Keys |
| --- | --- | --- | --- |
| BRAD_LIST_ID | Integer | Generated integer key for uniqueness via a DB2 sequence. Note all primary keys in the BR database will be a generated integer for compatibility with other non-DB2 databases. | Primary |
| CR_ID | Integer | Foreign key from the Containment Region table that can be used to retrieve the list of BRAD(s) being targeted for a request for resource data | Foreign |
| BRAD_ID | Integer | The key into the BRAD table that identifies the BRAD proper | |
| TS_UPDATE | Timestamp | Timestamp of initial create or last update and defaults to current timestamp | |

The BR manager maintains data associated with CR processing. As part of the BR_Manager table, data is maintained for the following, as examples:
  Total number of times a CR has been built.
  Running average of CR build time.
  Standard deviation for CR build time.

The BR function provides the ability to identify the scope and impact of a failure. BR processing of errors is based on incoming state change notification for one or more resources. The BR design uses a Containment Region (CR) to identify the resources affected by an incident. Each operational state change is evaluated for whether a new CR is to be created, or whether the error is for a resource that already has an association or pairing with some other impacted resource. The Containment Region is initially formed with a fairly tight restriction on the scope of impact, but is expanded on receiving errors related to the first incident. Once the errors are accumulated into a given CR, additionally impacted resources are identified. The entire set is assessed for state, asynchronously, to ensure that BR makes decisions with the most current state available from a resource. Once the state is assessed, failed and degraded resource states are inspected to determine root cause. The impact and scope of the failure is evaluated by traversing the resource relationships, evaluating information on BR specific resource pairing information, and determining most current state of the resources impacted.

Exemplary features of CR processing include:
1. Initial failure resulting in condition for analysis including initial assignment of Containment Region (CR).
2. Using pairing to obtain direct effects (impact pairings) and assessing resource state.
3. Merging of error reports subsequent to initial failure based on resource and resource relationships.
4. Concurrent processing of multiple independent error conditions.
5. Evaluating resources to be included in the CR.
6. Initiating gathering of current resource state to assess root cause of error.
7. Ending the interval for gathering resource state for root cause analysis.

BR utilizes events reflecting changes in the IT environment. The source of the events may vary by resource and include: messages targeted to operations staff; SNMP (Simple Network Management Protocol) or CIM (Common Information Model) based resource events; direct messages from a management agent for the resource; etc.

The types of events that can be subscribed to are state change events and lifecycle events. State change events result when a property of a resource changes, and lifecycle events occur with either the creation and/or deletion of a resource instance (or type).

Each of the CR processing features enumerated above is described in further detail below.

1) Initial failure resulting in condition for analysis including initial assignment of Containment Region (CR):

A Recovery Segment with an active policy associated with it receives property state change events for any resource in it. Once the RS receives that event it is to determine whether it is an indication of a failure or not. Some events may be fairly benign and have little or no impact on the operational state of the RS, while others may be very severe and indicate a catastrophic failure has occurred. The first thing the RS is to do is make that determination based on the pairing rules in place for the resources and relationships involved in the event.

The first event of a failure resulting from the state change on the Recovery Segment ensures the creation of a new CR. For each subsequent event, while the recovery state is in a state that is not Available, the events flow immediately (in one example) to the BRM, which decides whether to create a new CR for the resource associated with that event, or whether to merge the resource into an existing CR. That determination is fairly straightforward—if the BRM notices that there is any overlap between an existing CR and the impacted resource list provided from the RS, those resources from the impacted list can be added to that CR (assuming of course that the timing interval for that CR is still open for inclusion of new resources—if it is closed, then a new CR is created.) If there is no overlap with any existing CR, then the BRM creates a new CR.

Once a time interval for gathering current resource status expires for any CR, the timing window for that CR is closed to incoming errors, and the resources for any other errors go into the formation of a new CR.

2) Using pairing to get direct effects (impact pairings) and assessing resource state:

When an error or state change of a resource is received by BR, the RS assesses state. In addition, related resources that have not yet failed are evaluated for impact. Described below is one embodiment of a design for generating an ImpactedResList that includes the set of resources impacted. An in-storage representation of the resource topologies are used for navigating, to avoid large numbers of requests of services outside the BR system. This function is performed in a time sensitive path, as one example.

During processing of events reported for resources in a RS, impact pairings are used.

This technique takes an input list of impacted resources, and outputs an ImpactedResList that includes one entry per resource with each entry, including, for example: Resource id, State, Aggregated State, Reason for Inclusion (either as a causing resource or resource made failed or degraded from a causing resource).

Using input resource, select all impact pairings.

For each impact pairing that has a trigger set of conditions evaluated true, add the resource and related information to the ImpactedResList.

Note that only those resources that have a direct impact relationship to the resource identified in the event report are included in this assessment. This first level analysis is expanded before retrieving resource state to insure all resources impacted are included in the CR. Performing the first level of impact analysis at this point provides a means to find immediately related events for management of CRs, while not consuming excessive processing time to transverse the entire potential set of impacted resources on each reported event.

For each of the resources in the ImpactedResList, aggregated state is evaluated. The aggregated state is stored in the ImpactedResList and in the BR management data associated with the resource, as examples.

3) Merging of error reports subsequent to initial failure based on resource and resource relationships:

The first event of a failure resulting from the state change on the Recovery Segment ensures the creation of a new CR. For each subsequent event, while any CR is not in a free state, BR decides whether to create a new CR for the resource associated with that event, or whether to merge the ImpactedResList for that event into an existing CR. BR examines the newly created ImpactedResList and the list of resources associated with any CR that has not closed processing to inclusion of new events. Overlaps in the newly created ImpactedResList and any CR open to inclusion of new events results in merging of the new event with one or more existing CRs. The CR with the oldest first event time is updated with the union of resources in merged resource lists. Any CR from which resources were taken to build the merged CR are returned to the free pool or marked for free pool return when asynchronous processing completes. If there is no overlap with any existing CR, BR then creates a new CR.

As part of the processing to accumulate related events for root cause analysis, when a new CR is created, intervals are established for initiating gathering of resource state information and closing the CR to inclusion of newly reported events in order to meet specified goals, such as RTO goals. When CR(s) and a newly reported event are merged, those intervals are re-established based on the updated view of resources related to the outage event being evaluated.

4) Concurrent processing of multiple independent error conditions:

BR processing provides for multiple concurrent events being reported for both related and unrelated outages. Analysis of errors, formation of Containment Regions and gathering of resource state information processing is performed without serialization requirements between reported events. Analysis of impact pairings is accomplished by retrieving impact pairing data without serialization held. Creating a new CR or locating existing CR(s) that are still eligible for inclusion of new resources is performed without blocking concurrent processes. Processing for a CR includes gathering resource state information. If a CR has initiated gathering of resource state information, it may run to completion without further need of update, may have additional resources added to it via CR merge processing or may be flagged for return to the free pool if its contents were merged into another CR. For updates to the resource list, asynchronous resource state gathering is reinitiated in order to insure resource state is acquired after the time of latest event notification. Messages carry an indication of what failure event time for which they are providing resource state. Messages which are superseded by later requests for resource state are discarded without compromising the integrity of the CR. Messages associated with CR(s) which have had their content merged with another CR are: allowed to complete; discarded without compromise to the BR environment; and tracked to determine when all asynchronous processing has completed enabling the CR to be returned to the free pool, as examples.

5) Evaluating resources to be included in the CR:

Prior to initiating resource state gathering, BR constructs a directed acyclic graph (DAG) from the collection of resources already associated with the CR. For each resource, BR retrieves all pairings relating the resource to other resources impacted—e.g., either failed or degraded. For each pairing, the trigger set of conditions are evaluated and if the pairing is applicable in the current environment, the impacted resource is added to the ImpactedResList and made a candidate for further pairing evaluation. As with the initial list of resources associated with the CR, added resources are represented as a set of elements including resource, state, aggregated state and reason for being included in the ImpactedResList.

When all pairings have been evaluated, the revised content of the CR is assessed against other CR(s) which are eligible for inclusion of additional resources. If required, CR(s) are merged as was described earlier.

6) Initiating gathering of current resource state to assess root cause of error:

When an intermediary interval is reached, BR begins gathering state from the impacted set of resources to ensure their value for state is more recent than the last event received. The state information is to be verified explicitly since the eventing mechanisms may have an unbounded delay. In one embodiment, the information is not queried synchronously, since gathering state is performed in a time critical path, and queries that do not show a response are terminated in a time interval aligned with achieving the required RTO. These state queries are accomplished with the BR Asynchronous Distributor (BRAD). The output of the asynchronous build process is an array of resource states.

Resource state is gathered over an interval that correlates with the time BR calculated as acceptable for delay in gathering resource state information while still achieving RTO goals. For resources failing to respond within the allowable time interval, BR utilizes the last state retrieved through periodic monitoring. BR marks the potentially stale state used from the last periodic monitoring cycle for consideration in building recovery actions.

Additionally, if during this asynchronous build process, if the BRM detects that there are overlapping resources in multiple CRs, which indicates that errors have been detected that impact related resources, the two CRs are merged into a single CR. The CR with the earliest start is preserved, the contents of the other are merged into it, and the extra CR is emptied and is ready to be reused (i.e., its state changes to Free).

As part of this asynchronous query build process, if it is detected that resources in the CR impact other resources such that they become failed and/or degraded (based on operation impact pairing rules), these impacted resources are added to the CR, as well help in the creation of the recovery process. This is referred to as the ballooning of the CR.

7) Ending the interval for gathering resource state for root cause analysis:

When the time interval set by BR as the maximum delay for including new resources in the CR is reached, the timing window for that CR is closed to incoming errors, and the resources for any other errors go into the formation of a new CR. At the close of the timing window for a CR, the operational state of the resources in the CR may have already been collected from asynchronous processing initiated earlier. Collection of resource state may be ongoing and not completed in which case completion of the asynchronous resource state gathering continues with the time limit previously established on responses to resource state queries. If resource state gathering has not been initiated at the time of closing the timing window, BR begins the asynchronous resource state collection process.

As described above, various time intervals are used to correlate events and to determine those resources impacted by the events and/or contributing to the events. These time intervals are part of a timing framework that includes discrete steps or phases (e.g., five), each of which may vary in duration. Techniques for adjusting the duration of time for each phase utilize real-time data regarding the IT configuration, event notification of changes in the configuration, heuristic assessment of timing for event delivery, and data on processing time for creation and execution of a recovery set of operations, as examples.

BR does not initiate recovery processing upon receiving the first event, but tries to delay in an attempt to determine if there are related failures. The delay is bounded by the use of a "sliding window", since BR can determine how long processing can wait based on a goal, such as the RTO. Intervals are established from information that is dynamic in the customer environment, and can further vary depending on past history of build times for CRs. Processing for event correlation is controlled by the customer specified RTO and by, for example, two intervals which determine when gathering of current resource state should begin and when aggregation of errors is to end. The sliding window is, for instance, a timeline, that continuously adjusts as each new failure event or each new resource is added to the Containment Region. The sliding window timeline includes discrete points in time and intervals.

In one example the sliding window timeline includes T1: 1st event trigger; T2: CR evaluation, build; T3: recovery process build initialization, window close; T4: recovery process start execution; and T5: recovery process end execution. There are also a plurality of intervals, including, for instance, interval T1→T2; interval T2→T3; interval T3→T4; interval T4→T5; and interval T1→T5. Further details regarding the timeline are described below.

- T1 is the point in time of the first event (e.g., failure event) in the current sequence that triggered the creation of a Containment Region.
- T2 interval, which is adjustable, is the time from the first reported event (e.g., error) to the time that BR is to start collecting current state from the impacted resources for analysis of the set of related failures. BR explicitly gathers state from the impacted set of resources to ensure their value for state is more recent than the last event received. By default, T2 interval is initialized from the average time required to gather state query responses from all resources in the RS plus two standard deviations. The statistics on average, standard deviation and maximum time for resource state query are maintained by BR based on ongoing, periodic polling for resource information. BR measures time intervals for making queries of resource state. By using measurements of resource state query, BR adjusts to the customer configuration and the level of utilization of IT resources. By being based on the average response to resource query, the default T2 interval and T3 interval are dynamically calculated based on a history of event delivery delays experienced in the customer's normal, pre-failure environment. Using resource state query response times that reflect the customer environment at time of error assists BR in determining the set of related events for analysis (e.g., failure analysis).

Once the T2 interval is expired and the T2 point in time reached, and BR detects that most failed resources are likely to have reported a failure, BR explicitly gathers state from the impacted set of resources to ensure their value for state is more recent than the last event received. The state information is to be verified explicitly since the eventing mechanisms may have an unbounded delay.
- T3 is referred to as the point in time when the sliding window has closed. By default, T3 interval is initialized based on the maximum time that any resource in any RS affected by the outage takes to respond to a query for state. Customers may choose the BR provided technique which sets T3 interval based on historical information on gathering resource state information, time to generate the recovery process and time for recovery operations to execute. Customers may alternatively choose to specify T3 interval based on average time and maximum time required to gather resource state. In one example (e.g., dynamic technique described herein), the average time to gather state for resources impacted by an outage is maintained by BR. This average (referred to herein as avg23) is used to determine the spacing of the interval between T2 and T3 in the dynamic technique. T3 is the point in time that the creation of the recovery process begins.

Once the T3 time interval expires for any CR, the sliding window for that CR is closed to incoming errors, and the resources for any other errors go into the formation of a new CR. If event notification is received for resources related to a CR in the process of gathering resource state and property data, that event is incorporated into the CR it is related to, and processing to gather resource state and property data reinitiates. As a result, multiple queries for resource state and property value may be concurrently in process for a CR. Processing is coordinated for initiating query requests and receiving query responses to insure the most current resource state and property values are utilized in evaluating the failure.
- T4 is the point in time that the recovery process begins execution.
- T5 is the point in time that the recovery process is projected to end based on operation execution duration timings. It should end, in one embodiment, prior to the RTO of the impacted Recovery Segment(s).

Error Detection

Once a policy is activated for monitoring, the operational state of the resources in the Recovery Segment is monitored for state change notifications. When those state change notifications are received at the Recovery Segment, they are assessed based on pairing rules associated with the impacted resource, and assessed against the aggregated state of the RS. If those assessments change the state of the RS, the BRM monitoring that RS is notified for building Containment Regions and generating recovery processes.

In such processing, the following is created/changed/deleted, as examples:

- An impacted list is created that includes the failing resource, and those immediately related to it which have been impacted by the failure (ImpactedResList in memory).
- A list of the pairings used to identify impacted resources (PairingsUsed) is provided.
- 1st level assessed state of any impacted resources is performed.
- 2nd level assessed state of any impacted Recovery Segment(s) is performed.
- If a Containment Region already exists that has intersections with the impacted resource list, the CR(s) are identified (CR_List in memory).

In response to a resource reporting an operational state change, an error detection routine is invoked (e.g., asynchronously) from code that handled the operational state change notification. One embodiment of the detect error logic is described with reference to FIGS. 10A-10E. In one example, this logic is processed by the RS component of the BR system.

Figure 10A:
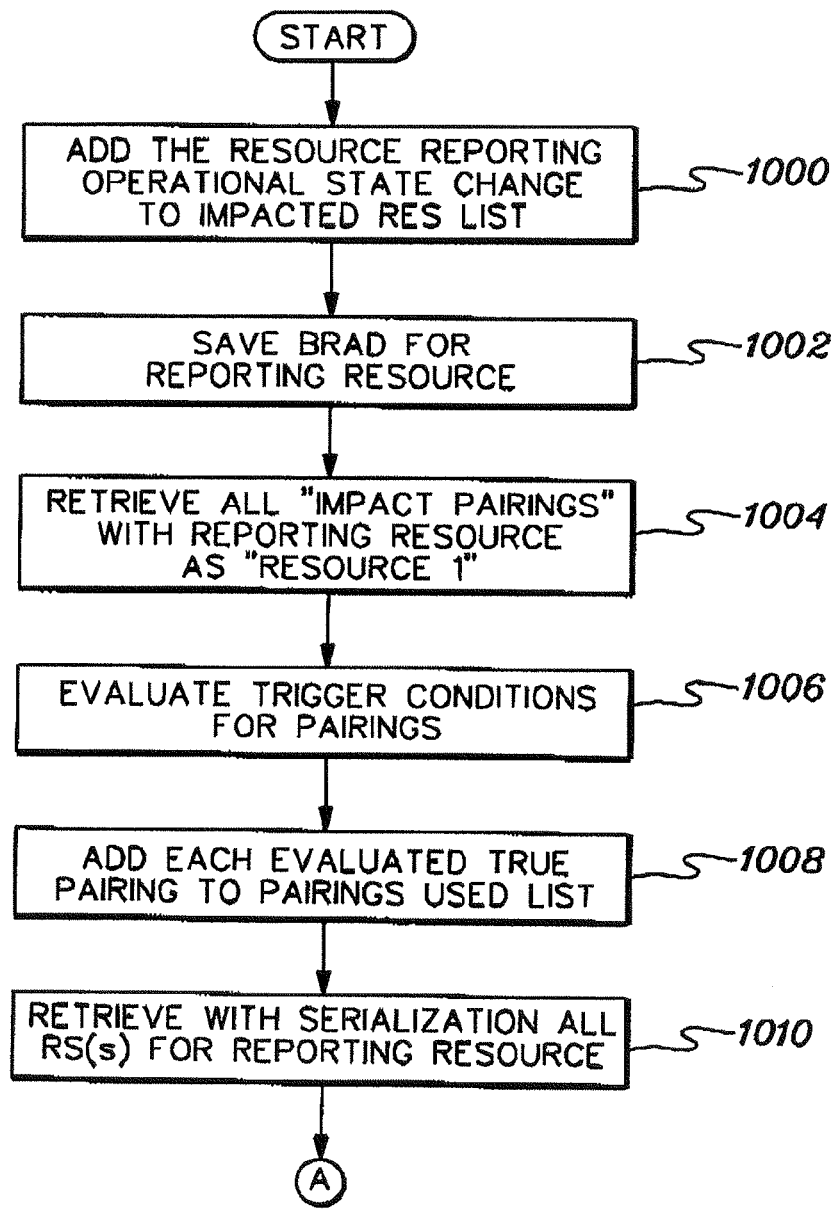
FIGS. 10A-10D depict one embodiment of the logic to detect an error, in accordance with an aspect of the present invention.

Referring initially to FIG. 10A, the resource reporting operational state change is added to an ImpactedResList, which is an in-memory working list of resources, STEP 1000. The mechanism for requesting information from the resource is saved in one implementation, by saving the BR asynchronous distributor (BRAD) identification from the RS, STEP 1002. Pairings which reflect the impact that the reporting resource can have on other resources are retrieved by selecting rows from the BRRD with the reporting resource as Resource 1, STEP 1004. Trigger conditions which determine the real time applicability of the pairings are evaluated, STEP 1006. Each pairing which is currently applicable is added to an in-memory list, PairingsUsed list, STEP 1008. Further, the RS(s) with which the reporting resource is associated are retrieved for later evaluation, STEP 1010.

Figure 10B:
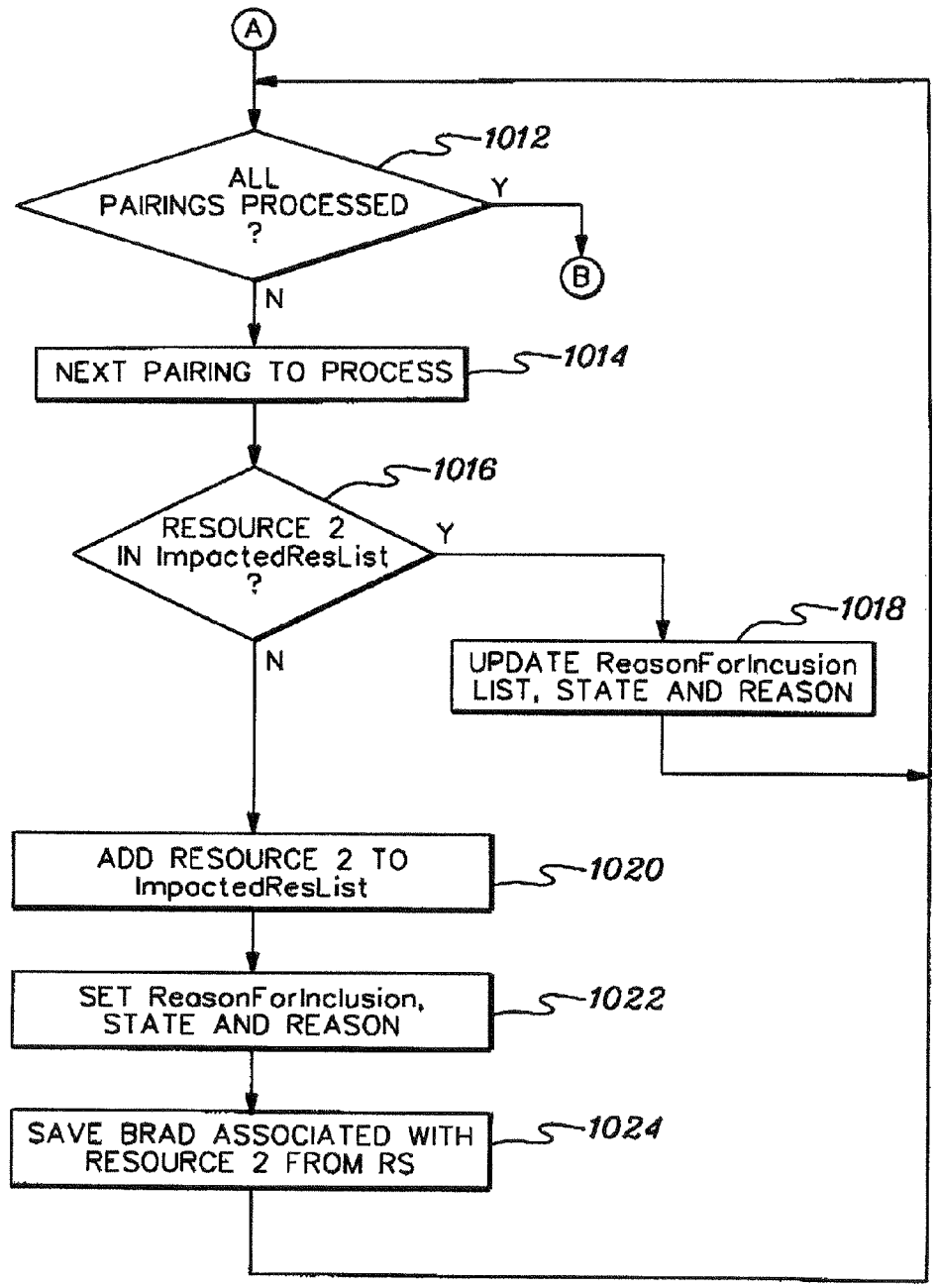

Processing then continues with determining whether all pairings have been processed, INQUIRY 1012 (FIG. 10B). If all pairings have not been processed, the next pairing to process becomes the current pairing for evaluation, STEP 1014. For the pairing which is current, Resource 2 is either added to the ImpactedResList or if already present in the ImpactedResList, information relative to why Resource 2 is present is updated. If Resource 2 from the pairing already exists in the ImpactedResList, INQUIRY 1016, the entry in the ImpactedResList is updated with information from the pairing identifying Resource 1 (the resource reporting operational state change) as the ReasonForInclusion with the state—failed or degraded—of Resource 2 from the pairing, and a Reason indicating Resource 2 was implicated as failed or degraded, STEP 1018. Processing then continues at INQUIRY 1012.

Otherwise, Resource 2 is not in the ImpactedResList. Resource 2 from the pairing is added to the ImpactedResList, STEP 1020, with ReasonForInclusion identifying Resource 1 state as identified in the pairing failed or degraded and Reason indicating Resource 2 was implicated as failed or degraded, STEP 1022. The mechanism for requesting information from Resource 2 is saved from the RS (RS.BRAD_List), STEP 1024. Processing then continues at INQUIRY 1012.

Figure 10C:
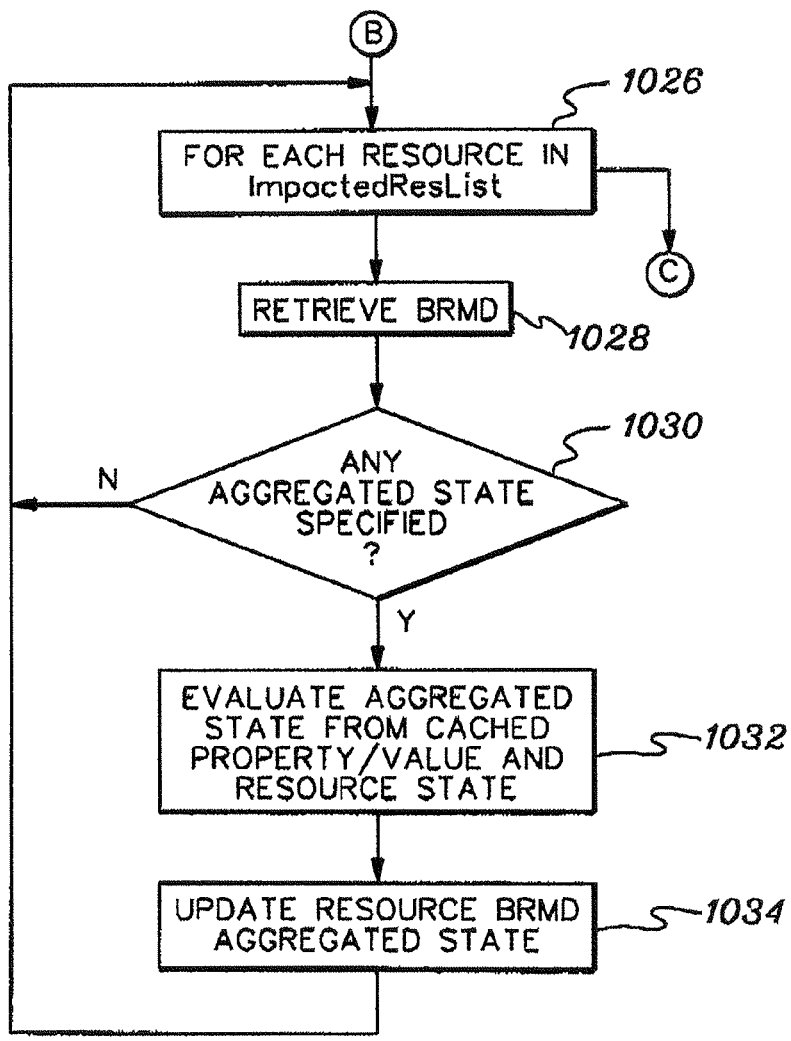

At INQUIRY 1012, subsequent to processing all the pairings, aggregated state of the resource is next evaluated for each resource in the ImpactedResList, STEP 1026 (FIG. 10C). The BR management data (BRMD) is retrieved and serialized, STEP 1028, and used to determine if the resource has aggregated state, INQUIRY 1030. If not, the next resource is processed, STEP 1026. Otherwise, the aggregated state is evaluated based on BR in-memory resource state and property/value data, STEP 1032. Updates are made if necessary to the aggregated state in the BRMD, STEP 1034, and processing continues with evaluation of the next resource, STEP 1026.

Figure 10D:
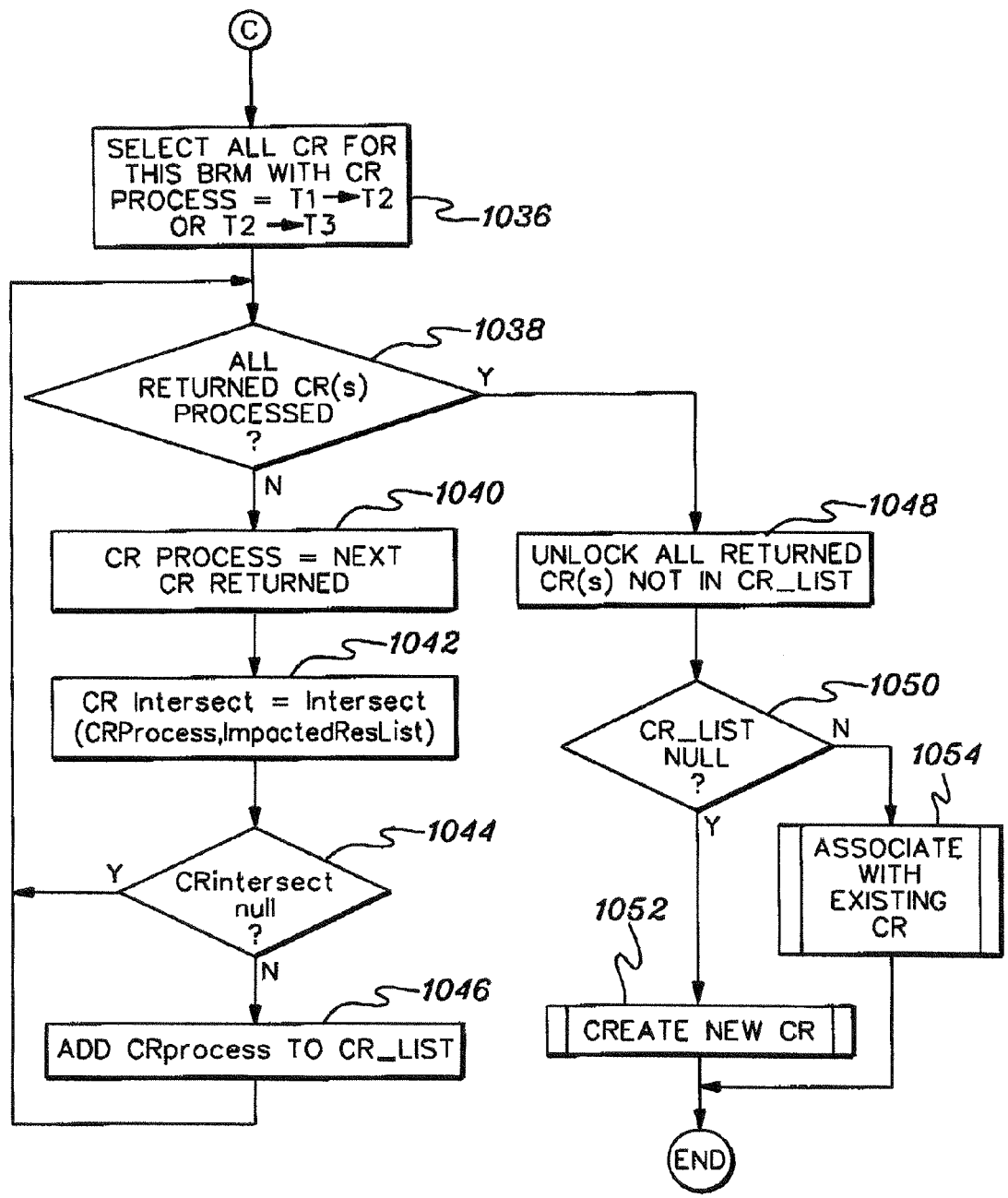

When all of the resources in the ImpactedResList have been processed, STEP 1026, a determination is made as to whether a new CR is to be created or whether this event is to be included with an existing CR. All CR(s) for the current BRM which are in the process of waiting for additional events (interval T1→T2) or have started gathering current resource information (interval T2→T3) are selected, STEP 1036 (FIG. 10D). When all retrieved CR(s) have not been processed, INQUIRY 1038, the next CR to process is selected, STEP 1040. An intersection of the resources in the selected CR.States list and the ImpactedResList is formed, STEP 1042. If the intersection is not null, INQUIRY 1044, the CR being processed is added to an in-memory CR_list, STEP 1046, and processing continues to the next retrieved CR. Otherwise, there is no resource intersection and processing continues with the next retrieved CR.

When all the retrieved CRs are processed, INQUIRY 1038, processing continues with evaluating the CR_list. First, CR(s) which were retrieved but which did not have intersection resources are deserialized, STEP 1048. If there was no CR which has intersecting resources, INQUIRY 1050, a CreateNewCR routine is invoked with the ImpactedResList and PairingsUsed, as described below, STEP 1052. Otherwise, there exists one or more CR(s) with intersecting resources, INQUIRY 1050, and an AssociateWithExistingCR routine is invoked with the ImpactedResList, PairingsUsed and CR_List, as described below, STEP 1054.

Create New CR

One embodiment of the logic to create a new CR is described with reference to FIGS. 11A-11C. In one example, the BRM component of the BR system performs this logic.

A new Containment Region is created by the BRM if it notices that there is no intersection between the impacted resource list created by the RS, or that there are no existing Containment Regions. The first event of a failure resulting from the state change on the Recovery Segment ensures the creation of a new CR, in one example. In particular, a new containment region entry is created from the Containment_Region table using a CR with the "Free" progress indicator set. A timeline for error processing is set.

Figure 11A:
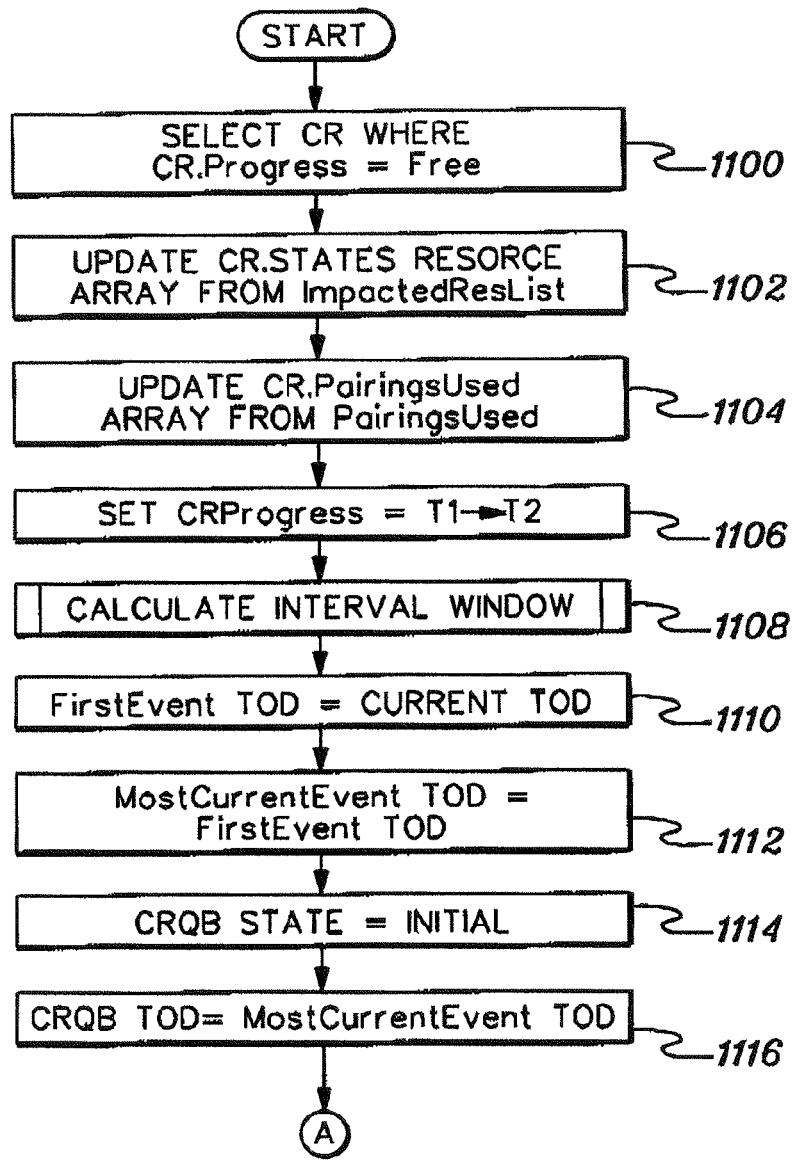
FIGS. 11A-11B depict one embodiment of the logic to create a new Containment Region, in accordance with an aspect of the present invention.
Figure 11B:
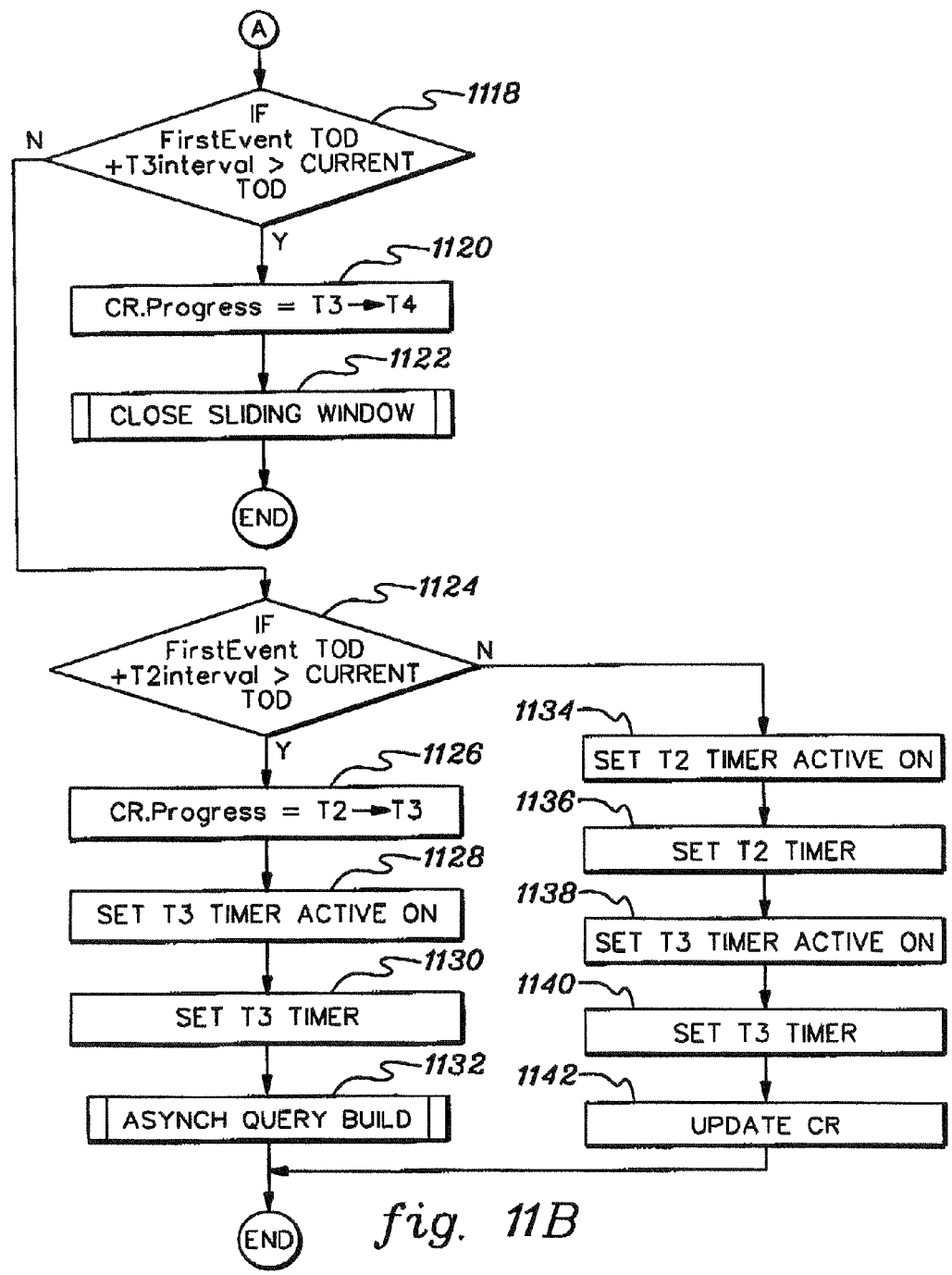

Referring to FIG. 11A, processing begins by locating an available CR for use by selecting from the CR table where CR.Progress indicates Free, STEP 1100. The CR.States array is initialized from the input ImpactedResList including the identification of the resource, the list of resources that caused it to be included from ReasonForInclusion, and the resource State and Reason as directly reporting an event or implicated based on a pairing, STEP 1102. Further, the CR.PairingsUsed array is intialized from the input PairingsUsed, STEP 1104, and the CR.Progress indicator is set to reflect the CR being in the phase of T1→T2 (e.g., reporting errors), STEP 1106. A timeline for error processing may be set in many ways including a fixed time delivered with BR for each phase, a fixed time established by the customer for each phase or a variable timeline, for example, as established by a CalculateIntervalWindow routine, as described below, STEP 1108.

The time of the first event associated with the CR is saved in CR.FirstEventTOD, STEP 1110, and the most current event for the CR is set in CR.MostCurrentEventTOD, STEP 1112. Resource query processing phase is set to initial in CRQBState, STEP 1114, and the time for correlating processing the response messages to resource query, CRQB-TOD, is set to the most current event TOD, STEP 1116.

Multiple ways exist to detect progress along the timeline including waiting for interval timers to expire, testing return codes from routines that set interval timers or testing the passing of real time as is performed in this flow. If the current time has passed the point when requests for resource data should have ended, that is greater than the T3 interval added to the first event TOD, INQUIRY 1118 (FIG. 11B), CR.Progress is indicated to have moved to the T3→T4 phase (e.g., begin taking action, such as build a recovery process), STEP 1120, and a CloseSlidingWindow routine is invoked, STEP 1122, as described herein.

Returning to INQUIRY 1118, if the current time has not passed the point when requests for resource data should have ended, then a determination is made if the current time has passed the point when requests for resource data should have started, INQUIRY 1124. For example, is the Current TOD greater than the T2 interval added to the first event TOD? If so, CR.Progress is indicated to have moved to the T2→T3 phase, STEP 1126. The timer for ending the T3 phase of processing is indicated to have been set (T3TimerActive), STEP 1128, and the T3 interval timer is set by, for instance, invoking system timer services, STEP 1130. Processing then invokes the AsynchQueryBuild routine to initiate gathering of resource data, STEP 1132.

Returning to INQUIRY 1124, if the current time has not passed the point when requests for resource data should have started, the timer for ending the T2 phase of processing is indicated to have been set (T2TimerActive), STEP 1134, and the T2 interval timer is set by, for instance, invoking system timer services, STEP 1136. The timer for ending the T3 phase of processing is indicated to have been set (T3TimerActive), STEP 1138, and the T3 interval timer is set by, for instance, invoking system timer services, STEP 1140. Processing completes by updating the CR, STEP 1142.

Calculate Interval Window

In creating a new CR, a Calculate Interval Window routine is invoked. One embodiment of the logic to calculate interval windows is described with reference to FIGS. 12A-12E. In one example, this logic is performed by the BRM component of the BR system. Prior to describing the specifics, however, a summary of the processing is provided.

To set T2 and T3 intervals, the following processing occurs, in one example.

Determine if BR dynamic, BR fixed or a customer specified routine is current for the RS.

Calculate both an initial value for T2 and T3 intervals, as well as time remaining to T2 and T3 point in time from when the first error was reported for events reporting subsequent errors that have been merged with the CR.

For BR dynamic technique:

Project a time (projected45) for the interval T4 to T5 for recovery operation execution based on operation timings in the one current PSE for a non-shared resource or on the average of operation timings from all current PSEs for a shared resource.

Create a Gantt chart from the list of recovery operations accumulated.

Determine recovery operation time from the Gantt chart representing operation ordering and operation overlap.

Determine T2 and T3 intervals from avg23 time (average time to gather resource state), avg34 time (average time to build recovery process), and projected45 time from the recovery operation execution duration time and RTO.

For BR fixed technique:

T2 interval and point in time TOD are set from the average of resource state query times for the RS associated with the CR having the smallest RTO.

T3 interval and point in time TOD are set to the largest time for a resource to respond to a query for state from the set of resources associated with the set of RSs associated with the CR.

For customer technique:

T2 interval and point in time TOD are set from the RS having the smallest RTO as either fixed or calculated from the avg and std dev of resources in that RS response to query.

T3 interval and point in time TOD are set from the RS having the resource with the longest response to a query for state as either fixed or calculated from the average, standard deviation and maximum of resource response to query times.

Intervals are returned for time to T2 and T3.

As described with reference to FIGS. 12A-12E, CalculateInterval Window calculates intervalT2 and intervalT3 for both initial event and time left conditions. It is invoked when a Containment Region is initially created, when a new event is merged into a Containment Region or when Containment Regions are merged as a result of response to status query processing, as examples.

Figure 12A:
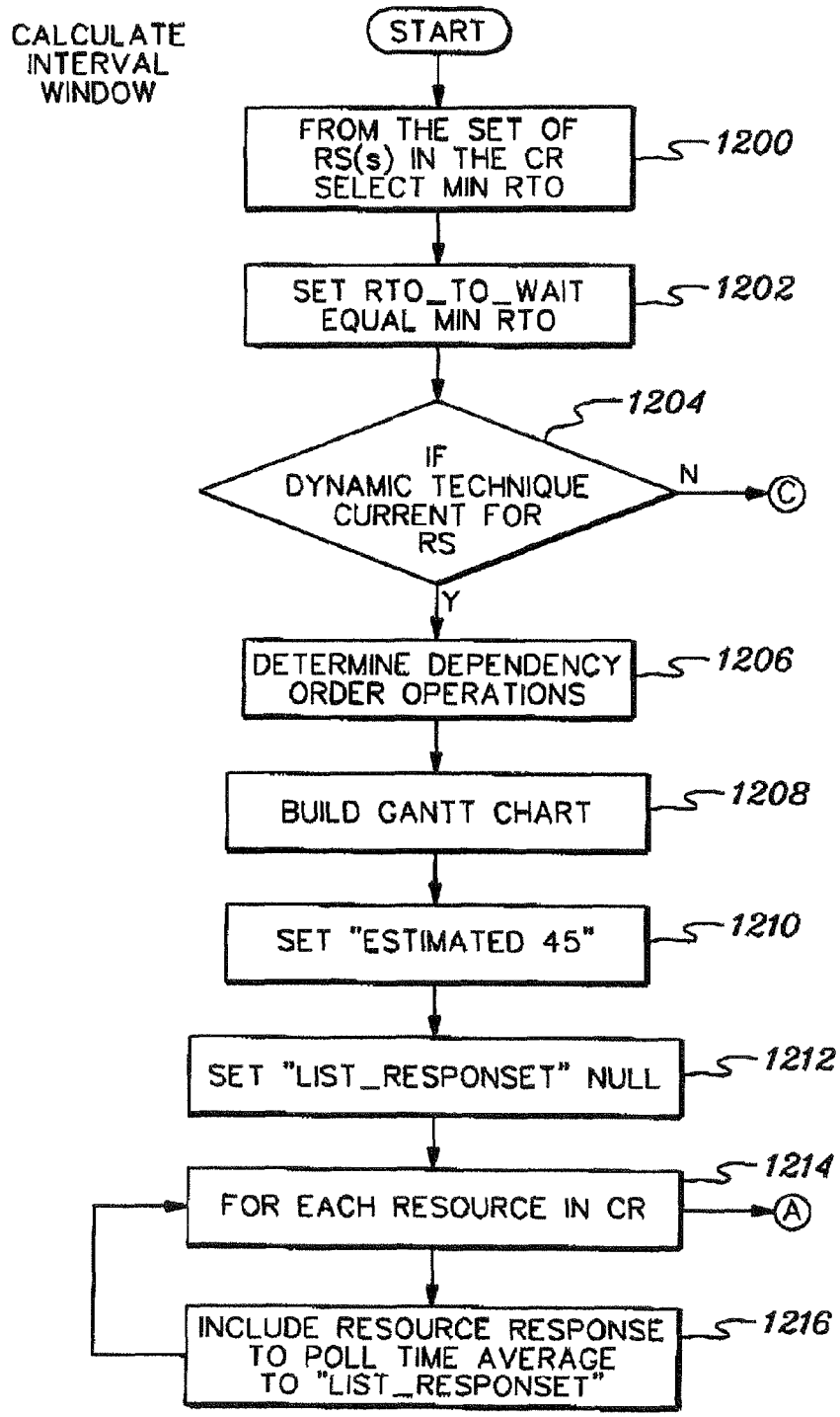
FIGS. 12A-12E depict one embodiment of the logic to calculate an interval window used in accordance with an aspect of the present invention.

Referring initially to FIG. 12A, from the set of RS(s) recorded as affected in the CR, the one with the smallest RTO is selected, STEP 1200. This is the time within which processing of the event timing framework is to complete. It is saved in a variable, RTO_To_Wait, STEP 1202. Thereafter, a determination is made as to whether the dynamic technique is to be used, INQUIRY 1204. If the dynamic technique is to be used for the RS, processing continues by determining dependency order operations, STEP 1206.

In one example, dependency operation ordering logic builds an ordered set of operations taking into account dependencies between resources and their operations. The input to the logic is a set of operations on resources, some of which may require including other dependent operations. The output is an ordered list of operations, including any dependent operations not originally in the list. In this implementation, the information on dependency of operations is determined using pairing constructs that describe the relationships between resources. In other implementations, information on dependencies between operations could be described in a relational table, or other external file. In a further implementation, the priority of operations to consider in the chain of dependent operations can be included in the logic. The processing for dependency operation ordering is, for instance, a three pass process. In the first pass, the set of input operations are analyzed and any dependent operation is incorporated into the set. In the next pass, the operations are separated into stages such that any operations that can occur in parallel are put into the same stage, and ones that occur later are moved to subsequent states. In the final pass, each operation, resource pair in the ordered list is updated with a list of operations that are to occur after the pair. This list is represented as an array of indexes, where each index value is identifying a specific operation, resource pair in the ordered list.

Thereafter, a Gantt chart is built, STEP 1208. In one example, a Build_Gantt_Chart routine is invoked to build a programmatic representation of a Gantt chart, which takes as input a set of data on operations and creates output, which includes a matrix of operations and timings, along with an overall maximum time for operation execution. Input to the routine includes a set of data, ordered_op_list, which has elements that include a set of data on each operation, opentry. Elements of the set are in execution order sequence, as one example. Each opentry element includes, for instance: a resource identity, operation, sequence # of the operation, operation execution time and a list of the index(es) into the ordered_op_list for operation(s), if any exist, which are to occur after the operation in the element (e.g., resource, op, seq#, op_exec_time, op_after(n)). The matrix generated by the routine has three columns and one row for each input operation. The first column of each row includes the input data on a resource/operation, the second column is the start time relative to 0 for the operation, and the third column is the end time relative to 0 of the operation. Additionally, a field is returned, maxtime, which is the maximum time for execution of the set of operations.

Processing is performed in two phases. In the first phase, a table is built that includes one row for each unique path through the sequence of operations. The input ordered_op_list is indexed by the variable i_ordered_op_list. The result of phase one processing is a table, outlist_table. The index i_next_available_row indicates the row within outlist_table where the next unique sequence through the set of operations will be built. Processing proceeds by locating each input operation with the lowest operation sequence number. Each of these is a root of unique paths through the set of operations. The set of these operations is processed sequentially with unique paths through the set of operations for the first root completing before processing the unique paths through the set of operations for the second root.

Processing for a root begins by assigning the current row in the outlist_table to the index current_orow_index and incrementing the i_next_available_row index. Within the row being processed, an index to the current operation being processed is maintained, index_for_ops. Processing proceeds through the list of operations in the input. A new row is created in outlist_table when more than one input operation is to occur after the current operation being processed. Two indicators are kept with each row of the outlist_table. The row_changed indicator is used to cause a copy of the row to be made before a new operation which is to occur later in the sequence is added. Associated with each row there are two fields used to save progress in processing the sequence: ordered_op_next is an index into the input ordered_op_list for the last operation in the sequence; op_next is an index into the row for the last operation in the sequence. Entries in the row include the index into the input ordered_op_list for operations comprising the sequence.

When a new row is created, it is initialized with the sequence of operations in the current row that have been accumulated to that point of processing. The second indicator associated with each row, row_end, is used to identify a row which is a complete path through the sequence of operations.

The next row is processed in the same manner as the first row of a root. Processing for a root is determined to have recorded every unique path through the sequence of operations when there were no copied rows made during processing of the current row. When all unique paths through the set of operations for the first root has completed, processing continues with the second and subsequent roots.

The second phase of processing builds the output of the routine, Gantt_table and maxtime. The maximum time for execution of the sequence of operations is set in maxtime. The Gantt_table includes one row for each opentry in the ordered_op_list input. An entry in the Gantt_table includes the opentry provided as input, a start time relative to 0 and an end time relative to 0 for the operation.

The Build_Gantt_Chart routine returns an overall time required for execution of the operations required for recovery processing. This time interval is saved in Estimated45 (a.k.a., projected45; set by maxtime returned from Gantt routine), STEP 1210.

In order to calculate the time required for all resources in the CR to respond to a request for state, a list of resource response times is created. The List_Responset is initially set to null, STEP 1212. For each resource in the CR, STEP 1214, the average response to poll time for the resource is included in the List_Responset, STEP 1216. Thereafter, the average and standard deviation for response to poll times for the resources in the CR is calculated, STEP 1218 (FIG. 11B). The time interval between T2 and T3, AvgT23, is set to the average and twice the standard deviation for response times of resources currently in the CR, STEP 1220.

The time elapsed from first event notification until the current time is calculated and saved in time_used, STEP 1222. The time required to build the recovery process, Avg34, is based on historical data maintained in the BRM table. The average of previous recovery process build times plus twice the standard deviation is calculated and saved in Avg34, STEP 1224.

The T3 interval is set to RTO_To_Wait minus Estimated45 minus Avg34 minus Time_Used, STEP 1226. T2 interval is set to the T3 interval just calculated minus Avg23, STEP 1228.

Processing is to insure the time intervals calculated have not already expired. If the T3 interval is negative, INQUIRY 1230, it has already expired. A value equal to the Time_Used minus one is returned to indicate the T3 interval has expired, STEP 1232. If the T3 interval has already expired, the T2 interval has also expired. Thus, the T2 interval is set to Time_Used minus 2 to reflect T2 interval expiration, STEP 1234.

Figure 12B:
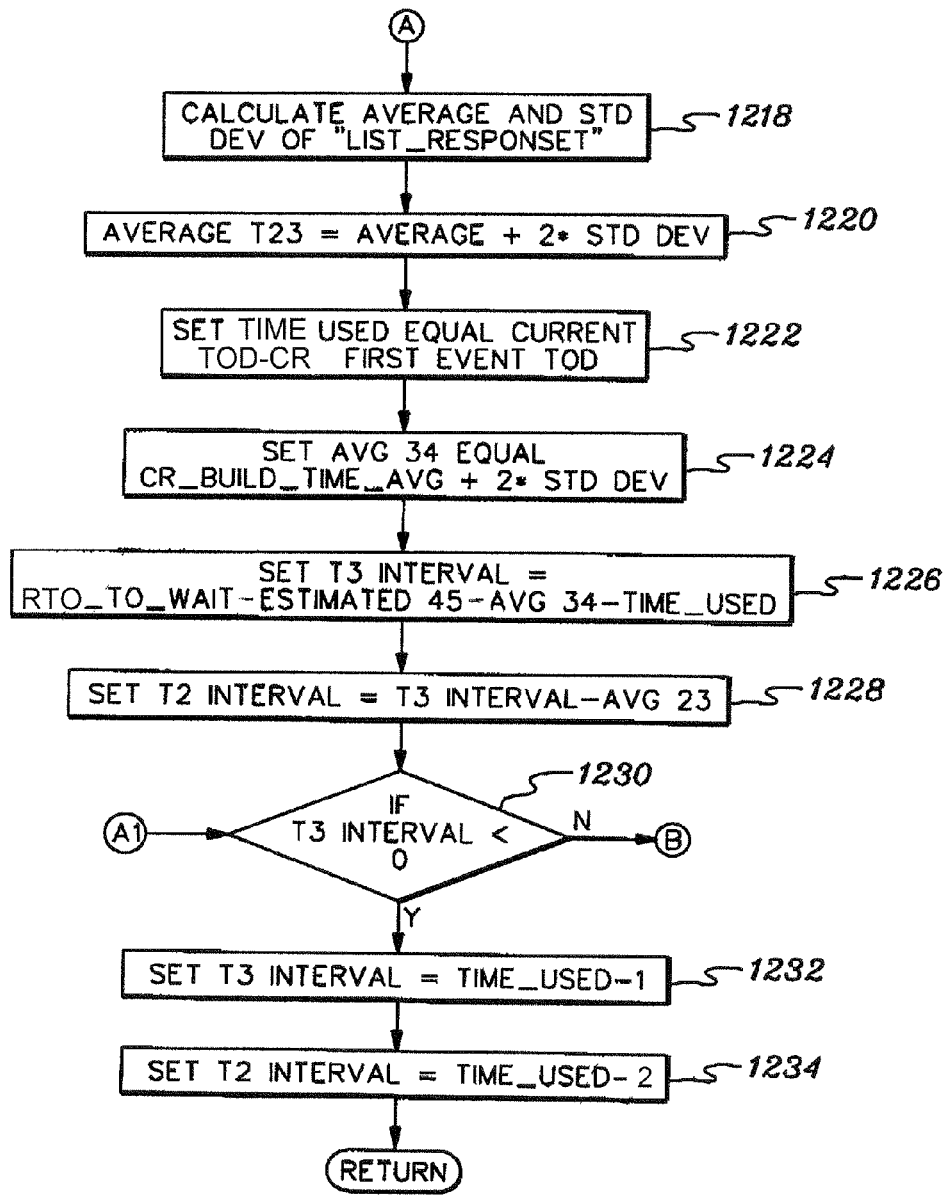
Figure 12C:
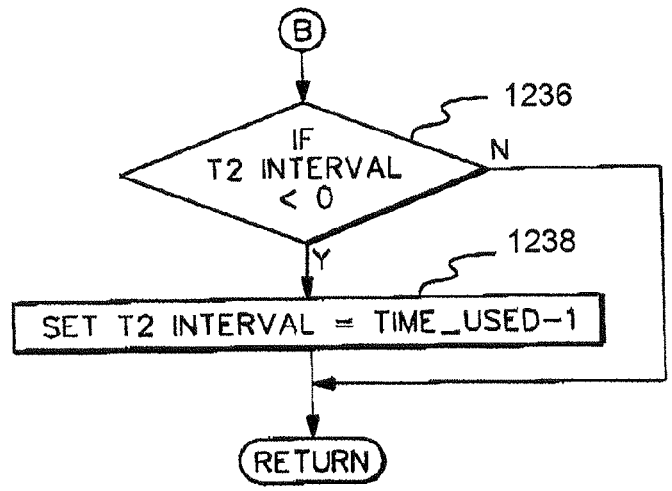

Returning to INQUIRY 1230, if the T3 interval has not expired, the T2 interval is tested for expiration, INQUIRY 1236 (FIG. 12C). If the T2 interval has not yet expired, the technique returns T2 and T3 intervals from the current time. If the T2 interval has expired, the T2 interval is set to Time_Used minus 1 to reflect T2 interval expiration, STEP 1238.

Figure 12D:
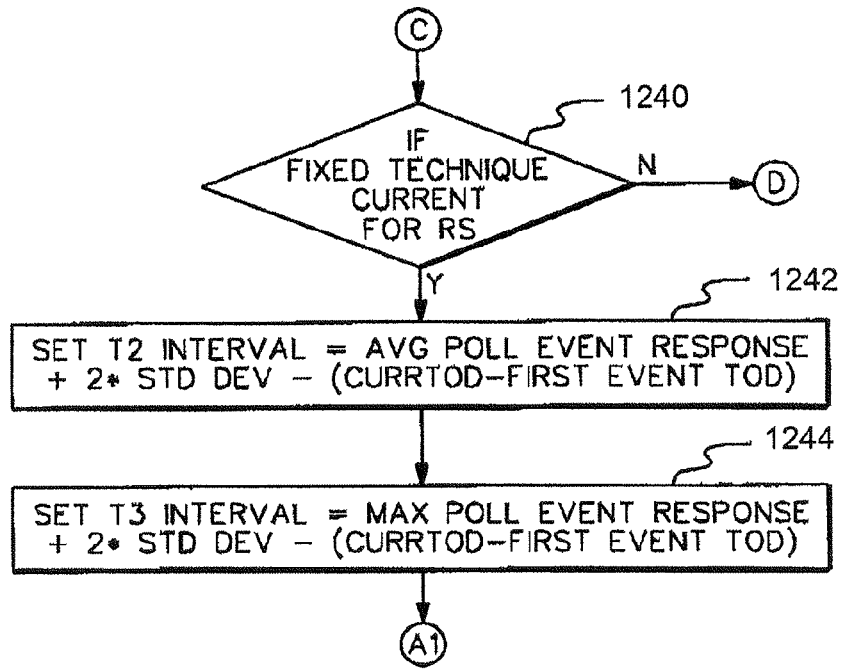

Returning to INQUIRY 1204 (FIG. 12A), if the dynamic technique is not current for the RS, a determination is made as to whether the fixed (a.k.a., default) technique is current for the RS, INQUIRY 1240 (FIG. 12D). If the default technique is current for the RS, processing continues to set the T2 and T3 interval based on response to periodic polling statistics. T2 is set to the average polling event responses plus twice the standard deviation less time already elapsed as calculated from the current TOD minus the first event TOD in the CR, STEP 1242. The T3 interval is set to the maximum poll event plus two standard deviations minus the time already elapsed as calculated from the current TOD minus the first event TOD in the CR, STEP 1244. Processing then continues to check for T3 and T2 expiration at INQUIRY 1230 (FIG. 12B).

Figure 12E:
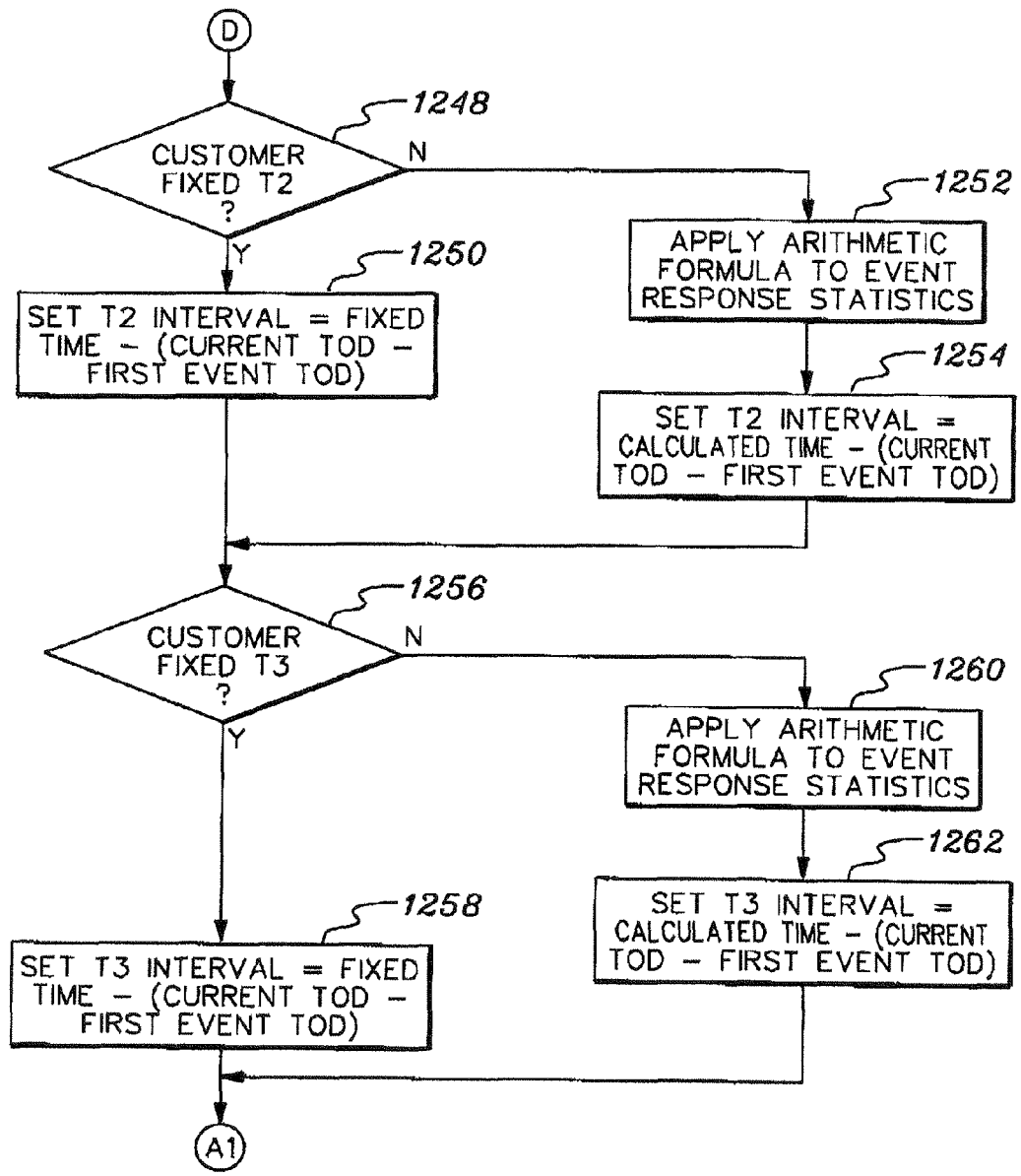

Returning to INQUIRY 1240 (FIG. 12D), if the fixed technique is not current for the RS, then customer provided timings are to be applied. Thus, a determination is made regarding calculated or fixed timings, INQUIRY 1248 (FIG. 12E). For fixed T2 timings, T2 is set to the fixed value provided minus the elapsed time as calculated from the current TOD minus the first event TOD in the CR, STEP 1250. Thereafter, processing continues at INQUIRY 1256, described below Referring again to INQUIRY 1248, for arithmetic calculation of T2, the provided formula is applied to event response time statistics in the RS, STEP 1252. The T2 interval is set to the calculated time interval minus time already elapsed as calculated from the current TOD minus the first event TOD from the CR, STEP 1254. Processing then continues to INQUIRY 1256.

At INQUIRY 1256, if a fixed T3 customer provided time is to be utilized, the T3 interval is set to the specified time interval minus time already elapsed as calculated from the current TOD minus first event TOD from the CR, STEP 1258. Otherwise, the provided formula is applied to the event statistics from the RS, STEP 1260, and the calculated time is lessened by the amount of already elapsed time and returned as the T3 interval, STEP 1262.

Processing continues with checking for T2 and T3 having already expired, INQUIRY 1230 (FIG. 12B). This concludes description of the Calculate Interval Window Logic.

Close Sliding Window

Create New CR also invokes a CloseSliding Window routine. For example, the interval timer for expiration of the T3 interval gives control to the CloseSlidingWindow routine. The T3 time interval from the first event notification causing creation of the CR represents the latest point in time where responses to AsynchQueryBuild requests (described below) for resource state and property/value data can be accepted. The T3 time interval may be established in a variety of ways including fixed intervals provided within the product offering, fixed intervals defined by the customer or variable intervals. The CR progress is updated to reflect processing being in the T3→T4 phase. All subsequent responses received in response to asynchronous query build requests are discarded. If responses to all queries for resource status subsequent to the most recent event notification related to the CR have not been received, control is passed to processing which substitutes cached resource state and property values for missing resource status responses. Otherwise, control is passed to processing to formulate the recovery process.

Figure 13:
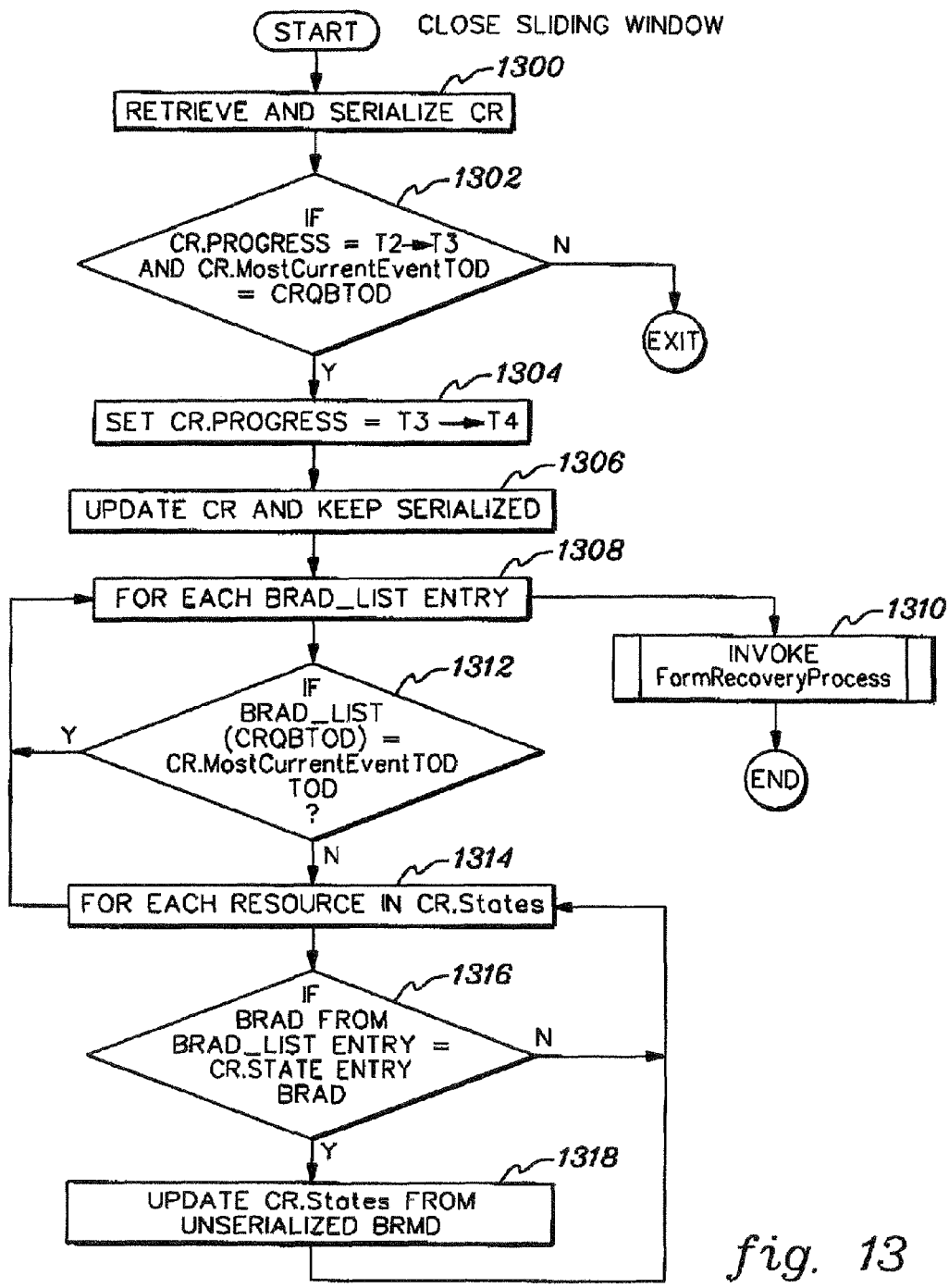
FIG. 13 depicts one embodiment of the logic for closing sliding window processing used in accordance with an aspect of the present invention.

One embodiment of the logic associated with the close sliding window routine is described with reference to FIG. 13. In one example, this logic is performed by the BRM. Referring to FIG. 13, the CR associated with the ending T3 interval is retrieved with serialization, STEP 1300. If the CR.Progress reflects T2→T3 processing and the Cr.MostCurrentEventTod is equal the CRQBTOD representing query processing for the most current event associated with the CR, INQUIRY 1302, processing continues. Otherwise, this routine terminates as the CR has been merged or is already being processed.

In continuing, the CR.Progress is updated to reflect phase T3→T4 processing, in process of building a recovery process, STEP 1304, and recorded with serialization continued to be held by this process, STEP 1306. Each BRAD_List entry associated with the CR is examined to determine if a response to the latest AsynchQueryBuild request was received, STEP 1308. When all CR.BRAD_List entries have been processed, the formation of a recovery process is initiated with resource state and property/values provided as input in the CR, STEP 1310.

For each entry, if the CRQBTOD of the BRAD_List entry being processed matches the CR.MostCurrentEventTOD, INQUIRY 1312, a response to the latest asynchronous query build request was received and current resource state and property/values were retrieved. Thus, processing returns to STEP 1308. Otherwise, for each resource in the CR, STEP 1314, a determination is made as to whether that resource is associated with the BRAD which failed to provide a most current response, INQUIRY 1316. If not, processing continues to STEP 1314. Otherwise, for such resources, the cached data for state, aggregated state and property/value data is filled into the CR.States array, STEP 1318. Processing then continues to STEP 1314. This concludes the close window processing.

Asynchronous Query Build

The Create New CR routine also invokes an asynchronous query build process. For example, when an intermediary interval is reached in the timeline for a CR and BR has detected that most failed resources are likely to have reported a failure (T2 interval), BR explicitly gathers state from the impacted set of resources to ensure their value for state is more recent than the last event received. This is accomplished via the Asynchronous Query Build routine, which is invoked via expiration of a timer interval and is performed by the BRM component of the BR system. As the name implies, this routine runs asynchronously, in this embodiment.

In the phase where BR is still accepting related incoming errors, the CR is built to include only related resources that are one step away in a graph. In ballooning the CR further, the pairing information in the BRRD (e.g., impact assessment rules) is used to determine whether there is an impact to other resources and to build out the CR to include the full set of impacted resources.

As part of this asynchronous query build process, if it is detected that resources in the CR impact other resources, such that they become failed and/or degraded (based, for instance, on operation impact pairing rules), these impacted resources are added to the CR to help creation of the recovery process.

From pairings, it is determined if there are other resources which could cause a resource in the CR to become failed or degraded. These perpetrating candidates are added to the CR with a reason as questioning their perpetration, qperp. Thus, resource data is retrieved. Analysis of the root cause determines if a resource is failed or degraded and if reported explicitly, implicated from a pairing, or retrieved based on being questioned as a perpetrator.

During this process, the CR is ballooned, which means that if it is detected that resources in the CR impact other resources such that they become failed and/or degraded (based on operation impact pairing rules), these impacted resources are added to the CR as well; multiple CR's may be merged; resources which may have caused other CR included resources to become failed or degraded based on impact pairings are included in the CR for query processing; and asynchronous requests to the appropriate BRAD(s) are sent.

Figure 14A:
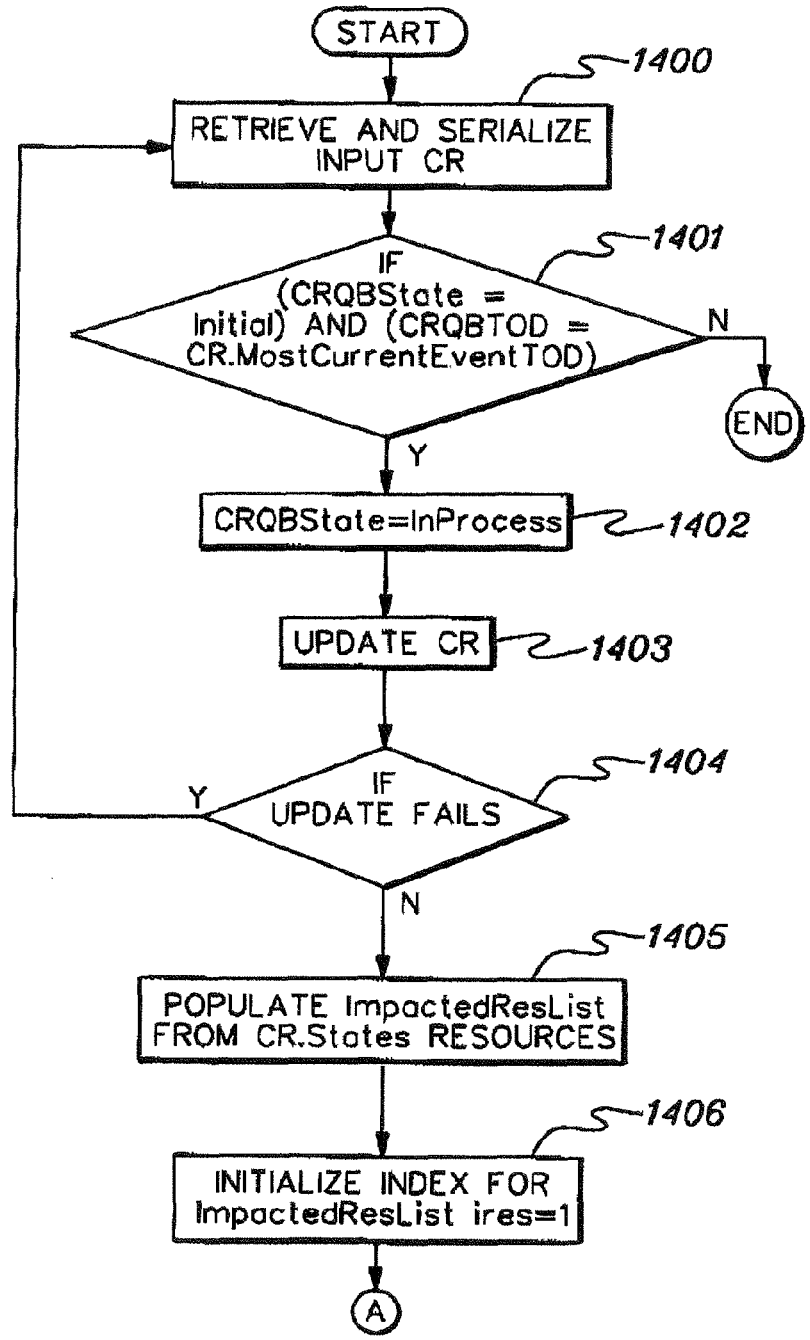
FIGS. 14A-14J depict one embodiment of the logic for asynchronous query build processing used in accordance with an aspect of the present invention.

Referring to FIG. 14A, input to AsynchQueryBuild is the CR for which processing is to be performed. The CR is retrieved and serialized, STEP 1400. Since multiple concurrent processes may have attempted to invoke the AsynchQueryBuild routine, a check is made to determine if processing is required, e.g., if CRQBState is initial and the CRQBTOD matches the MostCurrentEventTOD, INQUIRY 1401. If processing is not to be performed by this instance of AsynchQueryBuild, processing is terminated. Otherwise, the CR is updated to reflect CRQBState is in process, STEP 1402, and the CR is externally recorded in the CR table, STEP 1403. If the update fails, INQUIRY 1404, the processing of AsynchQueryBuild is restarted.

Otherwise, an in-memory list of resources from the CR is created, ImpactedResList, from the resource information in the CR (e.g. CR.States), STEP 1405. Data initialized in the ImpactedResList includes the resource, resource(s) which caused it to be in the CR, resource state and reason(s)—e.g., failed, degraded, implicated, question perpetration. Further, an index for processing the ImpactedResList is initialized to the top of the list, STEP 1406.

Figure 14B:
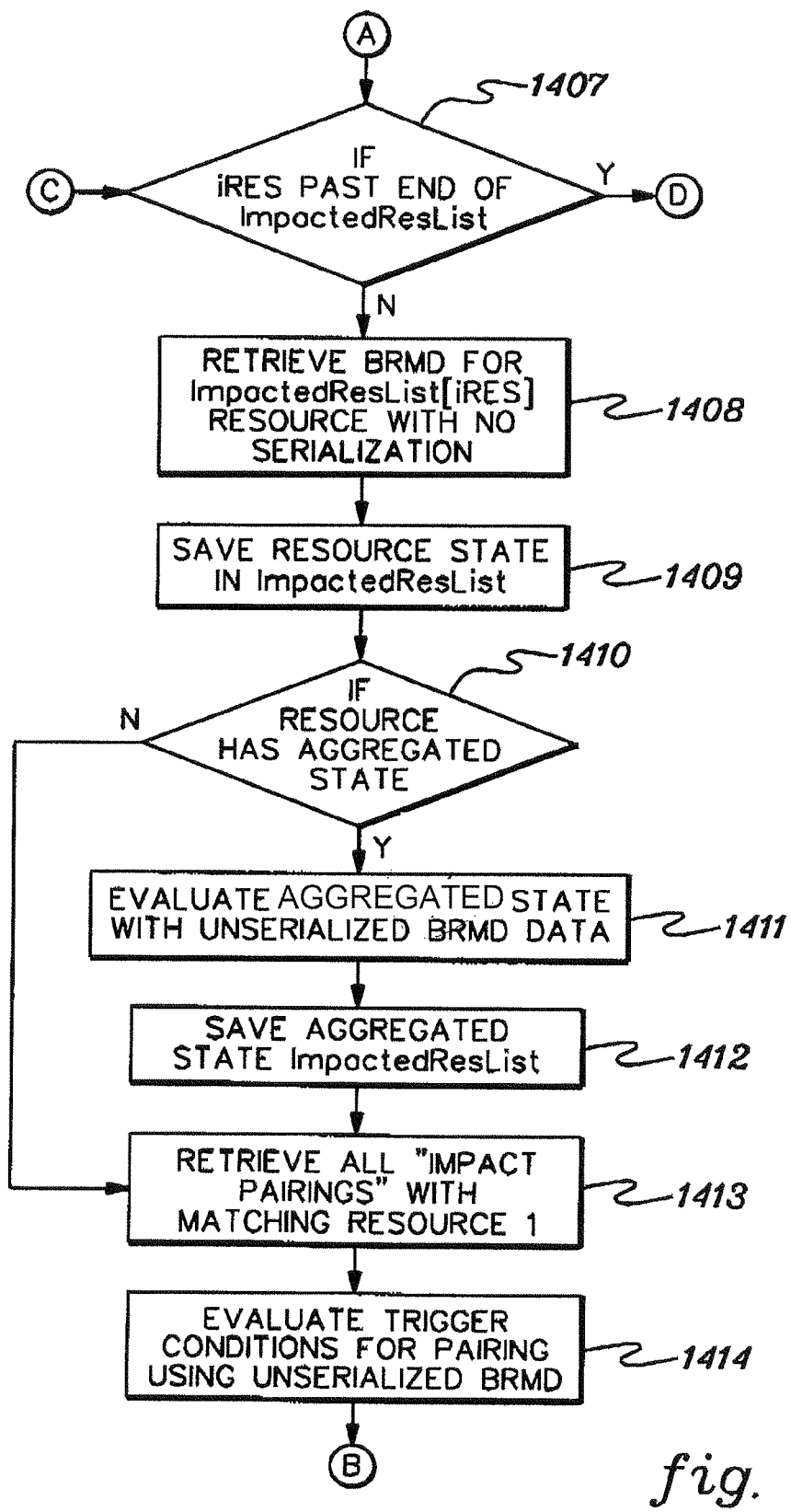

If there are resources to be processed, INQUIRY 1407 (FIG. 14B), for each resource in the ImpactedResList, the BRMD is retrieved without serialization, STEP 1408. The resource state from the BRMD is used to update the ImpactedResList as additional periodic poll or query events may have caused the BRMD to be updated, STEP 1409. If the resource has aggregated state, INQUIRY 1410, an evaluation of aggregated state is performed using cached data for other resource state and property/values, STEP 1411. The calculated aggregated state is saved in the ImpactedResList, STEP 1412.

Figure 14C:
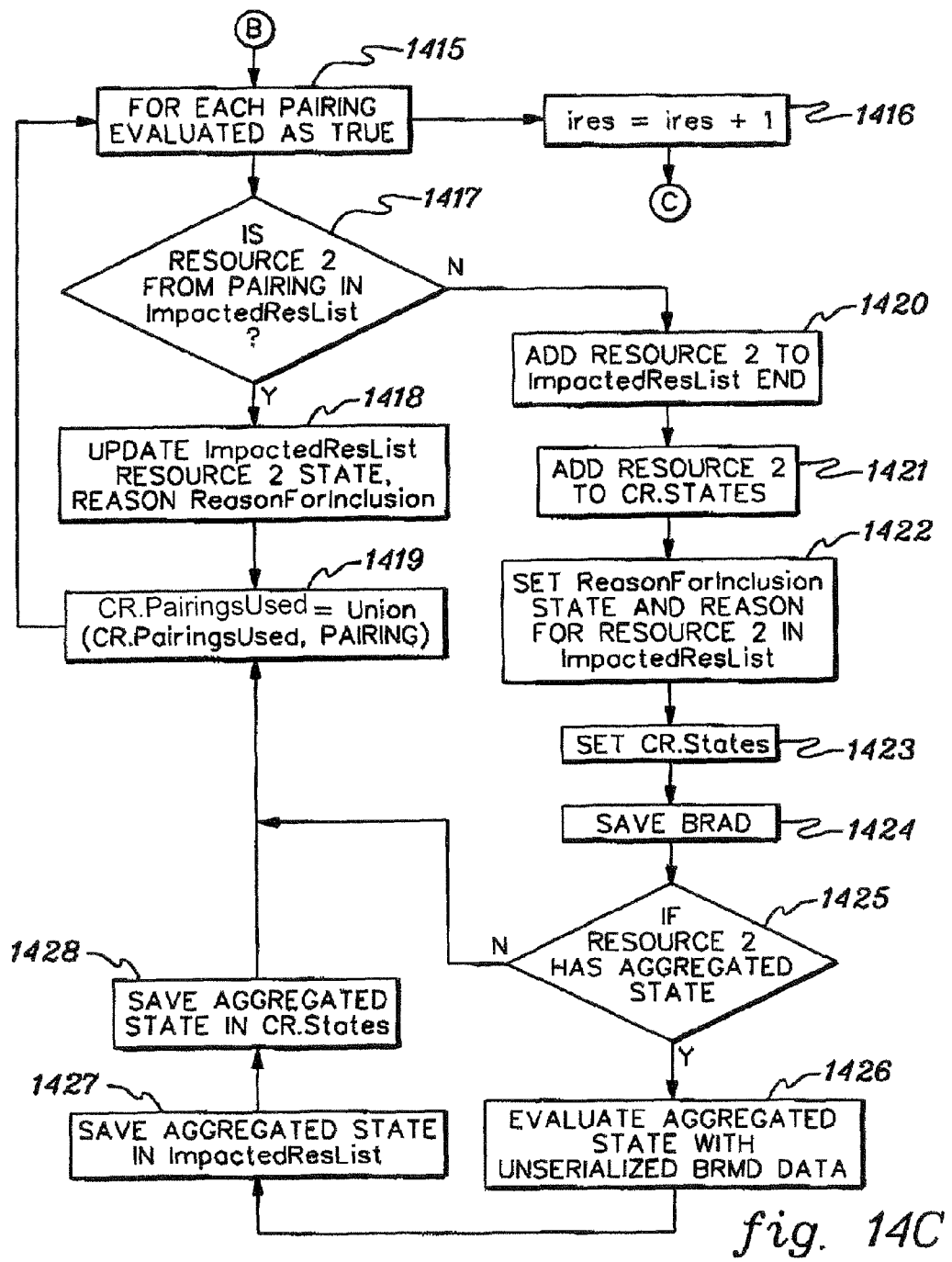

Thereafter, or if the resource does not have aggregated state, impact pairings with a matching Resource 1 index are retrieved from the BRRD, STEP 1413. This reflects the resources which may become failed or degraded as a result of this resource being failed or degraded. Trigger conditions for the pairings are evaluated, STEP 1414, to determine if the pairing is applicable at this point in time. Each pairing is processed until all pairings for this resource have been evaluated, STEP 1415 (FIG. 14C), and then, the next resource in the ImpactedResList is to be processed, STEP 1416.

For the pairing, Resource 2 is tested as to whether it is in the ImpactedResList, INQUIRY 1417. If an array entry exists for Resource 2, data on the resource are updated, including, for instance, ReasonForInclusion, State and Reason, STEP 1418. The pairing is added to the pairings used in forming the CR, CR.PairingsUsed, STEP 1419, and processing continues at STEP 1415.

Returning to INQUIRY 1417, if Resource 2 from the pairing is not already in the ImpactedResList, it is added in a new array entry, STEP 1420. Resource 2 is also added to the CR.States array in a new entry, STEP 1421. Data for Resource 2 are updated in the ImpactedResList, STEP 1422, and in the CR.States array, STEP 1423, including, for instance, ReasonForInclusion, State and Reason. The mechanism for requesting information about the resource is also saved as part of the Resource 2 data, e.g. the BRAD, in one implementation, STEP 1424.

If Resource 2 has aggregated state, INQUIRY 1425, the aggregated state is evaluated using cached data for other resources, STEP 1426, and saved in the ImpactedResList, STEP 1427, and the CR.States array, STEP 1428. The pairing is added to the CR, STEP 1419, and the next pairing is evaluated, STEP 1415.

If Resource 2 does not have aggregated state, INQUIRY 1425, processing continues with STEP 1419. When all pairings have been evaluated for the current resource, the next resource in the ImpactedResList is selected for processing, STEP 1416.

Figure 14D:
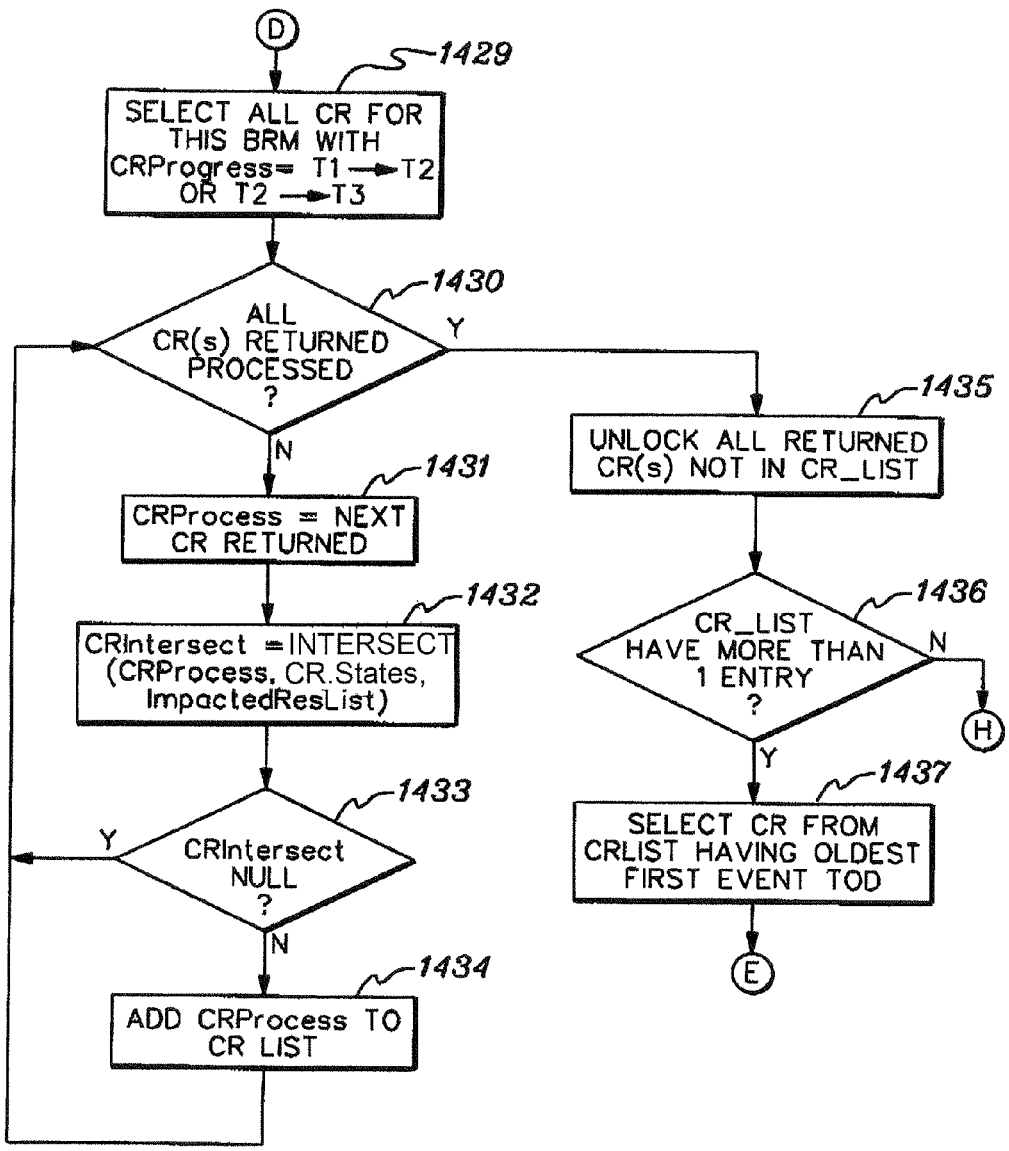

Returning to INQUIRY 1407, when all resources identified with the CR to this point have been processed, an evaluation of CR merge requirements is made. First, the CR(s) associated with this BRM which are in a phase of accepting new events, T1→T2, or querying resource data, T2→T3, are selected from the CR table, STEP 1429 (FIG. 14D). The list of CR(s) returned is processed one at a time, INQUIRY 1430, with the next list entry being selected, STEP 1431. An intersection of resources in the CR.States array and the ImpactedResList array is formed, STEP 1432. If the intersect is null, INQUIRY 1433, the next CR entry is processed, INQUIRY 1430. Otherwise, the CR with intersecting resources is added to the CR_List, STEP 1434, and processing returns to INQUIRY 1430.

When all CR(s) returned have been processed, INQUIRY 1430, those that do not have intersecting resources are unlocked, STEP 1435. If the CR_List has a single entry, INQUIRY 1436, processing to merge CR(s) is not needed, and thus, processing continues at STEP 1455 (FIG. 14G), as described below. Otherwise, the CR from the CR_List having the oldest first event TOD is selected, STEP 1437 (FIG. 14D) and all other CR(s) in the CR_List are deselected.

For each deselected CR from the CR_List, STEP 1438 (FIG. 14E), an indicator is set for CR processing to end, ToBeEnded, STEP 1439. Each resource in the deselected CR is processed, STEP 1440. If the resource exists in the ImpactedResList already, INQUIRY 1441, a comparison of data on the resource in the CR.States array entry and the ImpactedResList is made to determine if an update of the ImpactedResList entry is required, INQUIRY 1442. If so, the ReasonForInclusion, State and Reason from the CR.States array entry is added to the array entry in the ImpactedResList, STEP 1443, and the selected CR.States array entry, STEP 1444. Processing then continues at STEP 1440.

Returning to INQUIRY 1442, if an update is not required, then processing flows to STEP 1440.

Returning to INQUIRY 1441, if the resource did not already exist in the ImpactedResList, it is added along with data on ReasonForInclusion, State and Reason to the ImpactedResList, STEP 1445, and the selected CR.States array, STEP 1446. Processing then continues at STEP 1440.

Figure 14E:
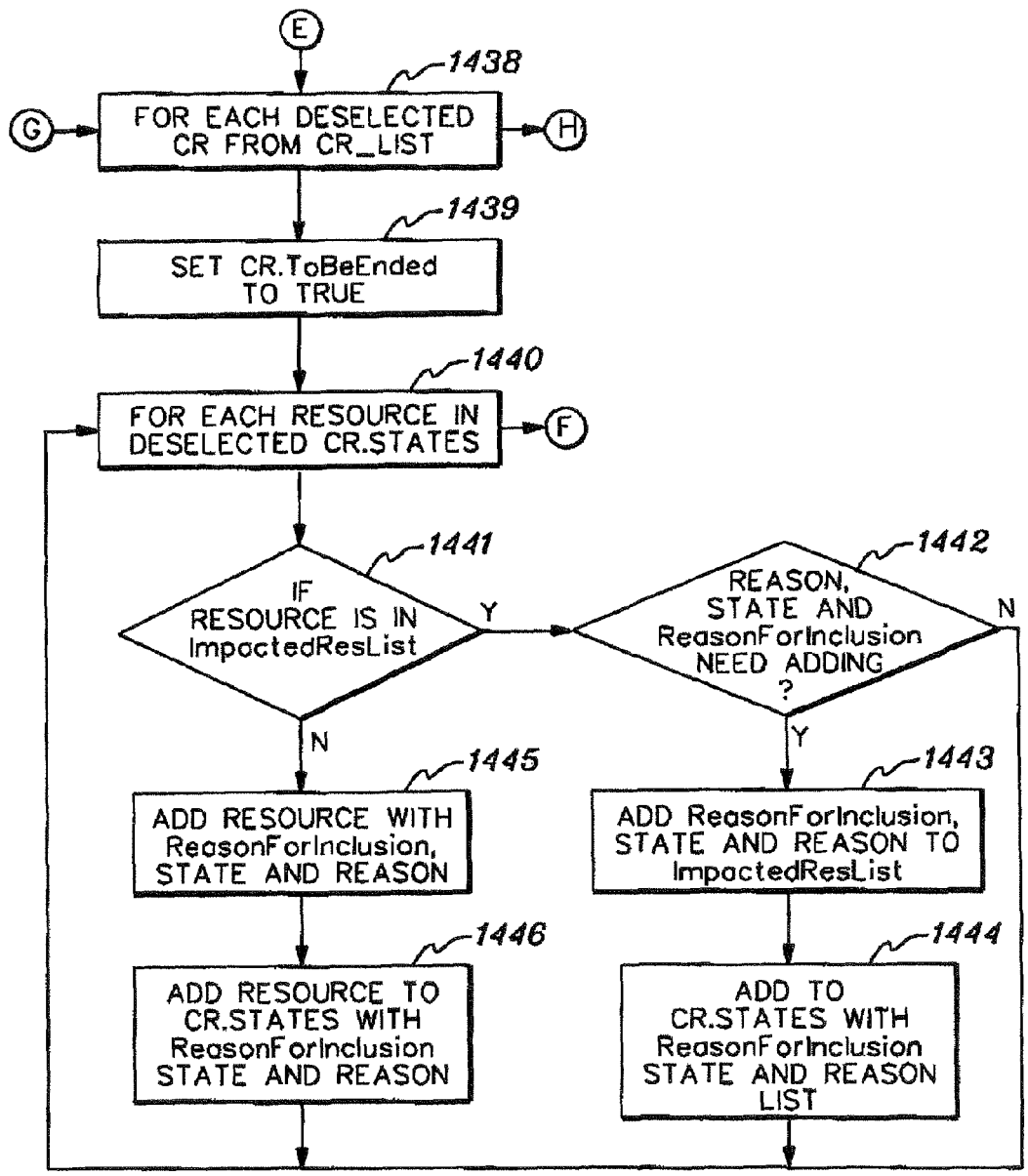
Figure 14F:
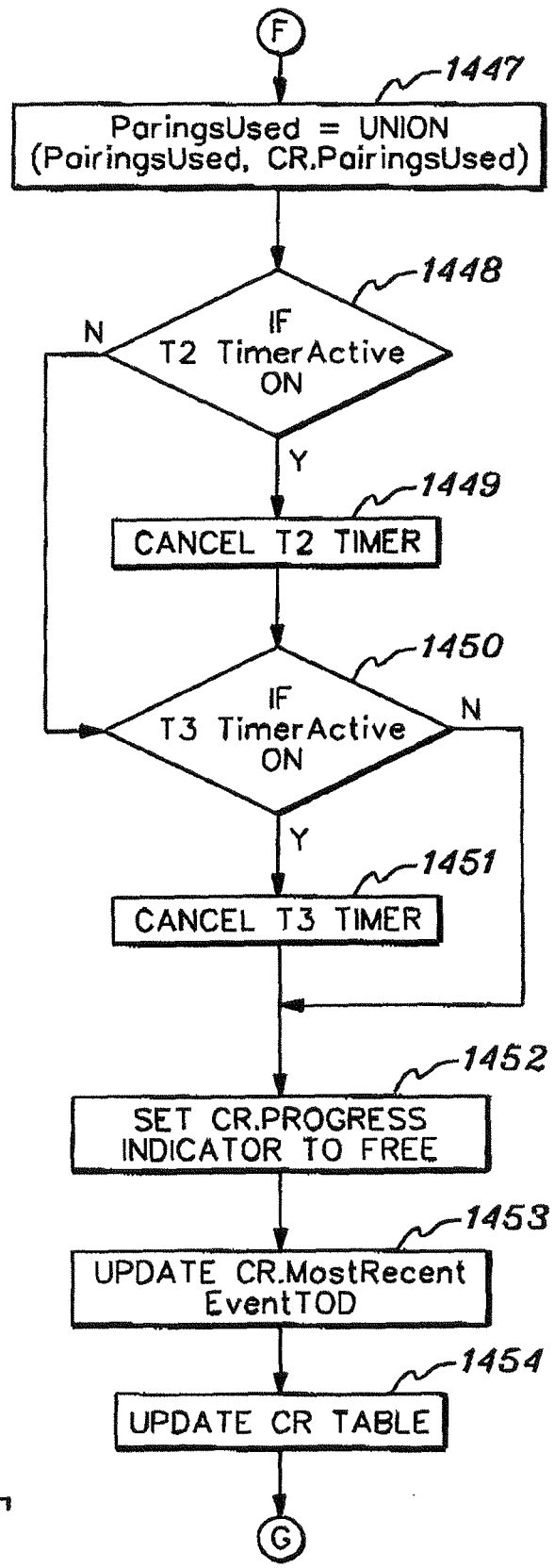

When all resources have been processed for the CR, STEP 1440, the pairings from the deselected CR are merged with the pairings in the selected CR, STEP 1447 (FIG. 14F). If the T2 interval timer for the deselected CR has been set, INQUIRY 1448, it is cancelled through, for instance, invocation of system services, STEP 1449. Thereafter, or if the T2 interval timer is not set, if the T3 interval timer for the deselected CR has been set, INQUIRY 1450, it is also cancelled through, for instance, invocation of system services, STEP 1451. Thereafter, or if the T3 timer is not set, the deselected CR is prepared for reuse by setting the CR.Progress indicator to Free, STEP 1452. Latent resource data query responses are discarded as a result of updating the most recent event TOD, CR.MostRecentEventTOD, STEP 1453. Also, the deselected CR is recorded in the CR table and serialization is released, STEP 1454, and processing continues at STEP 1438 (FIG. 14E).

Figure 14G:
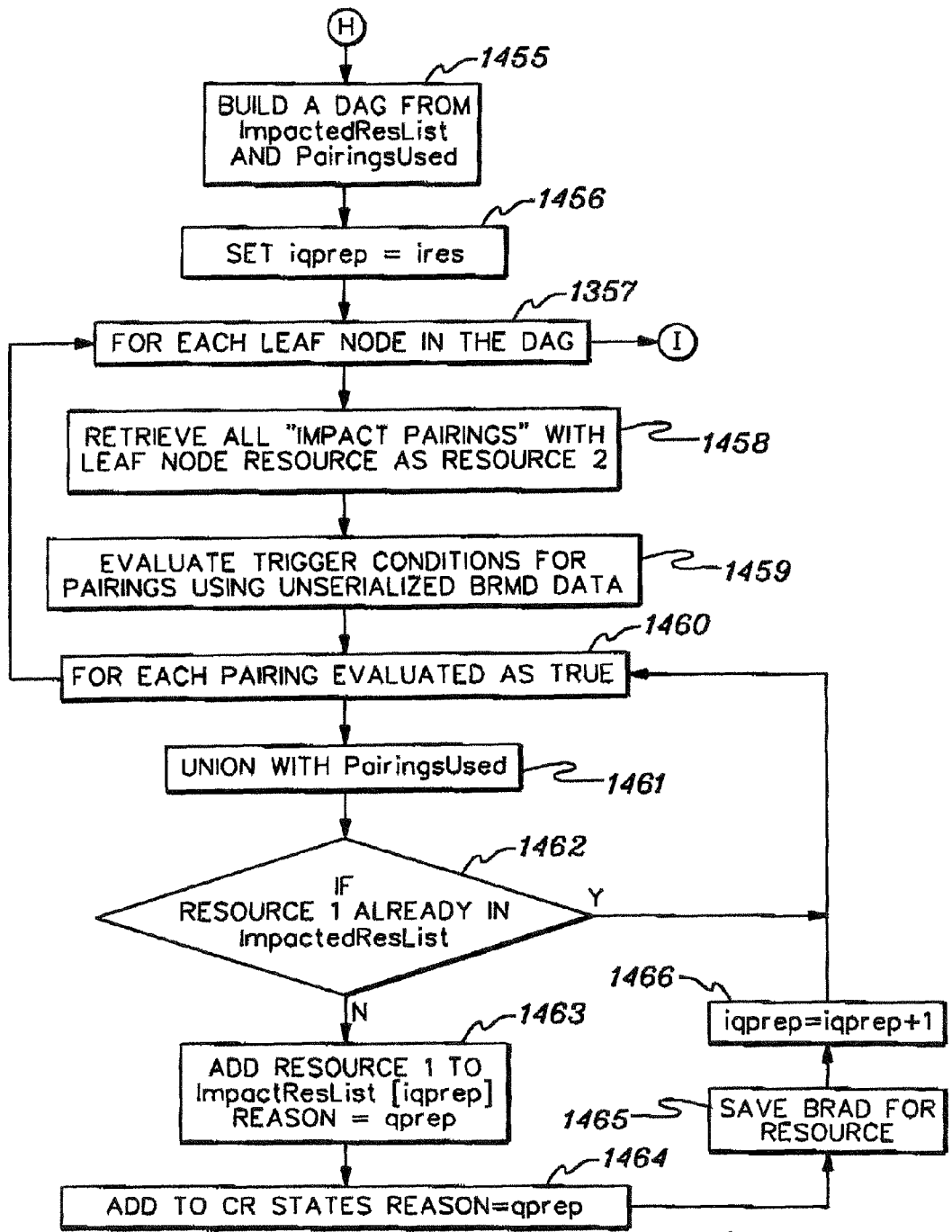

When the deselected CRs are processed, processing continues with STEP 1455 (FIG. 14G). Similarly, if no CR merge processing is required, INQUIRY 1436 (FIG. 14D), processing continues at STEP 1455.

When CR merge processing has completed, INQUIRY 1438, or is not required, INQUIRY 1436, AsynchQueryBuild searches for resources which have not reported an event, but which may have been the cause of "failed" or "degraded" reported events. Processing begins by forming a directed acyclic graph (DAG) of the resources in the CR.States array using the saved pairings used, STEP 1455 (FIG. 14G). An index to add resources to the end of the list of impacted resources (ImpactedResList) is set to the current end of the array, STEP 1456. For each leaf node in the DAG, there exists the possibility of a perpetrating resource which caused the reported event.

Thus, for each leaf node in the DAG, STEP 1457, impact pairings with the leaf node as Resource 2, the effected resource, are selected from the BRRD table, STEP 1458. Trigger conditions for the returned pairings are evaluated using unserialized BRMD data to determine if the pairing is currently applicable, STEP 1459.

For each returned pairing which is currently applicable, STEP 1460, the pairing is added to the parings used in building the CR, CR.ParingsUsed, STEP 1461. If Resource 1 from the pairing is already in the ImpactedResList, INQUIRY 1462, the next pairing is evaluated, STEP 1460. Otherwise, Resource 1 is added to the ImpactedResList in the array located by the index for adding perpetrating resources, STEP 1463. The Reason for the resource being part of the CR is indicated as questioning perpetration, qperp. Resource 1 is also added to the CR.States array with Reason qperp, STEP 1464. The mechanism to request data regarding Resource 1 is saved, STEP 1465, and the next array location for adding perpetrating resources to ImpactedResList is updated, STEP 1466, before evaluating the next pairing, STEP 1460.

Figure 14H:
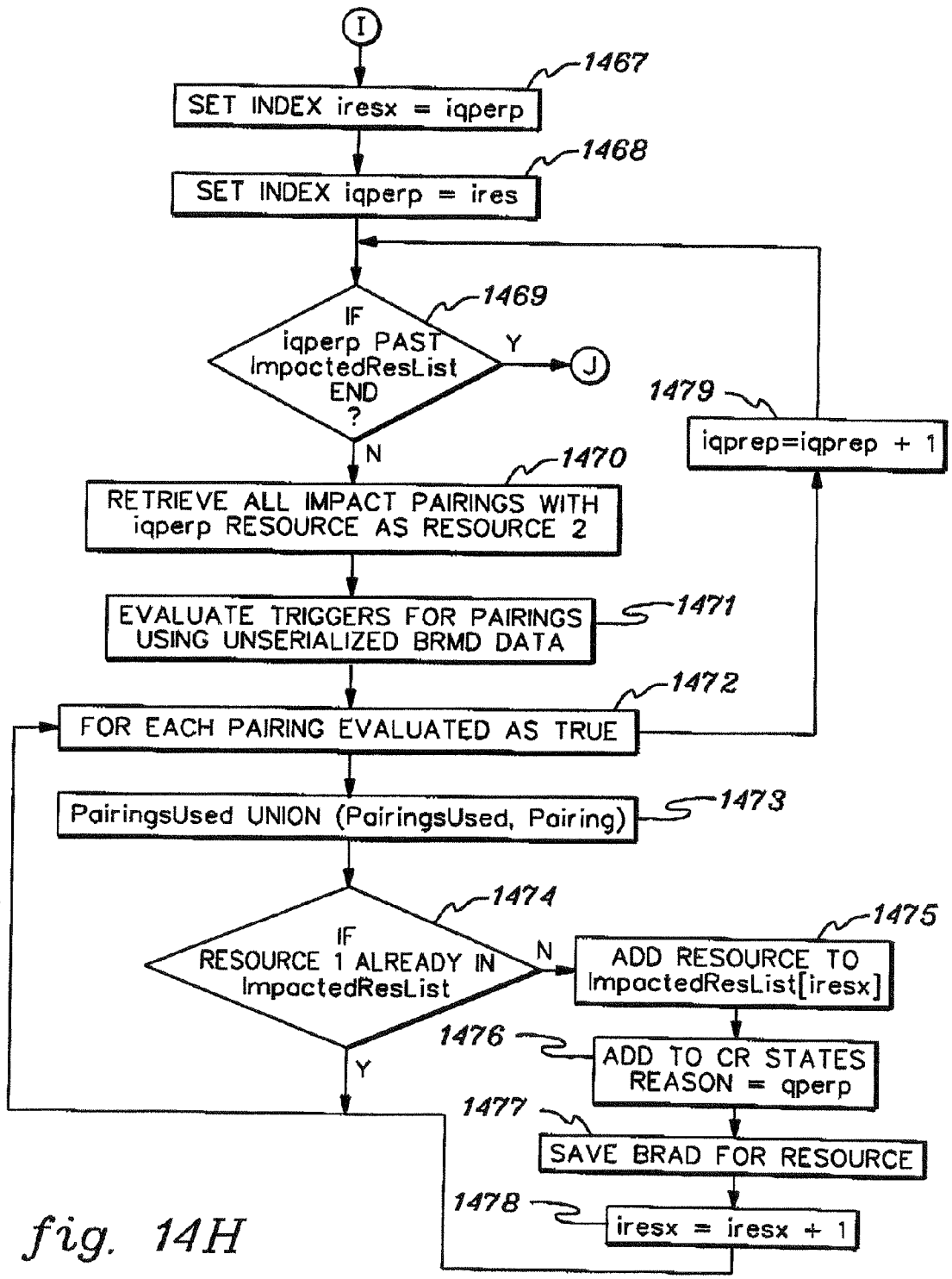

Processing continues for the pairings for each leaf node. Thereafter, having located the first candidate for perpetrating resources being in the CR, the chain of resources having the ability to result in the perpetrating resource being failed or degraded is processed with each node in the chain added to the CR for evaluation as a perpetrating resource. Processing begins by setting an index for additions to the ImpactedResList where the first available array entry exist, at iqperp, STEP 1467 (FIG. 14H). The index into the ImpactedResList for perpetrating resources is reset to the beginning of the perpetrating resource candidates, ires, STEP 1468. When the last perpetrating resource candidate has been evaluated, INQUIRY 1469, processing continues by forming request messages for resource data, STEP 1480 (FIG. 14I), as described below.

However, if there are still more perpetrating resource candidates to be evaluated, INQUIRY 1469 (FIG. 14H), processing continues, as described herein. Processing for a perpetrating resource may add entries to the ImpactedResList as pairings are evaluated which identify the potential for impact of one resource to effect another already in the CR. Impact pairings with Resource 2 matching the perpetrating resource being processed are retrieved from the BRRD, STEP 1470. Trigger conditions for the returned pairings are evaluated to determine if the pairing is currently applicable, STEP 1471.

For each pairing evaluated as currently applicable, STEP 1472, the pairing is added to the list of pairings used to form the CR, STEP 1473. If Resource 1 from the pairing (i.e., the resource for which a change may cause a failed or degraded condition) is already in the ImpactedResList, INQUIRY 1474, the next pairing returned is selected for evaluation, STEP 1472. Otherwise, Resource 1 from the pairing is added to the ImpactedResList at the end, STEP 1475, and added to the CR. States array with Reason set to qperp, STEP 1476. The mechanism to request resource data regarding resource 1 is saved, STEP 1477, and the next location for resources to be added to the ImpactedResList is updated, STEP 1478. Processing then proceeds to STEP 1472.

When all pairings have been evaluated, iqprep is incremented, STEP 1479, and processing continues with INQUIRY 1469. When all perpetrating resources have been identified, the CR parings used is updated, STEP 1480 (FIG. 14I), and the CR is updated in the CR table, STEP 1481.

The final phase of processing for AsynchQueryBuild forms messages to be sent to the centralized focal point for gathering resource data on a system image basis. An index is set to the beginning of the ImpactedResList to step through the resource entries in the array, STEP 1482. When the last resource has been processed, INQUIRY 1483, AsynchQueryBuild has completed. Otherwise, for the indexed resource in the ImpactedResList, a determination is made if it has already been processed, i.e., has this resource already been included in a request for data message, INQUIRY 1484. If so, the next resource in the ImpactedResList is selected, STEP 1485.

For each resource in the ImpactedResList which has not already been processed, INQUIRY 1484, an in-memory list of resources for which data is being requested, BRAD_List, is set to null, STEP 1486, and then updated with the resource from the ImpactedResList, STEP 1487. Further, the entry in the ImpactedResList is marked as processed, STEP 1488.

For every subsequent resource in the ImpactedResList, an index is established, STEP 1489 (FIG. 14J), and each remaining array entry is processed. For each remaining ImpactedResList array entry, if the resource is not on the same system as the seed resource placed in the BRAD_List, INQUIRY 1490, the entry is skipped and the next entry selected for evaluation, STEP 1493. For those resources on the same system, INQUIRY 1490, the resource is added to the BRAD_List of resources for which resource data is being requested, STEP 1491, the associated ImpactedResList entry is marked as processed, STEP 1492, and the index is incremented, STEP 1493.

Figure 14I:
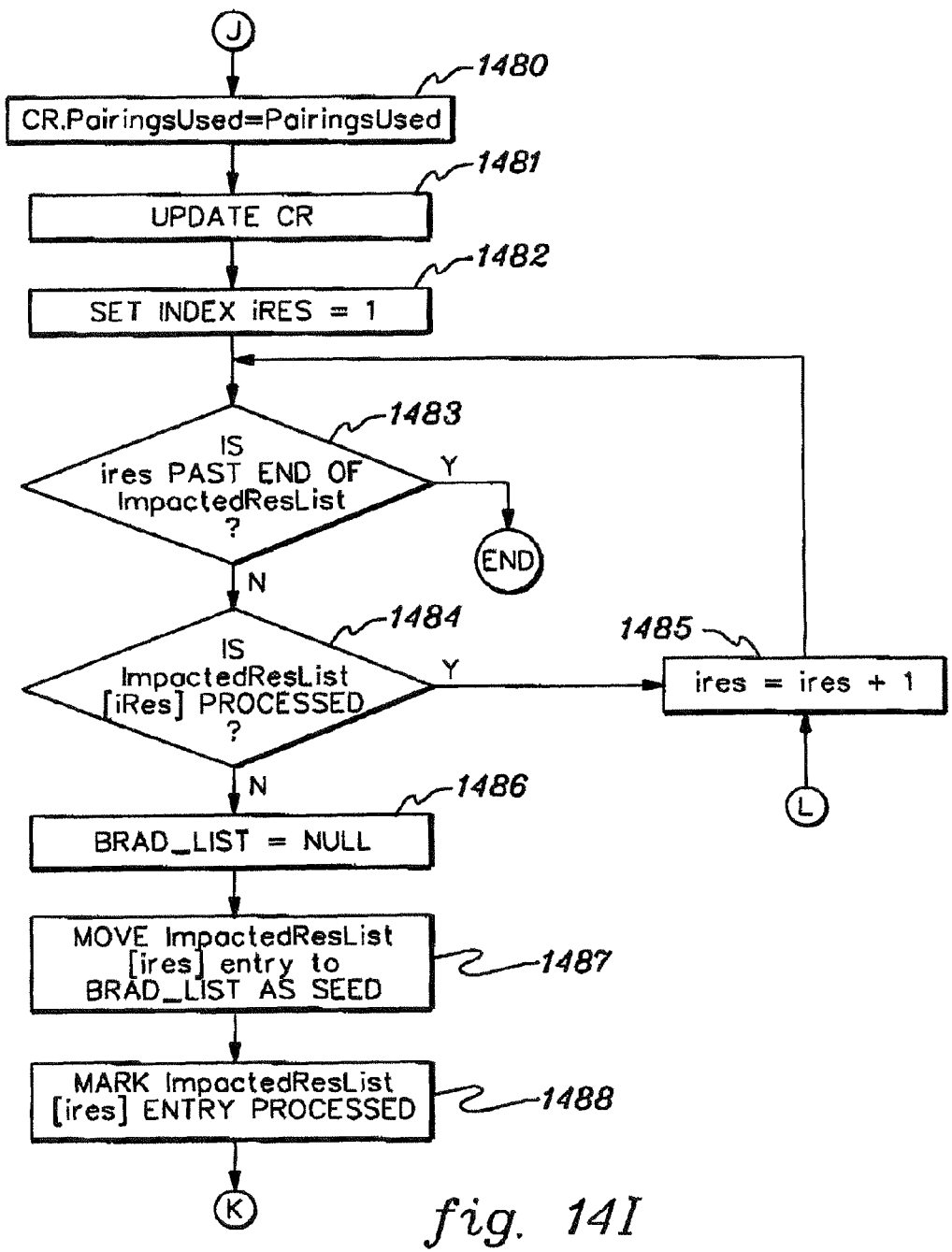
Figure 14J:
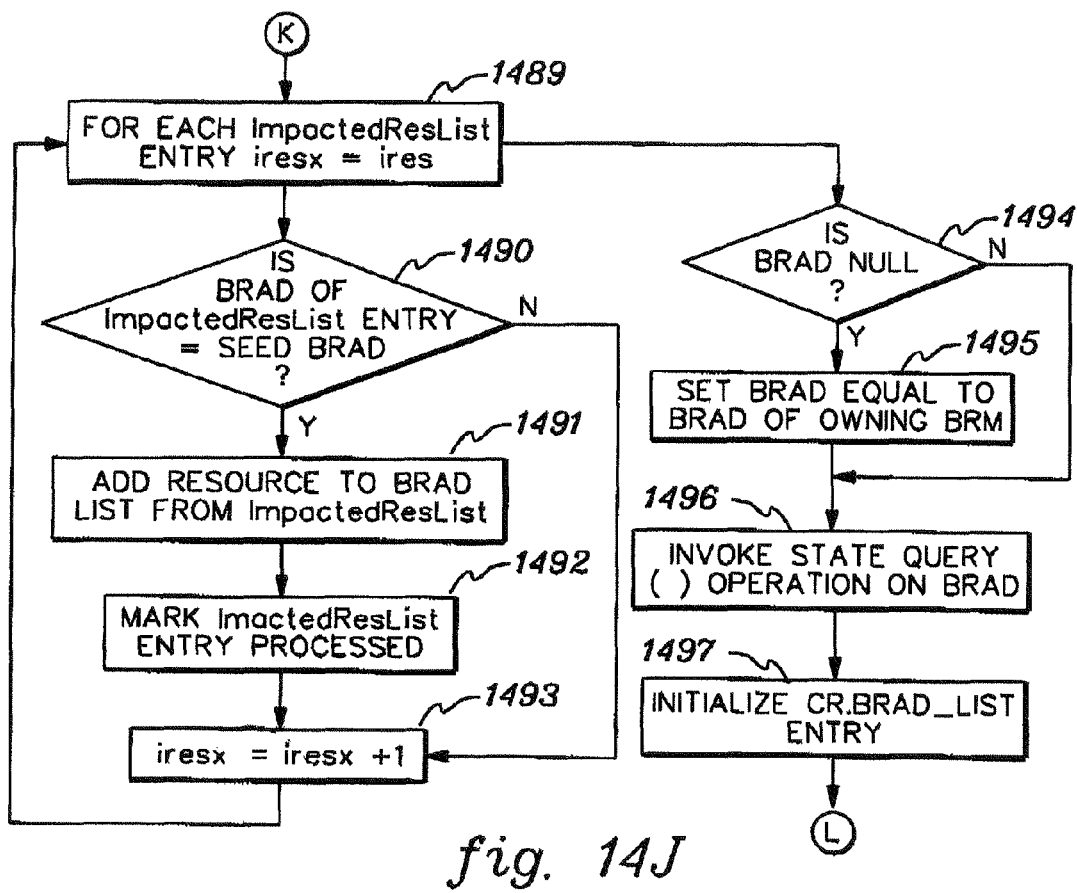

When all resources in the ImpactedResList have been evaluated, STEP 1489, a determination is made if the mechanism for retrieving data for resources has been established, INQUIRY 1494. If not, the system hosting the BRM is selected as the target for the resource data request message, STEP 1495. Thereafter, or if the mechanism has been established, a state query for resource data is initiated to the mechanism for requesting resource data, STEP 1496, and the requested target is saved for later processing when the response message is received, STEP 1497. Finally the next entry in the ImpactedResList is indexed for evaluation, STEP 1485 (FIG. 14I).

Associate with Existing CR

In addition to creating a new CR, in one embodiment, logic is provided to include a resource within an existing Containment Region. One example of this logic is described with reference to FIGS. 15A-15F. As one example, the BRM performs this logic.

In processing, the failing resource and the remainder of the impacted resource list are included in an existing Containment Region. An existing Containment Region is used if the BRM detects that there is an intersection between the impacted resource list created by the RS and an existing Containment Region. Input includes the ImpactedResList, PairingsUsed list and CR_list of intersecting Containment Regions; and the contents of the existing CR are updated, as well as the existing timing framework.

Figure 15A:
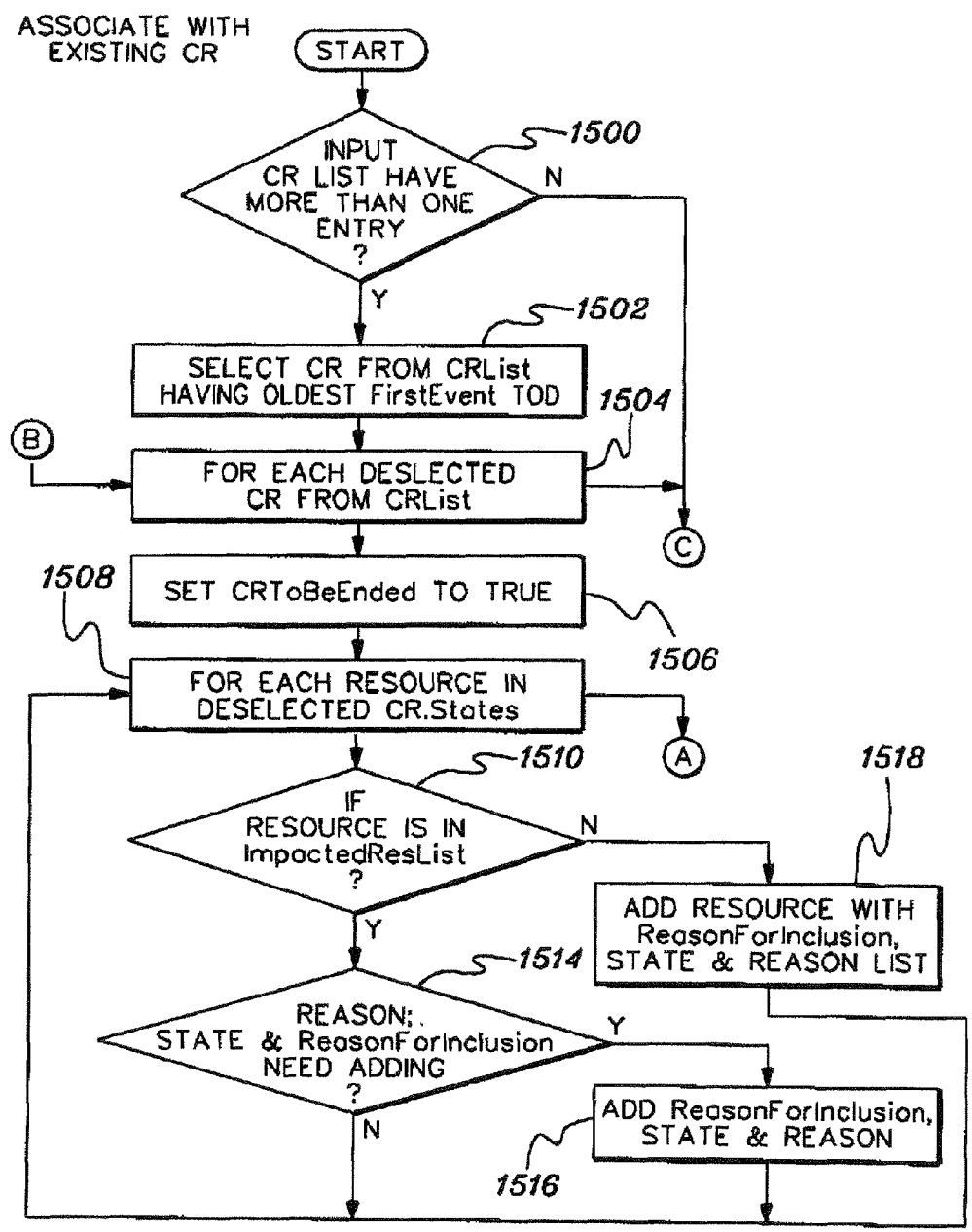
FIGS. 15A-15D depict one embodiment of the logic to associate a resource with an existing Containment Region, in accordance with an aspect of the present invention.

Referring to FIG. 15A, processing first determines if the CR_List has more than one entry, INQUIRY 1500. If more than one CR intersects, the CR_List entry with the oldest FirstEventTod is chosen, STEP 1502, and each other CR_List entry is merged in a series of steps, STEP 1504. First, an indicator is set reflecting the decision to end the deselected CR by setting the ToBeEnded flag to true, STEP 1506. Then, each resource in the CR.States array of the deselected CR is processed, STEP 1508. If the resource from the CR.States array already exists in the ImpactedResList, a comparison of the ImpactedResList and CR.States data on ReasonForInclusion, State and Reason is made, INQUIRY 1514. If updates to the ImpactedResList is required, the CR.States data on ReasonForInclusion, State and Reason are added to the ImpactedResList, STEP 1516. Thereafter, or if updates are not required, processing continues with STEP 1508.

Returning to INQUIRY 1510, if the resource from CR.States is not already in the ImpactedResList, the ReasonForInclusion, State and Reason are added to a new CR.States array entry, STEP 1518. After updating the CR.States array for a resource, the next resource in the deselected CR is processed, STEP 1508.

Figure 15B:
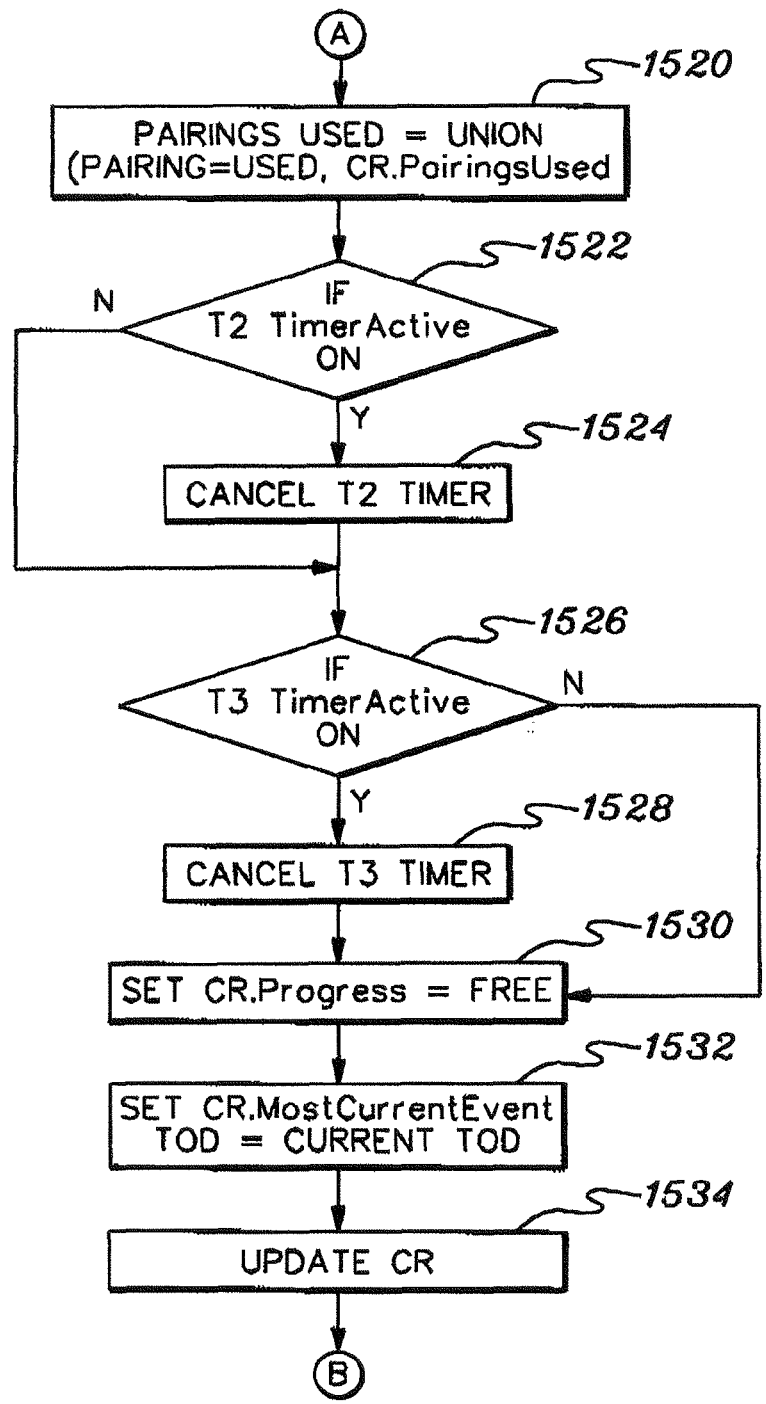
Figure 15C:
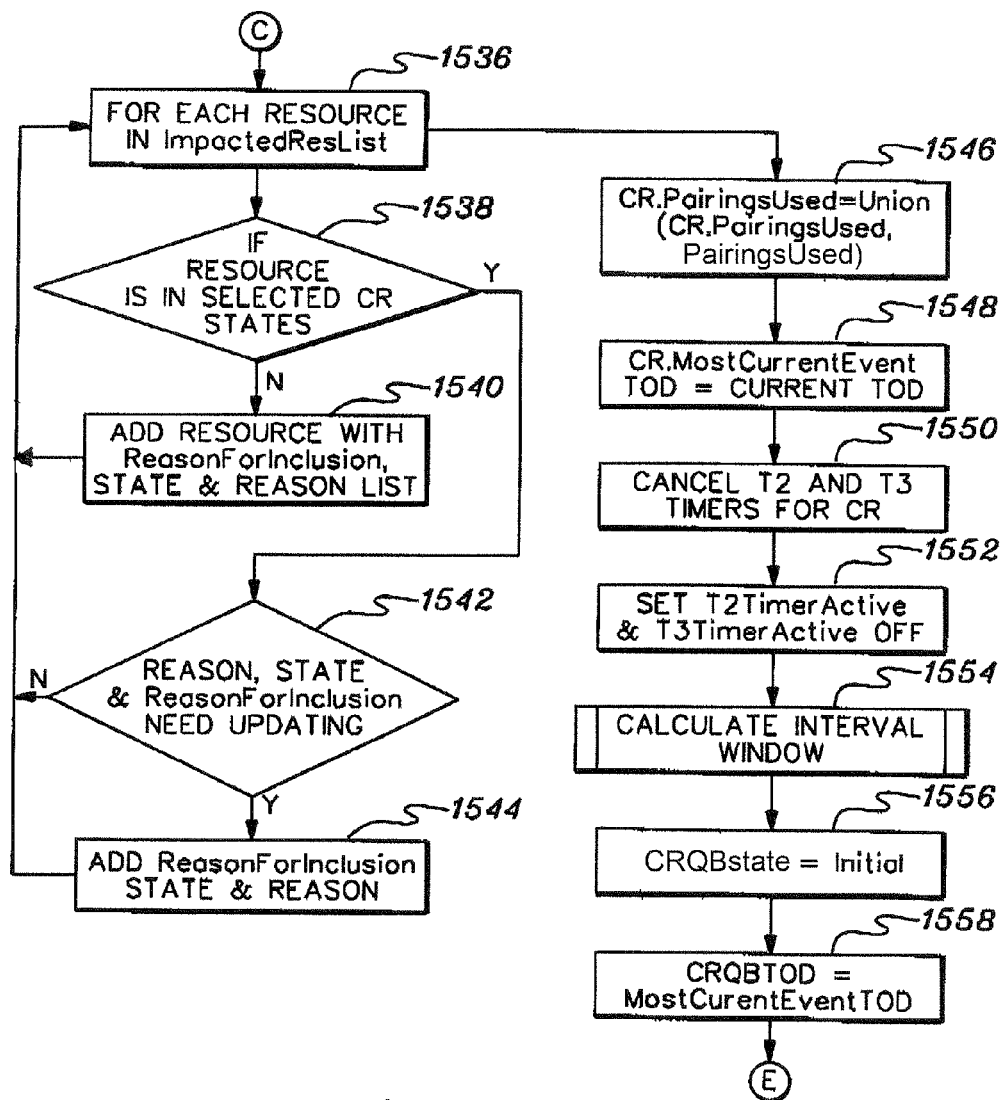
Figure 15D:
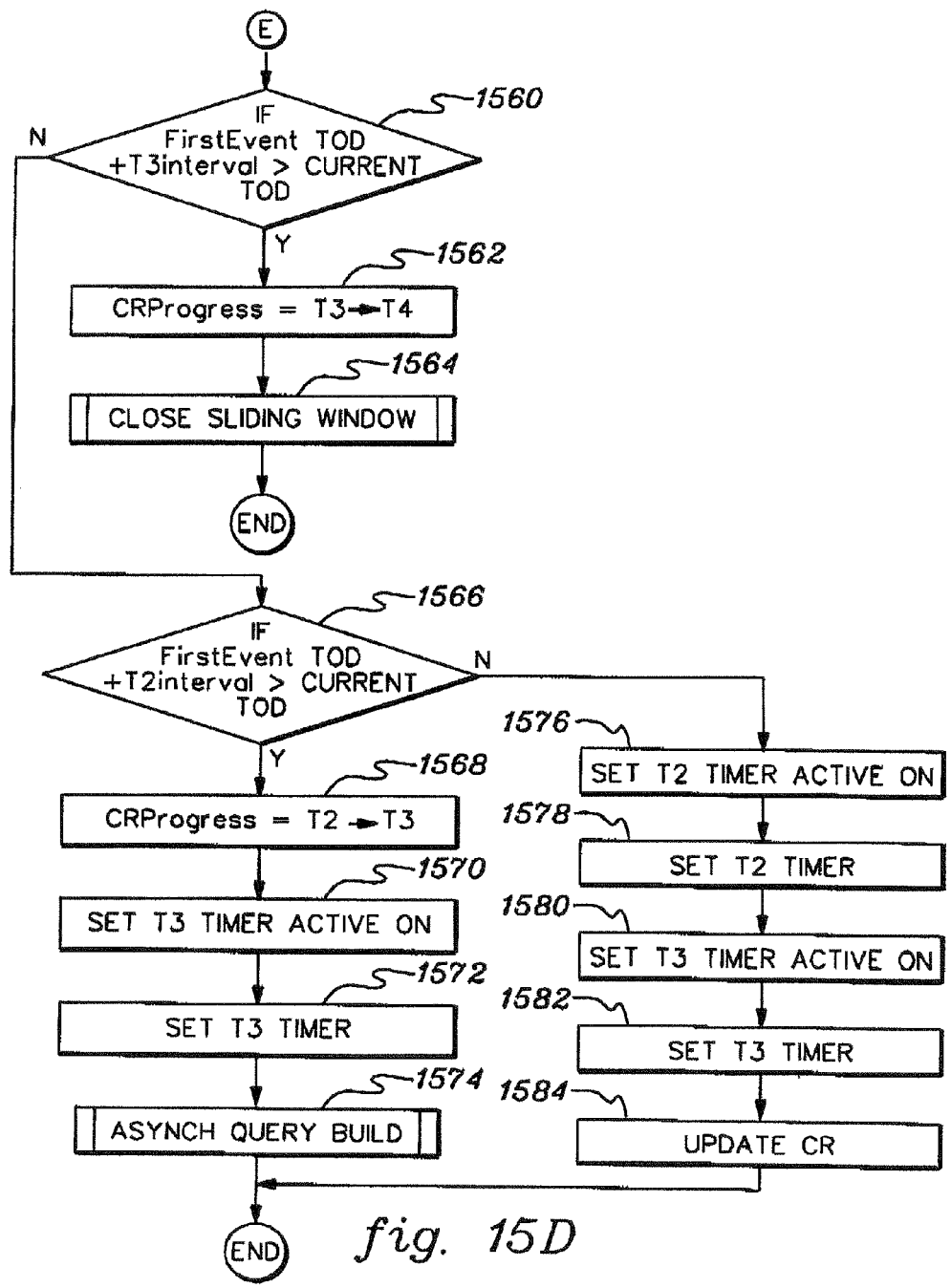

When all resources from a deselected CR have been processed, STEP 1508, pairings used in forming the deselected CR are added to the list of pairings to be saved with the selected CR by forming the union of the input PairingsUsed and parings for the deselected CR, STEP 1520 (FIG. 15B).

If the deselected CR has associated timers, they are canceled and the CR is prepared to be returned to the free pool. For example, if the timer for the expiration of the T2 interval has been set, INQUIRY 1522, that interval timer is cancelled using, for instance, system services, STEP 1524. Thereafter, or if T2 TimerActive is off, a determination is made as to the status of the T3 TimerActive, INQUIRY 1526.

If the timer for the expiration of the T3 interval has been set, that interval timer is cancelled using, for instance, system services, STEP 1528. After canceling any associated timers, the CR is indicated as available for reuse by setting the CR.Progress indicator to Free, STEP 1530, and setting the time of the most current event to be later than any previous events, i.e., MostCurrentEventTOD set equal to the current TOD, STEP 1532. These updates result in any responses to resource query to be discarded in the ResponseToQuery processing, described below. The deselected CR is updated in the CR table, STEP 1534, and the next deselected CR is processed, STEP 1504 (FIG. 15A).

When all deselected CR(s) have been processed or if there was only one CR in the input CR_List, processing is performed to merge the input of the formed list of impacted resources, ImpactedResList, with the selected or only CR. Each resource in the ImpactedResList is processed, STEP 1536 (FIG. 15C), by first determining if it already exists in the selected CR.States array, INQUIRY 1538. If not already in the CR.States array, information on the resource from the ImpactedResList is added to a new CR.States array entry, including, for instance, identification of the resource, the one or more resources causing it to be included, ReasonForInclusion, the state of the resource, and the one or more reasons why the resource was directly reported through an event or implicated by a pairing as impacted, Reason, STEP 1540. Thereafter, processing continues at STEP 1536.

If the resource already exists in the CR.States array, INQUIRY 1538, a comparison of data on the resource in CR.States and data on the resource from the ImpactedResList is made, INQUIRY 1542. If data on the resource exists in the ImpactedResList which is not already in the CR.States array, additions to the existing CR.States array entry are made including, for example, updates for additional data on ReasonForInclusion, State and Reason, STEP 1544. Thereafter, or if updates are not needed, processing continue with STEP 1536.

When all resources have been merged into the selected CR, pairings used in determining the set of impacted resources are updated by forming the union of the existing pairings in CR.PairingsUsed and the pairings identified from the new event and any deselected CR(s), PairingsUsed, STEP 1546.

Processing continues by determining the appropriate phase of CR processing. The TOD representing the most current event for this CR, MostCurrentEventTod, is set to the current TOD, STEP 1548. Any existing T2 or T3 interval timers for the CR are cancelled using, for instance, system services, STEP 1550, and indicators for timer interval setting, T2TimerActive and T3TimerActive, are set off, STEP 1552. Further, a new timing framework is determined, STEP 1554. A variety of mechanisms exist for setting the timing framework including a fixed interval provided by BR, a fixed interval established by the customer or a variable interval set through processing of CalculateIntervalWindow, described herein.

Initialization of fields employed by the process gathering data on resources following the most recent failure are set by indicating the current resource query state being initial, CRQBState=Initial, STEP 1556, and the TOD for resource state requests messages, CRQBTOD, being equal to the most recent event, MostCurrentEventTOD, STEP 1558.

If the current time is later than the expiration of the interval for completion of gathering resource data, T3 interval, INQUIRY 1560 (FIG. 15D), the CR is indicated to be in the phase of processing to build the recovery process, T3→T4, STEP 1562, and the CloseSlidingWindow routine is invoked, STEP 1564.

Returning to INQUIRY 1560, if current time is not later than the expiration of the T3 interval, processing continues at INQUIRY 1566. If the current time is later than the expiration of the interval for initiating resource data collection, T2 interval, the CR is indicated to be in the phase of processing to send messages to gather resource data, T2→T3, STEP 1568. The timer for expiration of the T3 interval is indicated as having been set, STEP 1570, and the T3 interval timer is established through invocation of, for instance, system services, STEP 1572. Subsequently the AsynchQueryBuild routine is invoked, STEP 1574.

Returning to INQUIRY 1566, otherwise, the CR continues in the phase of awaiting events related to the outage reported. The T2 interval timer is indicated as having been set, STEP 1576, and the T2 timer is set through, for instance, invocation of system services, STEP 1578. Additionally, the T3 interval timer is indicated as having been set, STEP 1580, and the T3 timer is set through, for instance, invocation of system services, STEP 1582. Processing concludes by updating the CR, STEP 1584.

Response to Query

The Response to Query logic describes the handling of the asynchronous request to the BRAD(s) for retrieval of resource data subsequent to a resource being included in a CR. This routine sits and waits to receive response messages from the BRAD. One embodiment of the logic for the Response to Query flow is described with reference to FIGS. 16A-16E. In one example, this processing is performed by the BRM component of the BR system.

Figure 16A:
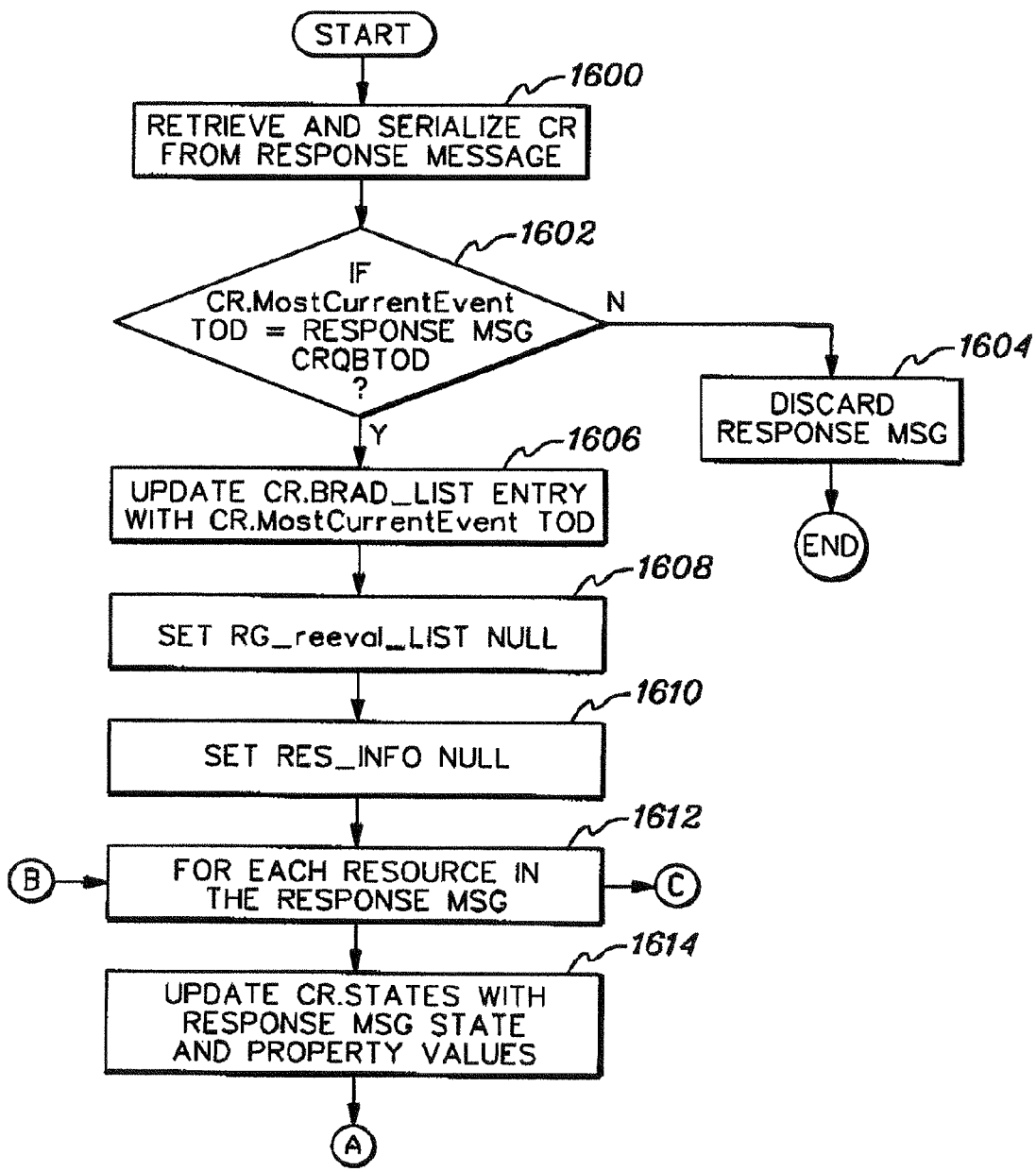
FIGS. 16A-16E depict one embodiment of the logic used in response to a query, in accordance with an aspect of the present invention.

Referring to FIG. 16A, the CR identified in the response message is retrieved and serialized, STEP 1600. If the response is for a CR which has already been processed, INQUIRY 1602, it is discarded, STEP 1604. This is detected by checking for the most current event TOD in the CR matching that in the response message. If the response is not to be processed, it is discarded and processing ends.

Otherwise, processing of the response updates the array element in the CR reflecting a response from the mechanism for requesting resource data that has responded with the TOD matching the most current event, STEP 1606. Two in-memory lists are initialized to null, RG_reeval_list and Res_info_list, which are subsequently used to evaluate state changes in Resource Groups (RG(s)) triggered by resource changes, STEPs 1608, 1610.

Figure 16B:
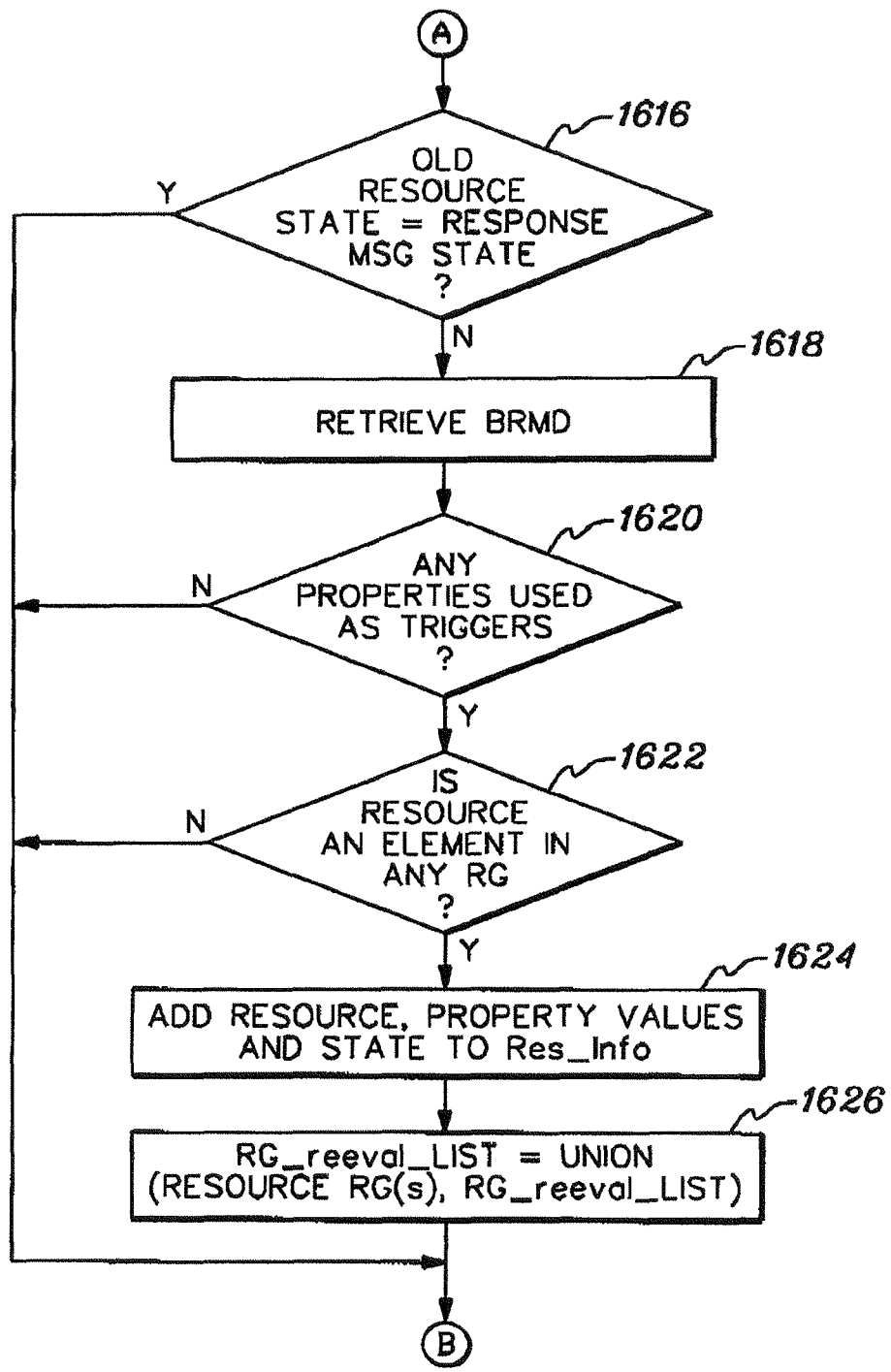

A response message may include data for multiple resources, since the request for resource data may have included multiple resources. For each resource in the response message, STEP 1612, the corresponding CR.States resource state and property values are updated, STEP 1614. If the resource state prior to processing the response message was the same as the state in the response message, INQUIRY 1616 (FIG. 16B), updates for RG changes need not be evaluated. Thus, processing proceeds to STEP 1612 (FIG. 16A). Otherwise, the BRMD for the resource is retrieved, STEP 1618 (FIG. 16B). If there exist any properties which may be used in evaluating triggers, INQUIRY 1620, and the resource is an element in one or more RG(s), INQUIRY 1622, the resource state and property/values are saved in the Res_info_ list, STEP 1624. RG(s) in which the resource is an element are unioned with the RG_reeval_list for subsequent processing, STEP 1626. Processing then continues at STEP 1612 (FIG. 16A).

Figure 16C:
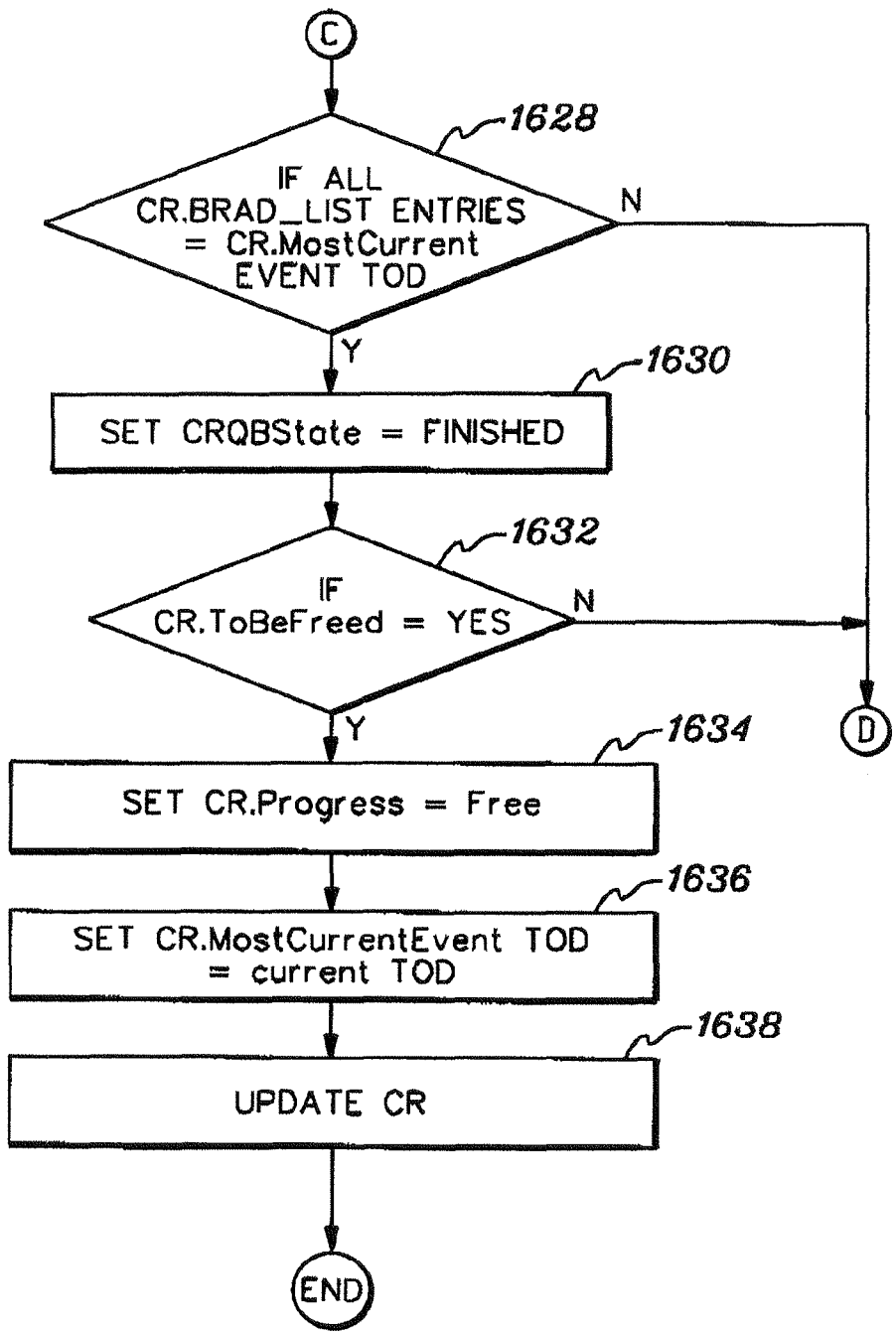

Returning to INQUIRIES 1620, 1622 (FIG. 16B), if there are no properties used as triggers or the resource is not an element in any RG, processing continues to STEP 1612 (FIG. 16A). When all resources data in the response message has been processed, an evaluation is made to determine if all response messages have been received for this CR, INQUIRY 1628 (FIG. 16C). If so, the CR has completed query processing for the set of resources it currently contains and is so indicated with CRQBState being set to Finished, STEP 1630.

If the CR is to be freed as indicated by processing which merged the CR and set CT.ToBeFreed, INQUIRY 1632, the CR.Progress field is set to Free, STEP 1634, and the most current event TOD is updated to the current event, so any latent response messages are discarded, STEP 1636. The CR is updated and processing ends, STEP 1638.

Figure 16D:
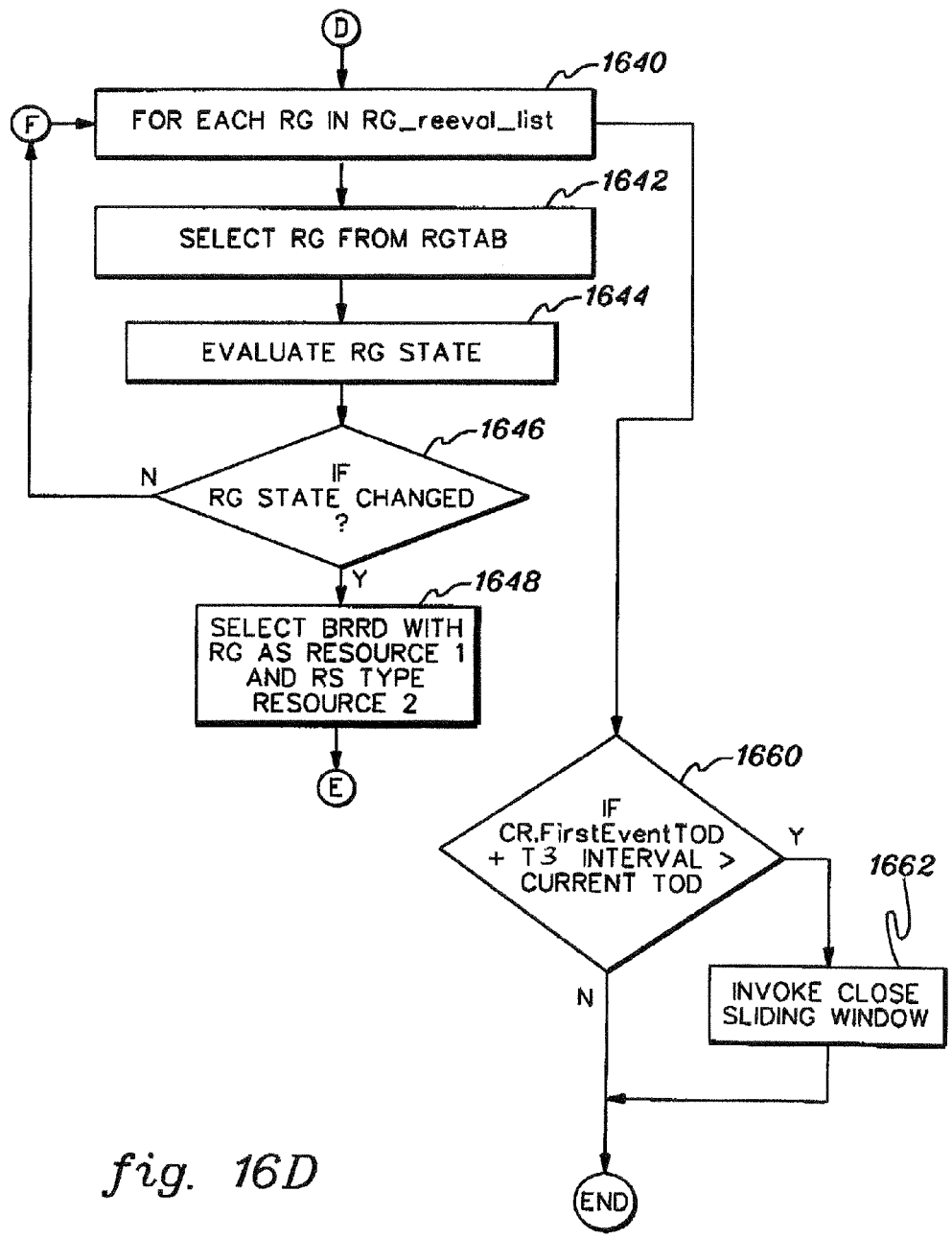
Figure 16E:
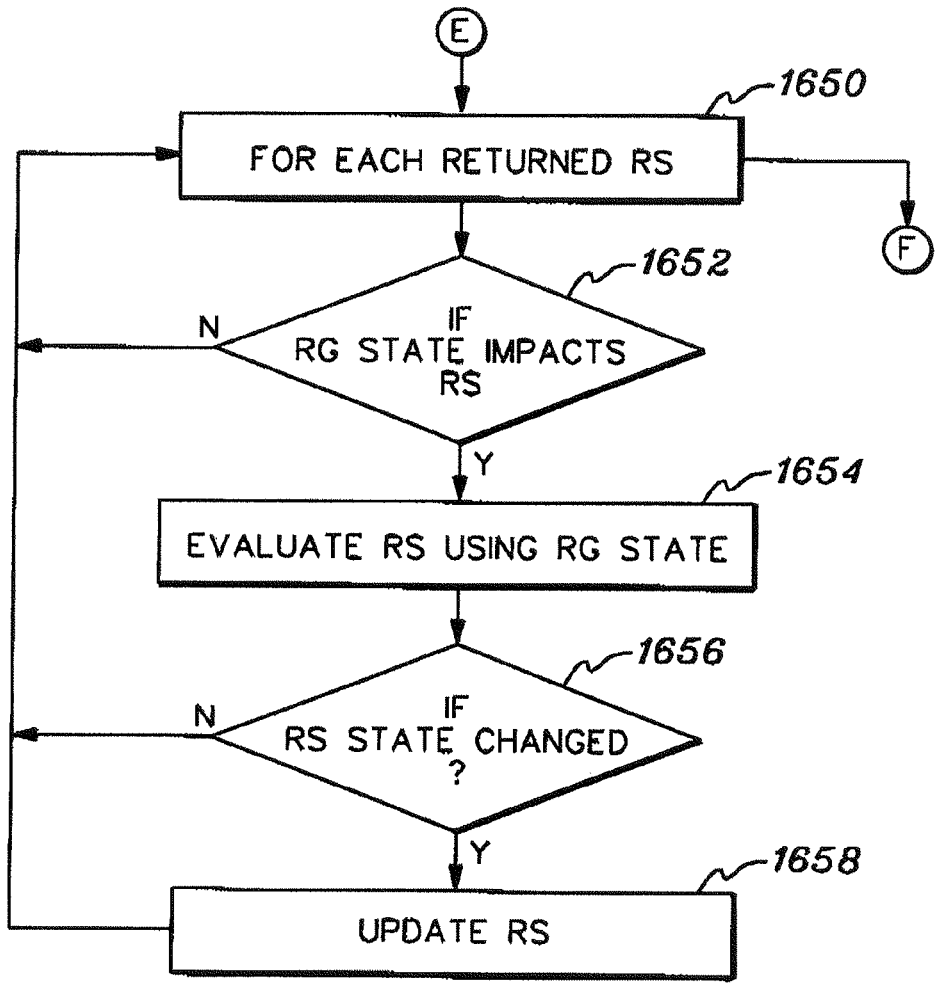

Returning to INQUIRY 1632, if the CR is not to be freed, processing continues to update any required RG states, STEP 1640 (FIG. 16D). Likewise, if all response messages have not been received for this CR, INQUIRY 1628 (FIG. 16C), processing proceeds to STEP 1640 (FIG. 16D).

At STEP 1640, for each RG in the RG_reeval_list, the RG is retrieved and serialized from the RG table, STEP 1642. The RG aggregate state is evaluated using the state and resource property/values saved in the Res_info_list, STEP 1644. If the RG state has not changed state, INQUIRY 1646, the next RG is evaluated, STEP 1640. Otherwise, those RS(s) which may have changed aggregated state due to modification of the RG state are retrieved from the BRRD table by selecting rows with a matching RG as Resource 1 and a RS as Resource 2 type, STEP 1648.

For each returned RS, STEP 1650 (FIG. 16E), if the RG state impacts the RS, INQUIRY 1652, the RS state is evaluated using the modified RG state, STEP 1654. If the RS state changes, INQUIRY 1656, it is updated in the RS table, STEP 1658. Processing then continues at STEP 1650.

Returning to INQUIRIES 1652 and 1656, if the RG state does not impact the RS or if the RS state has not changed, processing continues with STEP 1650. After processing the returned RS(s), the logic continues at STEP 1640 (FIG. 16D).

When the RG(s) in the RG_reeval_list have been processed, a determination is made as to whether CR. FirstEventTOD+ T3Interval>Current TOD, INQUIRY 1660. If so, close sliding window is invoked, STEP 1662. Thereafter, or otherwise, processing ends. This concludes description of the response to query processing.

Use of CR

Containment Region data formulated in the foregoing processing steps may be used to form a set of actions to alter the IT environment. For example, if outage events are used as the basis for CR formation, a recovery process may be constructed to alter the IT environments to restore a business application's service. If performance degradation related events are used as the basis for CR formation, a set of operations to alter the performance of the IT environment may be created.

As an example, recovery process formation may take one of many forms. A customer could take the data formulated in the CR and evaluate the implication changes in resource state and property/values to manually construct a plan of action to restore IT service. Alternatively, the contents of the CR can be made available to each of the resources contributing to delivery of a business application for evaluation and independent recovery processing. A further alternative may be use of the CR content to form a recovery process by the BR system as outlined in the following example.

1. A CR may be populated with the failing resource and any impacted resources based on the 1st level state aggregation rules, as described above. Recovery processing operates on the basis of the input list of resources for evaluation. If the techniques of CR processing are utilized, further advantages are gained in achieving recovery time goals and in correlating related failures.
2. Processing which delays for accumulation of errors may be followed by evaluation of the environment to determine if additional resources should be included in the evaluation of the outage, as described above.
3. Just prior to invoking recovery processing, current resource state may be retrieved, as described above.

At this point in time, the BRM has the following information available to it to generate a recovery process, as examples.

1. A list of resources which may be failed or degraded. In one implementation, this list may be contained in a Containment Region, and in particular, be represented by the CR.States array.
2. Resource relationships reflecting the impact a failure or degradation of one resource can have on other resource(s). In one implementation, this may be provided by impact pairings in the BRRD.
3. Operation ordering information indicating between two operations on the same or different resources if one operation is required to come before or after the other. In one implementation, this may be provided by operation ordering pairings in the BRRD.
4. Operation effect information indicating what execution of an operation on a resource may be to the state of the same or another resource. In one implementation, the information may be provided by operation effect pairings in the BRRD.
5. Order for operation escalation when a recovery operation fails. In one implementation, the information may be provided by Order and Vorder fields within an operation table.

The steps used to create a recovery process include, for instance:

1. For nonresponsive resources, determine if there is an operation to be invoked to place the resource in a determinate state. Iteratively process the one or more DAG(s) representing resources in the CR under evaluation for recovery processing from the root of the leaf nodes. Perform at most one operation to achieve a determinate state for each distinct branch of the DAG.
2. When all determinate actions on nonresponsive resources have been undertaken, evaluate the DAG from root to leaf nodes. For each distinct branch of each DAG, perform one recovery operation for a failed or degraded resource.
3. For each iteration of the recovery process, invoke a routine to determine the set of dependent operations to be included in the set of recovery operations invoked.
4. For each iteration of the recovery process, invoke a routine to assess constraints on operations impacting resources supporting two or more business applications.
5. Invoke a routine to submit the recovery operations for each iteration of the recovery process. Activities to monitor the execution of the recovery operations may be provided.
6. Monitoring of activities in the recovery process determine if additional iterations of recovery processing are required or when recovery processing has succeeded in making the IT environment available.

Described in detail herein is a capability for identifying resources affected by an event and to aggregate current resource state relating thereto. To facilitate this identification, Containment Regions are created that relate events and aggregate current resource state information.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 17:
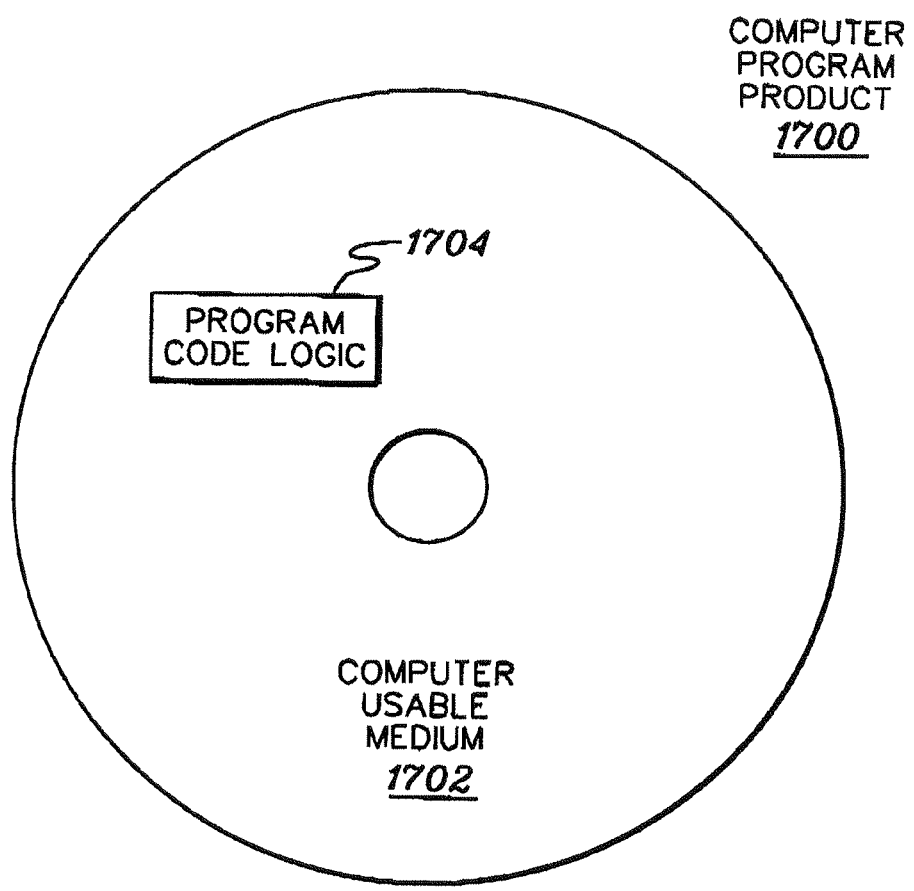
FIG. 17 depicts one embodiment of a computer program product incorporating one or more aspects of the present invention.

One example of an article of manufacture or a computer program product incorporating one or more aspects of the present invention is described with reference to FIG. 17. A computer program product 1700 includes, for instance, one or more computer usable media 1702 to store computer readable program code means or logic 1704 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for identifying resources related to a particular event or related events and for aggregating state information for those resources. This enables, for instance, the ability to readily identify the scope and impact of an event, such as a failure. In one example, this information is used to manage one or more aspects of an IT environment, such as recovery.

Although various embodiments are described above, these are only examples. For example, the processing environments described herein are only examples of environments that may incorporate and use one or more aspects of the present invention. Environments may include other types of processing units or servers or the components in each processing environment may be different than described herein. Each processing environment may include additional, less and/or different components than described herein. Further, the types of central processing units and/or operating systems or other types of components may be different than described herein. Again, these are only provided as examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, although the environments described herein are related to the management of availability of a customer's environment, one or more aspects of the present invention may be used to manage aspects other than or in addition to availability. Further, one or more aspects of the present invention can be used in environments other than a business resiliency environment.

Yet further, many examples are provided herein, and these examples may be revised without departing from the spirit of the present invention. For example, in one embodiment, the description is described in terms of availability and recovery; however, other goals and/or objectives may be specified in lieu of or in addition thereto. Additionally, the resources may be other than IT resources. Further, there may be references to particular products offered by International Business Machines Corporation or other companies. These again are only offered as examples, and other products may also be used. Additionally, although tables and databases are described herein, any suitable data structure may be used. There are many other variations that can be included in the description described herein and all of these variations are considered a part of the claimed invention.

Further, for completeness in describing one example of an environment in which one or more aspects of the present invention may be utilized, certain components and/or information is described that is not needed for one or more aspects of the present invention. These are not meant to limit the aspects of the present invention in any way.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of facilitating management of an Information Technology (IT) environment, said computer-implemented method comprising:
dynamically forming, by a processor at runtime based on an occurrence of an event, a resource set, the dynamically forming comprising:
determining, during a first time interval, an impacted set of resources impacted by the event, the first time interval based on a quantitative business goal defined by a customer for a customer-defined business application, the customer-defined business application executed using one or more resources of the impacted set of resources, and the determining comprising:
using a set of trigger conditions and one or more impact pairings to determine one or more resources to be included in the impacted set of resources, the one or more resources to be included in the impacted set of resources including at least one of one or more resources causing the event and one or more resources negatively impacted from a resource causing the event, and wherein an impact pairing of the one or more impact pairings includes an express statement that explicitly specifies a first resource, a first defined property of the first resource, a second resource paired with the first resource, and a second defined property of the second resource, the second defined property expressly specifying how the second resource is impacted based on the first resource and the first defined property;
gathering states for resources of the impacted set of resources to obtain current states for the resources, the gathering being performed during a second time interval that enables achieving the quantitative business goal, and wherein the gathering includes, for at least one resource of the impacted set of resources, evaluating one or more trigger conditions of one or more impact pairings for the at least one resource to determine real-time applicability of the one or more impact pairings; and
based on the gathered states, including, in the resource set, at least one of one or more resources of the impacted set of resources and an indication of at least one impact pairing based on the evaluating indicating real-time applicability.

2. The computer-implemented method of claim 1, wherein the resource set is a containment region implemented as a plurality of data structures, the plurality of data structures including a containment region data structure that includes various information relating to the containment region, a reason-for-inclusion data structure that includes one or more reasons that a specific resource is under evaluation as potentially impacted, implicated, or perpetrated by the event represented by the containment region, a pairings used data structure that includes one or more impact pairings that caused a resource to be in the impacted set of resources, and a states data structure that includes states of resources associated with the containment region.

3. The computer-implemented method of claim 2, further comprising:
selecting an available containment region data structure to be used for the containment region;
initializing the states data structure based on the impacted set of resources;
initializing the pairings used data structure based on at least one of the impact pairings and the evaluating of one or more trigger conditions; and
updating an indicator in the containment region data structure to indicate a reporting error phase.

4. The computer-implemented method of claim 1, further comprising:
determining whether the resource set is to be formed, wherein the determining whether the resource set is to be formed includes:
monitoring an operational state of resources in a customer-defined grouping of resources for state changes;
based on a state change for a resource in the customer-defined grouping of resources, assessing the state change based on one or more impact pairing rules and an aggregated state of the customer-defined grouping of resources; and
based on the assessing indicating a change in overall state for the customer-defined grouping of resources, determining that the resource set is to be formed.

5. The computer-implemented method of claim 1, wherein the gathering further comprises:
determining whether a resource of the impacted set of resources has an aggregated state associated therewith;
based on the resource having the aggregated state, evaluating the aggregated state; and
updating, based on the evaluating, the resource set to include the aggregated state.

6. The computer-implemented method of claim 1, further comprising determining at least one of the first time interval or the second time interval, wherein the determining comprises:
checking whether a dynamic, a fixed, or a customer-specified routine is to be used to determine the at least one of the first time interval or the second time interval; and
determining the at least one of the first time interval or the second time interval based on the routine to be used.

7. The computer-implemented method of claim 6, wherein the checking indicates the dynamic routine is to be used, and wherein the determining the at least one of the first time interval or the second time interval comprises:
projecting a projected time for recovery operation execution based on one or more operation timings; and
calculating the at least one of the first time interval or the second time interval based on an average time to gather resource state, an average time to build a recovery process, and the projected time.

8. The computer-implemented method of claim 6, wherein the checking indicates the fixed routine is to be used, and wherein the determining the first time interval comprises using an average of resource state query times for a selected group of resources, and the determining the second time interval comprises using a largest time for a resource to respond to a query for state for one or more resources associated with the resource set.

9. The computer-implemented method of claim 6, wherein the checking indicates the customer-specified routine is to be used, and the determining the first time interval comprises using a selected recovery time objective, and the determining the second time interval comprises using a longest response time to a query for resource state.

10. The computer-implemented method of claim 1, wherein the event comprises a state change event in which a property of a resource has changed, or a lifecycle event in which a resource instance or resource type has been created or deleted.

11. The computer-implemented method of claim 1, wherein the event comprises a plurality of correlated events, and wherein the plurality of correlated events are determined by one or more relationships selected based on real-time data of the IT environment.

12. The computer-implemented method of claim 1, wherein the event comprises a plurality of failure events, and wherein the dynamically forming comprises correlating the plurality of failure events to include resources common to the plurality of failure events in the resource set.

13. The computer-implemented method of claim 1, wherein the resource set is a containment region, and wherein the determining comprises determining whether a resource is to be part of a containment region being newly formed or part of an existing containment region.

14. The computer-implemented method of claim 1, wherein a first occurrence of the event causes creation of a new resource set, the new resource set to be dynamically formed.

15. A system for facilitating management of an Information Technology (IT) environment, said system comprising:
a memory; and
a processor in communications with the memory, wherein the computer system is configured to perform a method, said method comprising:
dynamically forming, by a processor at runtime based on an occurrence of an event, a resource set, the dynamically forming comprising:
determining, during a first time interval, an impacted set of resources impacted by the event, the first time interval based on a quantitative business goal defined by a customer for a customer-defined business application, the customer-defined business application executed using one or more resources of the impacted set of resources, and the determining comprising:
using a set of trigger conditions and one or more impact pairings to determine one or more resources to be included in the impacted set of resources, the one or more resources to be included in the impacted set of resources including at least one of one or more resources causing the event and one or more resources negatively impacted from a resource causing the event, and wherein an impact pairing of the one or more impact pairings includes an express statement that explicitly specifies a first resource, a first defined property of the first resource, a second resource paired with the first resource, and a second defined property of the second resource, the second defined property expressly specifying how the second resource is impacted based on the first resource and the first defined property;
gathering states for resources of the impacted set of resources to obtain current states for the resources, the gathering being performed during a second time interval that enables achieving the quantitative business goal, and wherein the gathering includes, for at least one resource of the impacted set of resources, evaluating one or more trigger conditions of one or more impact pairings for the at least one resource to determine real-time applicability of the one or more impact pairings; and
based on the gathered states, including, in the resource set, at least one of one or more resources of the impacted set of resources and an indication of at least one impact pairing based on the evaluating indicating real-time applicability.

16. The system of claim 15, wherein the resource set is a containment region implemented as a plurality of data structures, the plurality of data structures including a containment region data structure that includes various information relating to the containment region, a reason-for-inclusion data structure that includes one or more reasons that a specific resource is under evaluation as potentially impacted, implicated, or perpetrated by the event represented by the containment region, a pairings used data structure that includes one or more impact pairings that caused a resource to be in the impacted set of resources, and a states data structure that includes states of resources associated with the containment region.

17. The system of claim 15, wherein the method further comprises:
determining whether the resource set is to be formed, wherein the determining whether the resource set is to be formed includes:
monitoring an operational state of resources in a customer-defined grouping of resources for state changes;
based on a state change for a resource in the customer-defined grouping of resources, assessing the state change based on one or more impact pairing rules and an aggregated state of the customer-defined grouping of resources; and
based on the assessing indicating a change in overall state for the customer-defined grouping of resources, determining that the resource set is to be formed.

18. A computer program product for facilitating management of an Information Technology (IT) environment, said computer program product comprising:
a non-transitory computer readable storage medium readable by a processing circuit and storing instructions for execution by the processing circuit for performing a method comprising:
dynamically forming, by a processor at runtime based on an occurrence of an event, a resource set, the dynamically forming comprising:
determining, during a first time interval, an impacted set of resources impacted by the event, the first time interval based on a quantitative business goal defined by a customer for a customer-defined business application, the customer-defined business application executed using one or more resources of the impacted set of resources, and the determining comprising:
using a set of trigger conditions and one or more impact pairings to determine one or more resources to be included in the impacted set of resources, the one or more resources to be included in the impacted set of resources including at least one of one or more resources causing the event and one or more resources negatively impacted from a resource causing the event, and wherein an impact pairing of the one or more impact pairings includes an express statement that explicitly specifies a first resource, a first defined property of the first resource, a second resource paired with the first resource, and a second defined property of the second resource, the second defined property expressly specifying how the second resource is impacted based on the first resource and the first defined property;
gathering states for resources of the impacted set of resources to obtain current states for the resources, the gathering being performed during a second time interval that enables achieving the quantitative business goal, and wherein the gathering state includes, for at least one resource of the impacted set of resources, evaluating one or more trigger conditions of one or more impact pairings for the at least one resource to determine real-time applicability of the one or more impact pairings; and based on the gathered states, including, in the resource set, at least one of one or more resources of the impacted set of resources and an indication of at least one impact pairing based on the evaluating indicating real-time applicability.

19. The computer program product of claim 18, wherein the resource set is a containment region implemented as a plurality of data structures, the plurality of data structures including a containment region data structure that includes various information relating to the containment region, a reason-for-inclusion data structure that includes one or more reasons that a specific resource is under evaluation as potentially impacted, implicated or perpetrated by the event represented by the containment region, a pairings used data structure that includes one or more impact pairings that caused a resource to be in the impacted set of resources, and a states data structure that includes states of resources associated with the containment region.

20. The computer program product of claim 18, wherein the method further comprises:

determining whether the resource set is to be formed, wherein the determining whether the resource set is to be formed includes:

monitoring an operational state of resources in a customer-defined grouping of resources for state changes;

based on a state change for a resource in the customer-defined grouping of resources, assessing the state change based on one or more impact pairing rules and an aggregated state of the customer-defined grouping of resources; and based on the assessing indicating a change in overall state for the customer-defined grouping of resources, determining that the resource set is to be formed.

* * * * *